(12) United States Patent
Kusashima et al.

(10) Patent No.: US 11,277,760 B2
(45) Date of Patent: Mar. 15, 2022

(54) COMMUNICATION APPARATUS, COMMUNICATION CONTROL METHOD, AND COMPUTER PROGRAM FOR BEAM MEASUREMENT

(71) Applicant: Sony Corporation, Tokyo (JP)

(72) Inventors: Naoki Kusashima, Kanagawa (JP); Kazuyuki Shimezawa, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 16/636,029

(22) PCT Filed: Jul. 19, 2018

(86) PCT No.: PCT/JP2018/027148
§ 371 (c)(1),
(2) Date: Feb. 3, 2020

(87) PCT Pub. No.: WO2019/031190
PCT Pub. Date: Feb. 14, 2019

(65) Prior Publication Data
US 2020/0245173 A1  Jul. 30, 2020

(30) Foreign Application Priority Data
Aug. 10, 2017  (JP) .............................. JP2017-154990

(51) Int. Cl.
*H04W 24/10* (2009.01)
*H04B 17/309* (2015.01)
(Continued)

(52) U.S. Cl.
CPC .......... *H04W 24/10* (2013.01); *H04B 7/0617* (2013.01); *H04B 7/088* (2013.01); *H04B 17/309* (2015.01); *H04W 16/28* (2013.01)

(58) Field of Classification Search
CPC .... H04W 24/10; H04W 16/28; H04B 17/309; H04B 7/0617; H04B 7/088; H04B 7/086;
(Continued)

(56) References Cited

U.S. PATENT DOCUMENTS

2014/0315594 A1* 10/2014 Jeong ................... H04W 52/146
455/522
2015/0126205 A1*  5/2015 Kim ....................... H04W 76/18
455/450
(Continued)

FOREIGN PATENT DOCUMENTS

WO  WO-2016121251 A1 *  8/2016  ........... H04L 5/0073
WO  2016/2018620 A1   12/2016
WO  2017/101062 A1    6/2017

OTHER PUBLICATIONS

Partial European Search Report dated May 6, 2020 in European Application No. 18843676.0.
(Continued)

*Primary Examiner* — Tejis Daya
(74) *Attorney, Agent, or Firm* — Xsensus LLP

(57) ABSTRACT

[Overview]
[Problem to be Solved] To provide a communication apparatus that allows a transmitting station to accurately determine whether or not a receiving station actually has interference.
[Solution] There is provided a communication apparatus including a communication control unit that controls a communication process in a cellular system. The communication control unit sets a plurality of reception beams on the basis of information of a direction, measures received power for each of the reception beams, and reports a result of the measurement to a base station. The information of the direction is set from the base station.

15 Claims, 24 Drawing Sheets

(51) Int. Cl.
*H04B 7/06* (2006.01)
*H04B 7/08* (2006.01)
*H04W 16/28* (2009.01)

(58) Field of Classification Search
CPC ...... H04B 7/0619; H04B 17/24; H04B 17/26; H04B 17/345; H04B 7/0408
See application file for complete search history.

(56) References Cited

U.S. PATENT DOCUMENTS

| | | | | |
|---|---|---|---|---|
| 2016/0150435 | A1* | 5/2016 | Baek | H04W 24/10 370/252 |
| 2017/0033854 | A1* | 2/2017 | Yoo | H04W 24/00 |
| 2017/0033916 | A1* | 2/2017 | Stirling-Gallacher | H04L 5/14 |
| 2017/0214444 | A1* | 7/2017 | Nigam | H04B 7/063 |
| 2017/0295511 | A1* | 10/2017 | Sebire | H04W 74/0833 |
| 2017/0346545 | A1* | 11/2017 | Islam | H04B 7/0814 |
| 2017/0374574 | A1* | 12/2017 | Lee | H04W 24/08 |
| 2018/0248601 | A1* | 8/2018 | Kishiyama | H04B 17/318 |
| 2019/0199412 | A1* | 6/2019 | Koskela | H04W 72/0446 |
| 2020/0045725 | A1* | 2/2020 | Mochizuki | H04W 72/046 |

OTHER PUBLICATIONS

International Search Report and Written Opinion dated Oct. 16, 2018 for PCT/JP2018/027148 filed on Jul. 19, 2018, 7 pages including English Translation of the International Search Report.
Nokia and Alcatel-Lucent Shanghai Bell, "Mobility Measurements in Connected Mode," 3GPP TSG-RAN WG2 NR Adhoc, R2-1700112, Jan. 17-19, 2017, 6 pages.
Nokia and Alcatel-Lucent Shanghai Bell, "On RRM Measurement Reporting in NR," 3GPP TSG-RAN WG2 NR Adhoc, R2-1700125, Spokane, USA, Jan. 17-19, 2017, 3 pages.
3rd Generation Partnership Project; Technical Specification Group Radio Access Network; Study on Scenarios and Requirements for Next Generation Access Technologies; (Release 14) Mar. 2017; 38 pp.

* cited by examiner

FIG. 5

| | SUBCARRIER INTERVAL | MAXIMUM BANDWIDTH OF COMPONENT CARRIER | CP LENGTH TYPE | NUMBER OF SYMBOLS PER SUBFRAME | SUBFRAME LENGTH | RADIO FRAME LENGTH | NUMBER OF SUBCARRIERS PER RESOURCE BLOCK IN NR CELL |
|---|---|---|---|---|---|---|---|
| PARAMETER SET 0 | 1.5MHz | 20MHz | TYPE 1 | 14 | 1ms | 10ms | 12 |
| PARAMETER SET 1 | 7.5MHz | 1.4MHz | TYPE 1 | 70 | 10ms | 10ms | 24 |
| PARAMETER SET 2 | 30MHz | 80MHz | TYPE 1 | 7 | 0.25ms | 10ms | 6 |
| PARAMETER SET 3 | 15MHz | 20MHz | TYPE 2 | 12 | 1ms | 10ms | 12 |
| ... | ... | ... | ... | ... | ... | ... | ... |

COMMUNICATION APPARATUS, COMMUNICATION CONTROL METHOD, AND COMPUTER PROGRAM FOR BEAM MEASUREMENT

CROSS-REFERENCE TO RELATED APPLICATIONS

The present application is based on PCT filing PCT/JP2018/027148, filed Jul. 19, 2018, which claims priority to JP 2017-154990, filed Aug. 10, 2017, the entire contents of each are incorporated herein by reference.

TECHNICAL FIELD

The present disclosure relates to a communication apparatus, a communication control method, and a computer program.

BACKGROUND ART

Wireless access schemes and wireless networks for cellular mobile communication (that are also referred to as "Long Term Evolution (LTE)," "LTE-Advanced (LTE-A)," "LTE-Advanced Pro (LTE-A Pro)," "New Radio (NR)," "New Radio Access Technology (NRAT)," "Evolved Universal Terrestrial Radio Access (EUTRA)," or "Further EUTRA (FEUTRA)") have been under consideration in the Third Generation Partnership Project (3rd Generation Partnership Project: 3GPP). It should be noted that, in the following description, LTE includes LTE-A, LTE-A Pro, and EUTRA, and NR includes NRAT and FEUTRA. In LTE and NR, a base station apparatus (base station) is also referred to as eNodeB (evolved NodeB), and a terminal apparatus (mobile station, mobile station apparatus, and terminal) is also referred to as UE (User Equipment). However, the base station apparatus is also referred to as gNodeB or gNB in some cases. LTE and NR are cellular communication systems in which a plurality of areas covered by base station apparatuses are disposed as cells. A single base station apparatus may manage a plurality of cells.

NR is RAT (Radio Access Technology) that differs from LTE as a next-generation radio wireless scheme of LTE. NR is an access technology that is able to support a variety of use cases including eMBB (Enhanced mobile broadband), mMTC (Massive machine type communications), and URLLC (Ultra reliable and low latency communications). NR is under consideration for technical frameworks that support usage scenarios, requirements, deployment scenarios, and the like in the use cases. The detailed scenarios and requirements of NR are disclosed in NPL 1.

CITATION LIST

Non-Patent Literature

NPL 1: 3rd Generation Partnership Project; Technical Specification Group Radio Access Network; Study on Scenarios and Requirements for Next Generation Access Technologies; (Release 14), 3GPP TR 38.913 V14.2.0 (2017-03).
<http://www.3gpp.org/ftp/Specs/archive/38_series/38.913/38913-030.zip>

SUMMARY OF THE INVENTION

Problems to be Solved by the Invention

In the current wireless communication system, the communication quality is measured between a transmitting station and a receiving station, but the communication quality is measured only by measuring received power from all directions in the current wireless communication system. It is not possible to measure the direction from which radio waves are received, and how intense the radio waves are. Consequently, it is not possible for the transmitting station to accurately determine whether or not the receiving station actually has interference.

Accordingly, the present disclosure proposes a novel and improved communication apparatus, communication control method, and computer program that allow a transmitting station to accurately determine whether or not a receiving station actually has interference.

Means for Solving the Problems

According to the present disclosure, there is provided a communication apparatus including a communication control unit that controls a communication process in a cellular system. The communication control unit sets a plurality of reception beams on the basis of information of a direction, measures received power for each of the reception beams, and reports a result of the measurement to a base station. The information of the direction is set from the base station.

In addition, according to the present disclosure, there is provided a communication apparatus including a communication control unit that controls a communication process in a cellular system. The communication control unit sets a plurality of reception beams for a terminal apparatus on the basis of capability information acquired from the terminal apparatus, and acquires information of received power measured in the terminal apparatus for each of the reception beams.

In addition, according to the present disclosure, there is provided a communication control method including controlling, by a processor, a communication process in a cellular system. The processor sets a plurality of reception beams on the basis of information of a direction, measures received power for each of the reception beams, and reports a result of the measurement to a base station. The information of the direction is set from the base station.

In addition, according to the present disclosure, there is provided a communication control method including controlling, by a processor, a communication process in a cellular system. The processor sets a plurality of reception beams for a terminal apparatus on the basis of capability information acquired from the terminal apparatus, and acquires information of received power measured in the terminal apparatus for each of the reception beams.

In addition, according to the present disclosure, there is provided a computer program that causes a computer to execute controlling a communication process in a cellular system, and to set a plurality of reception beams on a basis of information of a direction, measure received power for each of the reception beams, and report a result of the measurement to a base station, the information of the direction being set from the base station.

In addition, according to the present disclosure, there is provided a computer program that causes a computer to execute controlling a communication process in a cellular system, and to set a plurality of reception beams for a terminal apparatus on a basis of capability information acquired from the terminal apparatus, and acquire information of received power measured in the terminal apparatus for each of the reception beams.

Effects of the Invention

As described above, according to the present disclosure, it is possible to provide the novel and improved communication apparatus, communication control method, and computer program that allow a transmitting station to accurately determine whether or not a receiving station actually has interference.

It should be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 5 is a diagram illustrating an example of a parameter set regarding a transmission signal in an NR cell.

MODES FOR CARRYING OUT THE INVENTION

Figure 1:
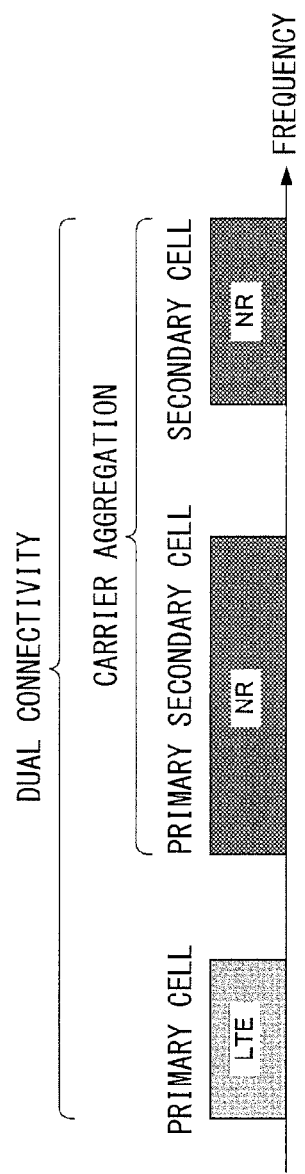
FIG. 1 is a diagram illustrating an example of setting of a component carrier in the present embodiment.

The following describes a preferred embodiment of the present disclosure in detail with reference to the accompanying drawings. It should be noted that, in this description and the accompanying drawings, components that have substantially the same functional configuration are indicated by the same reference signs, and thus redundant description thereof is omitted.

It should be noted that the description is given in the following order.
1. Introduction
2. Technical Features
3. Application Examples
4. Conclusion

1. INTRODUCTION

<Wireless Communication System in the Present Embodiment>

In the present embodiment, a wireless communication system at least includes a base station apparatus 1 and a terminal apparatus 2. The base station apparatus 1 is able to accommodate a plurality of terminal apparatuses. The base station apparatus 1 and another base station apparatus are able to be coupled to each other by means of an X2 interface. In addition, the base station apparatus 1 is able to be coupled to EPC (Evolved Packet Core) by means of an S1 interface. Further, the base station apparatus 1 is able to be coupled to MME (Mobility Management Entity) by means of an S1-MME interface, and is able to be coupled to S-GW (Serving Gateway) by means of an S1-U interface. The S1 interface supports many-to-many coupling between the MME and/or the S-GW and the base station apparatus 1. In addition, in the present embodiment, the base station apparatus 1 and the terminal apparatus 2 each support LTE and/or NR.

<Wireless Access Technology in the Present Embodiment>

In the present embodiment, the base station apparatus 1 and the terminal apparatus 2 each support one or more Radio Access Technologies (RATs). For example, RAT includes LTE and NR. One RAT corresponds to one cell (component carrier). That is, in a case where a plurality of RATs is supported, those RAT correspond to cells different from each other. In the present embodiment, a cell is a combination of downlink resources, uplink resources, and/or sidelinks. In addition, in the following description, a cell supporting LTE is referred to as LTE cell, and a cell supporting NR is referred to as NR cell.

Downlink communication is communication from the base station apparatus 1 to the terminal apparatus 2. Downlink transmission is transmission from the base station apparatus 1 to the terminal apparatus 2, and transmission of a downlink physical channel and/or a downlink physical signal. Uplink communication is communication from the terminal apparatus 2 to the base station apparatus 1. Uplink transmission is transmission from the terminal apparatus 2 to the base station apparatus 1, and transmission of an uplink physical channel and/or an uplink physical signal. Sidelink communication is communication from the terminal apparatus 2 to another terminal apparatus 2. Sidelink transmission is transmission from the terminal apparatus 2 to another terminal apparatus 2, and transmission of a sidelink physical channel and/or a sidelink physical signal.

The sidelink communication is defined for proximity direct detection and proximity direct communication between terminal apparatuses. It is possible to use, for the sidelink communication, a frame configuration similar to those of the uplink and the downlink. In addition, the sidelink communication may be limited to a portion (subset) of the uplink and/or downlink resources.

The base station apparatus 1 and the terminal apparatus 2 are able to support communication using a set of one or more cells on the downlink, uplink, and/or sidelink. A set of a plurality of cells or communication using a set of a plurality of cells is also referred to as carrier aggregation or dual connectivity. The details of the carrier aggregation and the dual connectivity are described below. In addition, each cell uses a predetermined frequency bandwidth. It is possible to predefine the maximum value, minimum value, and settable value for a predetermined frequency bandwidth.

FIG. 1 is a diagram illustrating an example of the setting of a component carrier in the present embodiment. In the example of FIG. 1, one LTE cell and two NR cells are set. The one LTE cell is set as a primary cell. The two respective NR cells are set as a primary secondary cell and a secondary cell. The two NR cells are integrated by carrier aggregation. In addition, the LTE cell and the NR cells are integrated by dual connectivity. It should be noted that the LTE cell and the NR cells may be integrated by carrier aggregation. In the example of FIG. 1, the LTE cell that is a primary cell is able to assist the coupling of NR, and there is thus no necessity to support a portion of functions such as a function for stand-alone communication. The function for stand-alone communication includes a function necessary for initial coupling.

Figure 2:
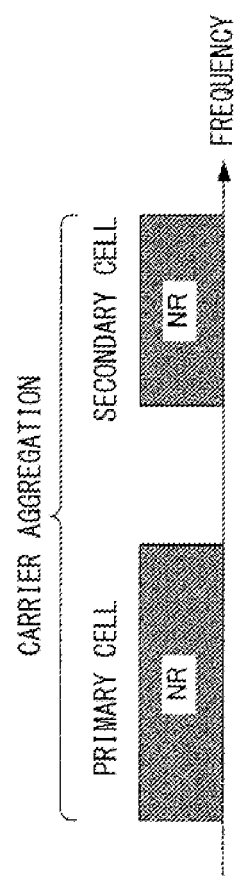
FIG. 2 is a diagram illustrating an example of the setting of the component carrier in the present embodiment.

FIG. 2 is a diagram illustrating an example of the setting of a component carrier in the present embodiment. In the example of FIG. 2, two NR cells are set. The respective two NR cells are set as a primary cell and a secondary cell, and are integrated by carrier aggregation. In this case, the NR cells support a function for stand-alone communication, thereby eliminating the necessity of the assistance of an LTE cell. It should be noted that the two NR cells may be integrated by dual connectivity.

<Radio Frame Configuration in the Present Embodiment>

In the present embodiment, a radio frame (radio frame) of 10 ms (milliseconds) is defined. Each radio frame includes two half frames. The time interval of a half frame is 5 ms. Each half frame includes five subframes. The time interval of a subframe is 1 ms, and is defined by two consecutive slots. The time interval of a slot is 0.5 ms. The i-th subframe in the radio frame includes the (2×i)-th slot and the (2×i+1)-th slot. That is, ten subframes are defined in each of the radio frames.

The subframe includes a downlink subframe, an uplink subframe, a special subframe, a sidelink subframe, and the like.

The downlink subframe is a subframe reserved for downlink transmission. The uplink subframe is a subframe reserved for uplink transmission. The special subframe includes three fields. The three fields include DwPTS (Downlink Pilot Time Slot), GP (Guard Period), and UpPTS (Uplink Pilot Time Slot). The total length of the DwPTS, GP, and UpPTS is 1 ms. The DwPTS is a field reserved for downlink transmission. The UpPTS is a field reserved for uplink transmission. The GP is a field in which downlink transmission and uplink transmission are not performed. It should be noted that the special subframe may include only the DwPTS and the GP, or include only the GP and the UpPTS. The special subframe is disposed between the downlink subframe and the uplink subframe in TDD, and is used to switch the downlink subframe to the uplink subframe. The sidelink subframe is a subframe reserved or set for sidelink communication. The sidelink is used for proximity direct communication and proximity direct detection between terminal apparatuses.

A single radio frame includes a downlink subframe, an uplink subframe, a special subframe, and/or a sidelink subframe. In addition, a single radio frame may include a downlink subframe, an uplink subframe, a special subframe, or a sidelink subframe alone.

A plurality of radio frame configurations is supported. A radio frame configuration is defined by frame configuration types. A frame configuration type 1 is applicable only to FDD. A frame configuration type 2 is applicable only to TDD. A frame configuration type 3 is applicable only to the operation of an LAA (Licensed Assisted Access) secondary cell.

In the frame configuration type 2, a plurality of uplink-downlink configurations is defined. In an uplink-downlink configuration, each of the ten subframes in one radio frame corresponds to any of a downlink subframe, an uplink subframe, and a special subframe. A subframe 0, a subframe 5, and DwPTS are reserved for downlink transmission at all times. UpPTS and the subframe immediately after the special subframe thereof are reserved for uplink transmissions at all times.

In the frame configuration type 3, the ten subframes in one radio frame are reserved for downlink transmission. The terminal apparatus 2 is able to treat a subframe in which no PDSCHs or no detection signals are transmitted as an empty subframe. Unless a predetermined signal, channel and/or downlink transmission are detected in a certain subframe, the terminal apparatus 2 assumes that the subframe does not have any signal and/or channel. The downlink transmission is occupied by one or more consecutive subframes. The first subframe of the downlink transmission may begin anywhere within the subframe. The last subframe of the downlink transmission may be fully occupied or occupied at intervals defined in DwPTS.

It should be noted that, in the frame configuration type 3, the ten subframes in one radio frame may be reserved for uplink transmission. In addition, each of the ten subframes in one radio frame may correspond to any of a downlink subframe, an uplink subframe, a special subframe, and a sidelink subframe.

The base station apparatus 1 may transmit a downlink physical channel and a downlink physical signal in the DwPTS of a special subframe. The base station apparatus 1 is able to restrict the transmission of PBCH in the DwPTS of a special subframe. The terminal apparatus 2 may transmit an uplink physical channel and an uplink physical signal in the UpPTS of a special subframe. The terminal apparatus 2 is able to restrict the transmission of a portion of uplink physical channels and uplink physical signals in the UpPTS of a special subframe.

It should be noted that the time interval in transmission performed once is referred to as TTI (Transmission Time Interval), and LTE defines 1 ms (1 subframe) as 1 TTI.

<Frame Configuration of LTE in the Present Embodiment>

Figure 3:
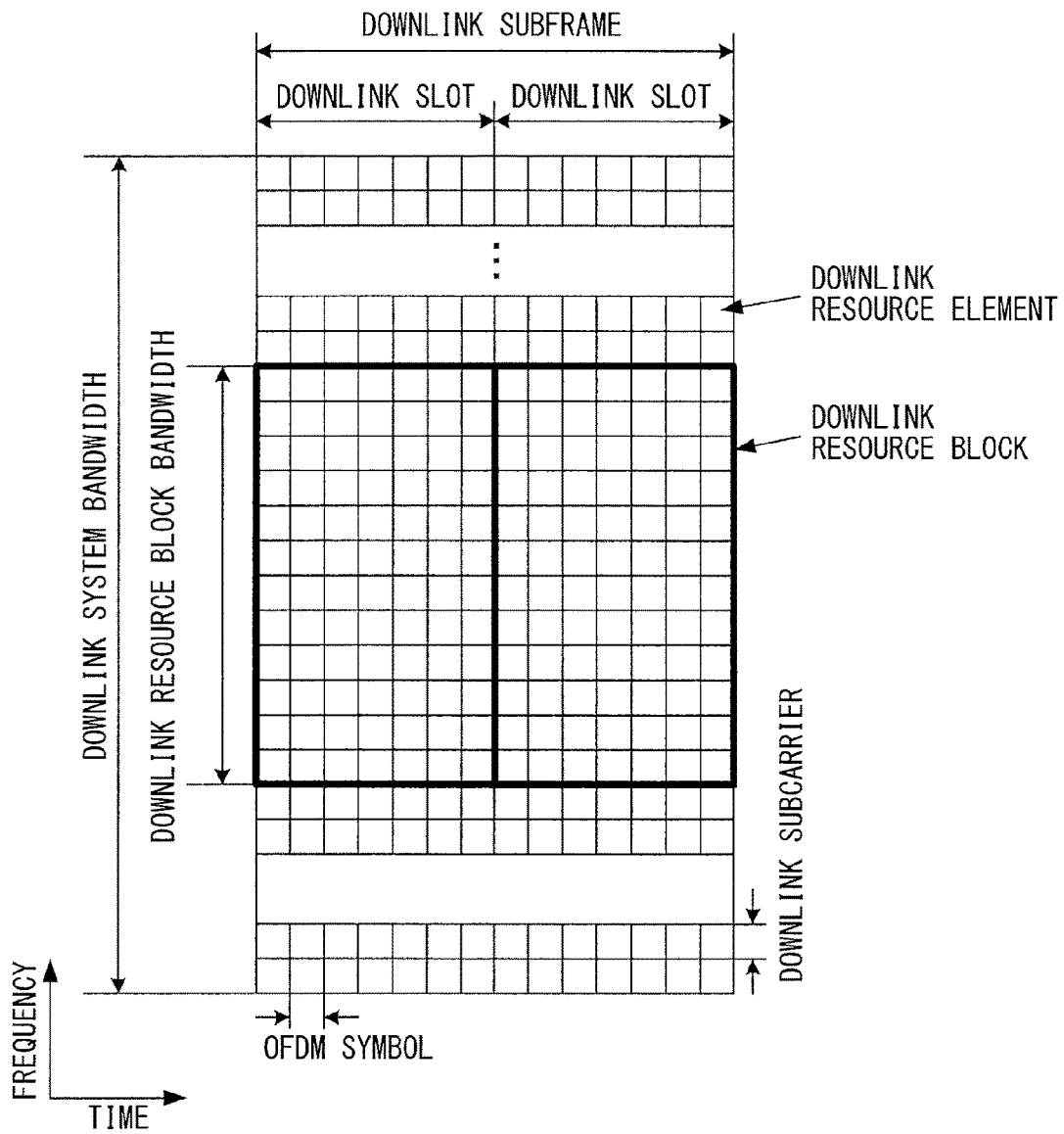
FIG. 3 is a diagram illustrating an example of a downlink subframe of LTE in the present embodiment.

FIG. 3 is a diagram illustrating an example of a downlink subframe of LTE in the present embodiment. The diagram illustrated in FIG. 3 is also referred to as LTE downlink resource grid. The base station apparatus 1 is able to transmit a downlink physical channel of LTE and/or a downlink physical signal of LTE in a downlink subframe to the terminal apparatus 2. The terminal apparatus 2 is able to receive a downlink physical channel of LTE and/or a downlink physical signal of LTE in a downlink subframe from the base station apparatus 1.

Figure 4:
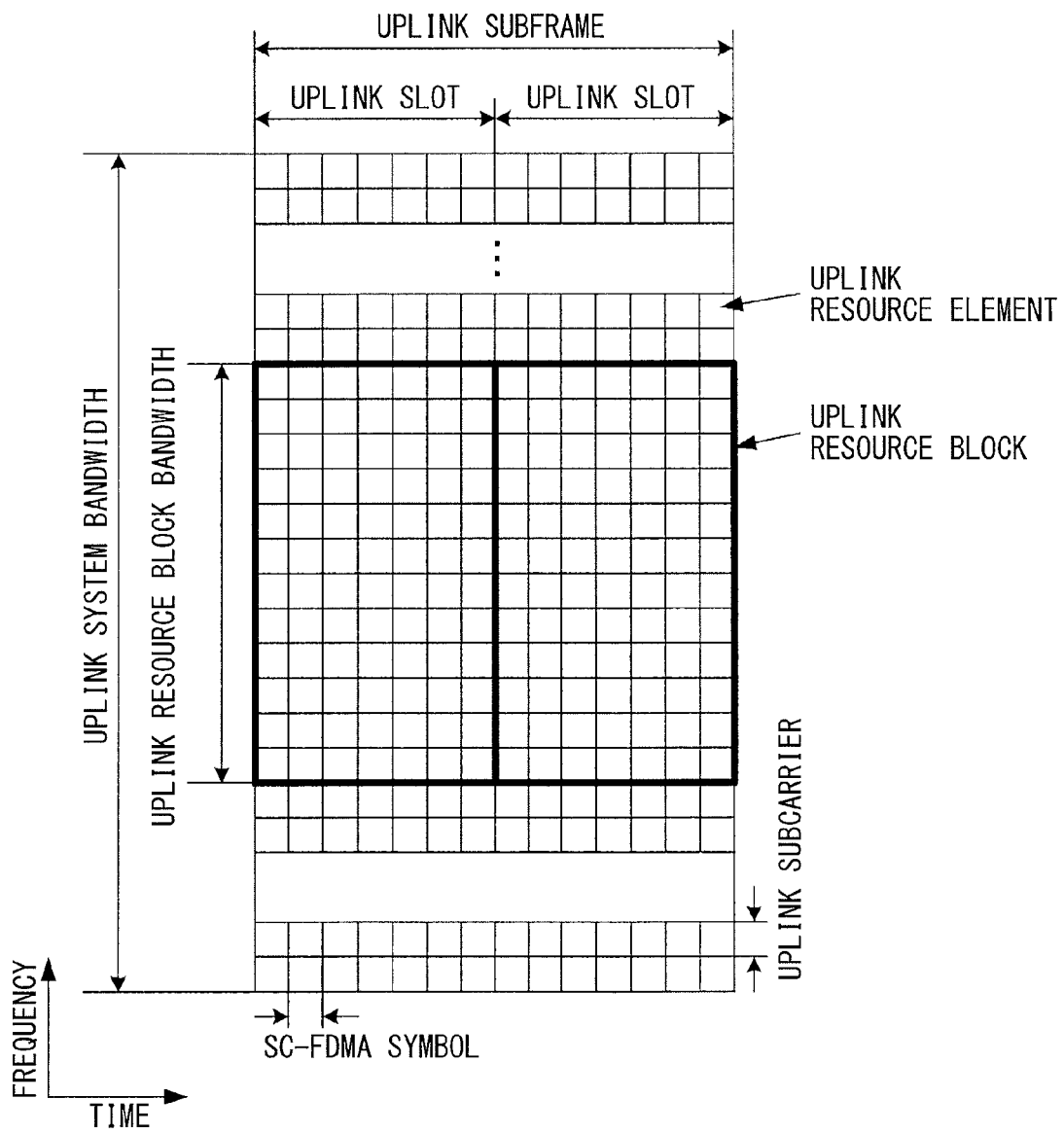
FIG. 4 is a diagram illustrating an example of an uplink subframe of LTE in the present embodiment.

FIG. 4 is a diagram illustrating an example of an uplink subframe of LTE in the present embodiment. The diagram illustrated in FIG. 4 is also referred to as LTE uplink resource grid. The terminal apparatus 2 is able to receive a downlink physical channel of LTE and/or a downlink physical signal of LTE in an uplink subframe to the base station apparatus 1. The base station apparatus 1 is able to receive an uplink physical channel of LTE and/or an uplink physical signal of LTE in an uplink subframe from the terminal apparatus 2.

In the present embodiment, the physical resources of LTE may be defined as follows. One slot is defined by a plurality of symbols. A physical signal or a physical channel transmitted in each of the slots is represented by a resource grid. In the downlink, the resource grid is defined by a plurality of subcarriers for the frequency direction and a plurality of OFDM symbols for the time direction. In the uplink, the resource grid is defined by a plurality of subcarriers for the frequency direction and a plurality of SC-FDMA symbols for the time direction. The number of subcarriers or resource blocks may depend on the bandwidth of a cell. The number of symbols in one slot depends on the type of CP (Cyclic Prefix). The type of CP includes normal CP or extended CP. In the normal CP, the number of OFDM symbols or SC-FDMA symbols included in one slot is 7. In the extended CP, the number of OFDM symbols or SC-FDMA symbols included in one slot is 6. Each of the elements in the resource grid is referred to as resource element. The resource element is identified by using the index (number) of a subcarrier and the index (number) of a symbol. It should be noted that, in the description of the present embodiment, the OFDM symbol or the SC-FDMA symbol is also simply referred to as symbol.

A resource block is used to map a certain physical channel (such as PDSCH or PUSCH) to a resource element. The resource block includes a virtual resource block and a physical resource block. A certain physical channel is mapped to a virtual resource block. A virtual resource block is mapped to a physical resource block. One physical resource block is defined by a predetermined number of consecutive symbols in the time domain. One physical resource block is defined by a predetermined number of consecutive subcarriers in the frequency domain. The number of symbols and the number of subcarriers in one physical resource block are determined, for example, on the basis of the type of CP, the subcarrier interval, and/or a parameter set by a higher layer in the cell. For example, in a case where the type of CP is the normal CP and the subcarrier interval is 15 kHz, the number of symbols in one physical resource block is 7 and the number of subcarriers is 12. In that case, one physical resource block includes (7×12) resource elements. Physical resource blocks are numbered from 0 in the frequency domain. In addition, two resource blocks in one subframe that correspond to the same physical resource block number are defined as a physical resource block pair (PRB pair or RB pair).

In each LTE cell, one predetermined parameter is used in a certain subframe. For example, the predetermined parameter may be a parameter (physical parameter) regarding a transmission signal. The parameter regarding a transmission signal includes CP length, a subcarrier interval, the number of symbols in one subframe (predetermined time length), the number of subcarriers in one resource block (predetermined frequency band), a multiple access scheme, a signal waveform, and the like.

That is, in the LTE cell, the downlink signal and the uplink signal are each generated by using one predetermined parameter in predetermined time length (e.g., subframe). In other words, the terminal apparatus 2 assumes that a downlink signal to be transmitted from the base station apparatus 1 and an uplink signal to be transmitted to the base station apparatus 1 are each generated by using one predetermined parameter in predetermined time length. In addition, the base station apparatus 1 sets a downlink signal to be transmitted to the terminal apparatus 2 and an uplink signal to be transmitted from the terminal apparatus 2 to cause each of them to be generated by using one predetermined parameter in predetermined time length.

<Frame Configuration of NR in the Present Embodiment>

In each NR cell, one or more predetermined parameters are used in certain predetermined time length (e.g., a subframe). That is, in the NR cell, the downlink signal and the uplink signal are each generated by using one or more predetermined parameters in predetermined time length. In other words, the terminal apparatus 2 assumes that a downlink signal to be transmitted from the base station apparatus 1 and an uplink signal to be transmitted to the base station apparatus 1 are each generated by using one or more predetermined parameters in predetermined time length. In addition, the base station apparatus 1 is able to set a downlink signal to be transmitted to the terminal apparatus 2 and an uplink signal to be transmitted from the terminal apparatus 2 to cause each of them to be generated by using one or more predetermined parameters in predetermined time length. In a case where a plurality of predetermined parameters is used, signals generated by using those predetermined parameters are multiplexed in a predetermined method. For example, the predetermined method includes FDM (Frequency Division Multiplexing), TDM (Time Division Multiplexing), CDM (Code Division Multiplexing), and/or SDM (Spatial Division Multiplexing).

It is possible to predefine a plurality of types of parameter sets as combinations of predetermined parameters set in the NR cell.

FIG. 5 is a diagram illustrating an example of a parameter set regarding a transmission signal in an NR cell. In the example of FIG. 5, parameters regarding transmission signals included in the parameter sets are a subcarrier interval, the number of subcarriers per resource block in the NR cell, the number of symbols per subframe, and a CP length type. The CP length type is a type of CP length used in the NR cell. For example, a CP length type 1 corresponds to the normal CP in LTE, and a CP length type 2 corresponds to the extended CP in LTE.

It is possible to define the parameter sets regarding transmitted signals in the NR cell individually in the downlink and the uplink. In addition, it is possible to set the parameter sets regarding transmitted signals in the NR cell independently in the downlink and the uplink.

Figure 6:
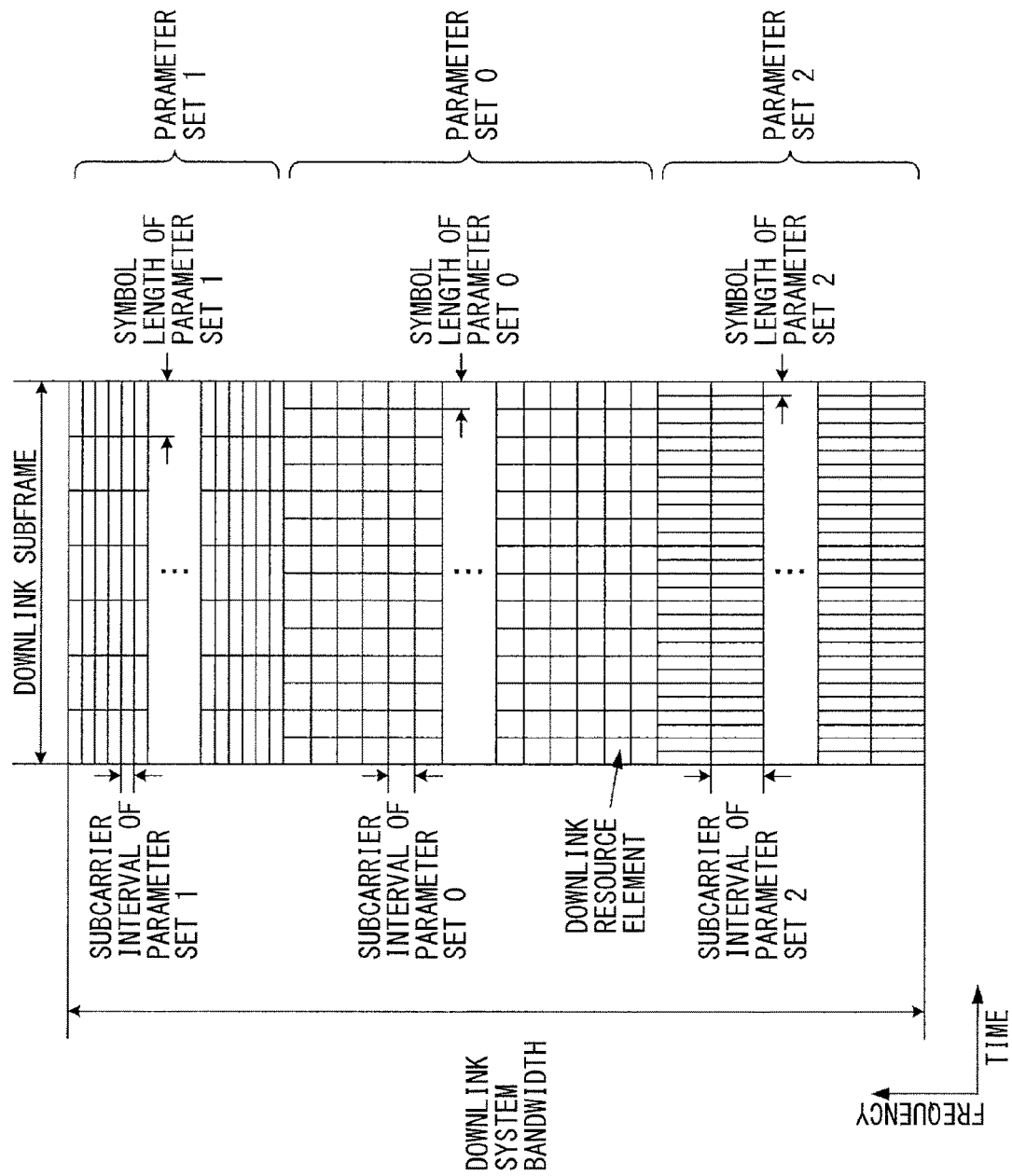
FIG. 6 is a diagram illustrating an example of a downlink subframe of NR in the present embodiment.

FIG. 6 is a diagram illustrating an example of a downlink subframe of NR in the present embodiment. In the example of FIG. 6, signals generated by using a parameter set 1, a parameter set 0, and a parameter set 2 are subjected to FDM in a cell (system bandwidth). The diagram illustrated in FIG. 6 is also referred to as NR downlink resource grid. The base station apparatus 1 is able to transmit a downlink physical channel of NR and/or a downlink physical signal of NR in a downlink subframe to the terminal apparatus 2. The terminal apparatus 2 is able to receive a downlink physical channel of NR and/or a downlink physical signal of NR in a downlink subframe from the base station apparatus 1.

Figure 7:
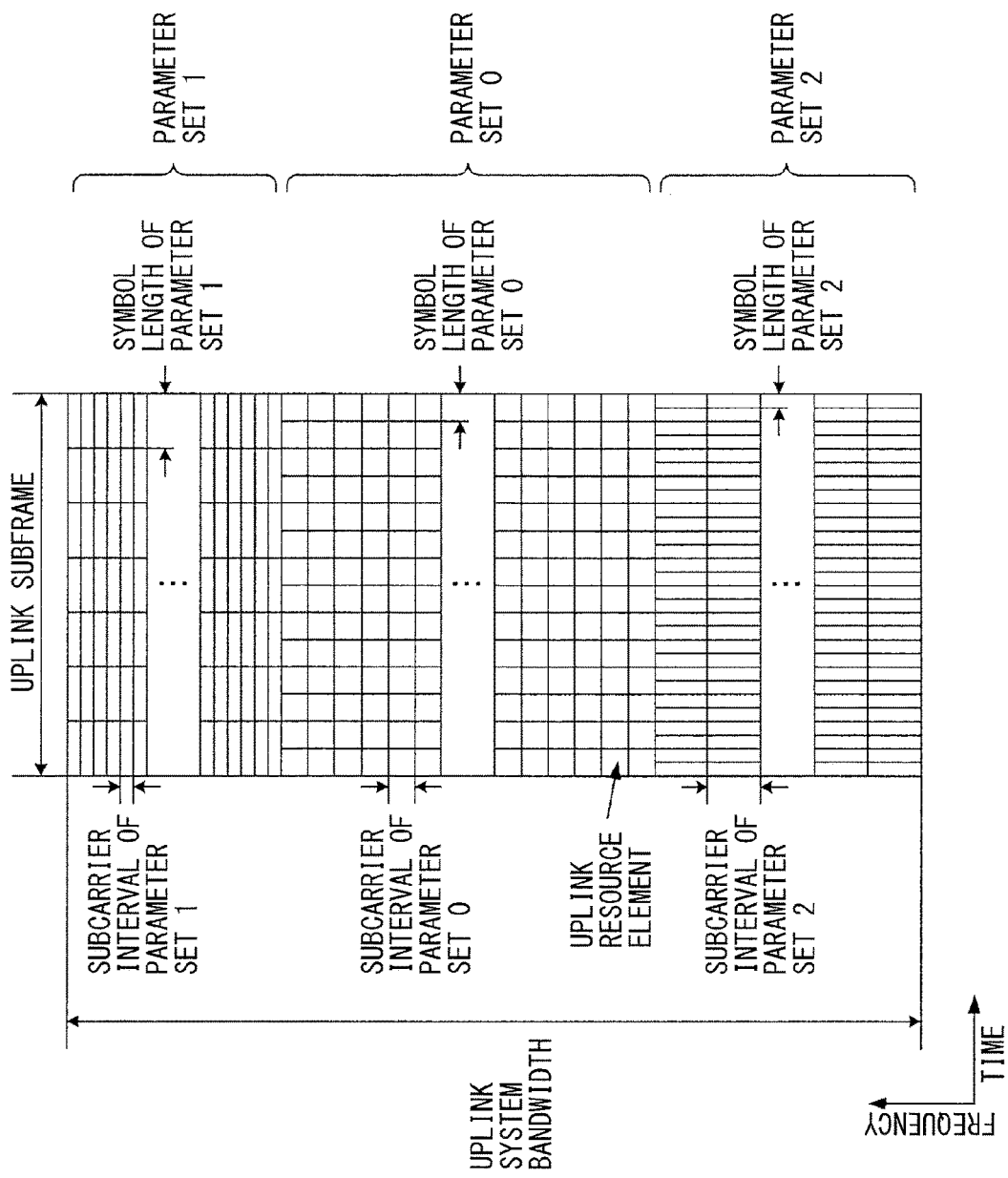
FIG. 7 is a diagram illustrating an example of an uplink subframe of NR in the present embodiment.

FIG. 7 is a diagram illustrating an example of an uplink subframe of NR in the present embodiment. In the example of FIG. 7, the signals generated by using the parameter set 1, the parameter set 0, and the parameter set 2 are subjected to FDM in a cell (system bandwidth). The diagram illustrated in FIG. 7 is also referred to as NR uplink resource grid. The base station apparatus 1 is able to transmit an uplink physical channel of NR and/or an uplink physical signal of NR in an uplink subframe to the terminal apparatus 2. The terminal apparatus 2 is able to receive an uplink physical channel of NR and/or an uplink physical signal of NR in an uplink subframe from the base station apparatus 1.

<Antenna Port in the Present Embodiment>

An antenna port is defined to allow a propagation channel for carrying a certain symbol to be inferred from a propagation channel of the same antenna port for carrying another symbol. For example, it is possible to assume that different physical resources of the same antenna port are transmitted in the same propagation channel That is, it is possible to estimate and demodulate the propagation channel of a symbol of a certain antenna port by using a reference signal of the antenna port. In addition, each antenna port has one resource grid. The antenna port is defined by a reference signal. In addition, each reference signal is able to define a plurality of antenna ports.

An antenna port is specified or identified by an antenna port number. For example, antenna ports 0 to 3 are antenna ports from each of which CRS is transmitted. That is, it is possible to demodulate PDSCH transmitted from each of the antenna ports 0 to 3 by using the CRS corresponding to each of the antenna ports 0 to 3.

In a case where a predetermined condition is satisfied, it is possible to express each of two antenna ports as being at a quasi-identical position (QCL: Quasi co-location). The predetermined condition is that the global characteristics of a propagation channel of a certain antenna port for carrying a symbol are inferable from a propagation channel of another antenna port for carrying a symbol. The global characteristics include delay variance, Doppler spread, Doppler shift, average gain, and/or average delay.

In the present embodiment, the antenna port number may be defined to be different for each RAT, or may be defined to be common between RATs. For example, antenna ports 0 to 3 in LTE are antenna ports from each of which CRS is transmitted. It is possible in NR to regard the antenna ports 0 to 3 as antenna ports from each of which CRS similar to that of LTE is transmitted. In addition, it is possible in NR to regard the antenna ports from each of which CRS similar to that of LTE as having antenna port numbers different from those of the antenna ports 0 to 3. In the description of the present embodiment, a predetermined antenna port number is applicable to LTE and/or NR.

<Physical Channel and Physical Signal in the Present Embodiment>

In the present embodiment, a physical channel and a physical signal are used.

The physical channel includes a downlink physical channel, an uplink physical channel, and a sidelink physical channel. The physical signal includes a downlink physical signal, an uplink physical signal, and a sidelink physical signal.

Physical channels and physical signals in LTE are also referred to as LTE physical channels and LTE physical signals, respectively. Physical channels and physical signals in NR are also referred to as NR physical channels and NR physical signals, respectively. It is possible to define the LTE physical channel and the NR physical channel as physical channels different from each other. It is possible to define the LTE physical signal and the NR physical signal as physical signals different from each other. In the description of the present embodiment, the LTE physical channel and the NR physical channel are also simply referred to as physical channels, and the LTE physical signal and the NR physical signal are also simply referred to as physical signals. That is, the description for the physical channels is applicable to both the LTE physical channel and the NR physical channel. The description for the physical signals is applicable to both the LTE physical signal and the NR physical signal.

<Downlink Physical Channel in the Present Embodiment>

PBCH is used to broadcast MIB (Master Information Block) that is broadcast information specific to a serving cell of the base station apparatus 1. PBCH is transmitted only in the subframe 0 in a radio frame. MIB is updatable at intervals of 40 ms. PBCH is repeatedly transmitted in a period of 10 ms. Specifically, the initial transmission of MIB is performed in the subframe 0 in a radio frame satisfying the condition that SFN (System Frame Number) divided by 4 offers a remainder of 0, and the retransmission (repetition) of the MIB is performed in the subframes 0 in all the other radio frames. The SFN is the number of a radio frame (system frame number). The MIB is system information. For example, the MIB includes information indicating the SFN.

PCFICH is used to transmit information regarding the number of OFDM symbols used to transmit PDCCH. The region indicated by PCFICH is also referred to as PDCCH region. The information transmitted by using PCFICH is also called CFI (Control Format Indicator).

PDCCH and EPDCCH are used to transmit downlink control information (Downlink Control Information). The mapping of the information bits of the downlink control information is defined as a DCI format. The downlink control information includes a downlink grant (downlink grant) and an uplink grant (uplink grant). The downlink grant is also referred to as downlink assignment (downlink assignment) or downlink allocation (downlink allocation).

PDCCH is transmitted by using a set of one or more consecutive CCEs (Control Channel Elements). CCE includes nine REGs (Resource Element Groups). REG includes four resource elements. In a case where PDCCH includes n consecutive CCEs, the PDCCH begins with CCE that satisfies the condition that i divided by n offers a remainder of 0 where i represents the index (number) of the CCE.

EPDCCH is transmitted by using a set of one or more consecutive ECCEs (Enhanced Control Channel Elements). ECCE includes a plurality of EREGs (Enhanced Resource Element Groups).

A downlink grant is used to schedule PDSCH in a certain cell. The downlink grant is used to schedule PDSCH in the same subframe as the subframe in which the downlink grant is transmitted. An uplink grant is used to schedule PUSCH in a certain cell. The uplink grant is used to schedule single PUSCH in a subframe four or more subframes after the subframe in which the uplink grant is transmitted.

A CRC (Cyclic Redundancy Check) parity bit is added to DCI. The CRC parity bit is scrambled by using RNTI (Radio Network Temporary Identifier). The RNTI is an identifier that is definable or settable in accordance with the purpose or the like of the DCI. The RNTI is an identifier predefined by the specifications, an identifier set as information specific to a cell, an identifier set as information specific to the terminal apparatus 2, or an identifier set as information specific to a group belonging to the terminal apparatus 2. For example, the terminal apparatus 2 descrambles a CRC parity bit added to DCI by using predetermined RNTI to identify whether or not the CRC is correct in monitoring PDCCH or EPDCCH. In a case where the CRC is correct, it is understood that the DCI is DCI for the terminal apparatus 2.

PDSCH is used to transmit downlink data (Downlink Shared Channel: DL-SCH). In addition, PDSCH is also used to transmit higher-layer control information.

In the PDCCH region, a plurality of PDCCHs may be subjected to frequency, time, and/or space multiplexing. In the EPDCCH region, a plurality of EPDCCHs may be subjected to frequency, time, and/or space multiplexing. In the PDSCH region, a plurality of PDSCHs may be subjected to frequency, time, and/or space multiplexing. In the PDCCH, PDSCH, and/or PDCCH may be subjected to frequency, time, and/or space multiplexing.

<Downlink Physical Signal in the Present Embodiment>

A synchronization signal is used for the terminal apparatus 2 to synchronize in the downlink frequency domain and/or time domain. The synchronization signal includes PSS (Primary Synchronization Signal) and SSS (Secondary Synchronization Signal). A synchronization signal is disposed in a predetermined subframe in a radio frame. For example, in the TDD scheme, synchronization signals are disposed in the subframes 0, 1, 5, and 6 in a radio frame. In the FDD scheme, synchronization signals are disposed in the subframes 0 and 5 in a radio frame.

PSS may be used for rough frame/symbol timing synchronization (synchronization in the time domain) or identification of a cell identification group. SSS may be used for more accurate frame timing synchronization, identification of a cell, and detection of CP length. That is, the use of PSS and SSS allows for frame timing synchronization and cell identification.

A downlink reference signal is used for the terminal apparatus 2 to estimate the propagation path of a downlink physical channel, correct a propagation path, calculate downlink CSI (Channel State Information; channel state information), and/or measure the positioning of the terminal apparatus 2.

CRS is transmitted in the entire band of the subframe. CRS is used to receive (demodulate) PBCH, PDCCH, PHICH, PCFICH, and PDSCH. CRS may be used for the terminal apparatus 2 to calculate the downlink channel state information. The PBCH, PDCCH, PHICH, and PCFICH are transmitted from the antenna port used to transmit the CRS.

CRS supports a 1, 2, or 4-antenna-port configuration. CRSs are transmitted from one or more of the antenna ports 0 to 3.

URS associated with PDSCH is transmitted in the subframe and bandwidth used to transmit the PDSCH associated with the URS. URS is used to demodulate the PDSCH associated with the URS. URSs associated with PDSCHs are transmitted from one or more of the antenna ports 5 and 7 to 14.

PDSCH is transmitted from an antenna port used to transmit CRS or URS on the basis of a transmission mode and a DCI format. A DCI format 1A is used to schedule PDSCH to be transmitted from an antenna port used to transmit CRS. A DCI format 2D is used to schedule PDSCH to be transmitted from an antenna port used to transmit URS.

DMRS associated with EPDCCH is transmitted in the subframe and bandwidth used to transmit the EPDCCH associated with the DMRS. DMRS is used to demodulate the EPDCCH associated with the DMRS. The EPDCCH is transmitted from the antenna port used to transmit the DMRS. DMRSs associated with EPDCCHs are transmitted from one or more of the antenna ports 107 to 114.

CSI-RS is transmitted in the set subframe. CSI-RS is used for the terminal apparatus 2 to calculate the downlink channel state information. The resource with which CSI-RS is transmitted is set by the base station apparatus 1. The terminal apparatus 2 measures a signal (measures a channel) by using CSI-RS. CSI-RS supports the setting of a portion or all of the antenna ports 1, 2, 4, 8, 12, 16, 24, and 32. CSI-RSs are transmitted from one or more of the antenna ports 15 to 46. It should be noted that the antenna ports to be supported may be determined, for example, on the basis of the terminal apparatus capability of the terminal apparatus 2, the setting of an RRC parameter, and/or a transmission mode to be set.

A resource of ZP CSI-RS is set by a higher layer. A resource of ZP CSI-RS may be transmitted at zero-output power. That is, none of resources of ZP CSI-RS has to be transmitted. PDSCH and EPDCCH are not transmitted with the set resources of ZP CSI-RS. For example, a resource of ZP CSI-RS is used for an adjacent cell to transmit NZP CSI-RS. In addition, for example, a resource of ZP CSI-RS is used to measure CSI-IM. In addition, for example, a resource of ZP CSI-RS is a resource with which a predetermined channel such as PDSCH is not transmitted. In other words, a predetermined channel is (subjected to rate matching and puncture) mapped except for a resource of ZP CSI-RS.

<Uplink Physical Channel in the Present Embodiment>

PUCCH is a physical channel used to transmit uplink control information (Uplink Control Information: UCI). The uplink control information includes downlink channel state information (Channel State Information: CSI), a scheduling request (Scheduling Request: SR) indicating a request for a PUSCH resource, and HARQ-ACK for downlink data (Transport block: TB, Downlink-Shared Channel: DL-SCH). The HARQ-ACK is also referred to as ACK/NACK, HARQ feedback, or response information. In addition, the HARQ-ACK for the downlink data indicates ACK, NACK, or DTX.

PUSCH is a physical channel used to transmit uplink data (Uplink-Shared Channel: UL-SCH). In addition, PUSCH may also be used to transmit HARQ-ACK and/or channel state information along with uplink data. In addition, PUSCH may also be used to transmit only channel state information or only HARQ-ACK and channel state information.

PRACH is a physical channel used to transmit a random access preamble. It is possible to use PRACH for the terminal apparatus 2 to synchronize with the base station apparatus 1 in the time domain. In addition, PRACH is also used to indicate an initial connection establishment (initial connection establishment) procedure (process), a handover procedure, a connection re-establishment (connection re-establishment) procedure, synchronization (timing adjustment) for uplink transmission, and/or a request for a PUSCH resource.

In the PUCCH region, a plurality of PUCCHs is subjected to frequency, time, space, and/or code multiplexing. In the PUSCH region, a plurality of PUSCHs may be subjected to frequency, time, space, and/or code multiplexing. PUCCH and PUSCH may be subjected to frequency, time, space, and/or code multiplexing. PRACH may be disposed over a single subframe or two subframes. A plurality of PRACHs may be subjected code multiplexing <Uplink Physical Signal in the Present Embodiment>

UL-DMRS is associated with the transmission of PUSCH or PUCCH. UL-DMRS is subjected to time multiplexing with PUSCH or PUCCH. The base station apparatus 1 may use UL-DMRS to correct the propagation path of PUSCH or PUCCH. In the description of the present embodiment, transmitting PUSCH includes multiplexing PUSCH and UL-DMRS for transmission. In the description of the present embodiment, transmitting PUCCH includes multiplexing PUCCH and UL-DMRS for transmission.

SRS is not associated with the transmission of PUSCH or PUCCH. The base station apparatus 1 may use SRS to measure an uplink channel state.

SRS is transmitted by using the last symbol in an uplink subframe. That is, SRS is disposed in the last symbol in an uplink subframe. The terminal apparatus 2 is able to restrict the concurrent transmission of SRS and PUCCH, PUSCH and/or PRACH in a symbol of a certain cell. The terminal apparatus 2 is able to transmit PUSCH and/or PUCCH in a certain uplink subframe of a certain cell by using the symbols except for the last symbol in the uplink subframe, and transmit SRS by using the last symbol in the uplink subframe. That is, in a certain uplink subframe of a certain cell, the terminal apparatus 2 is able to transmit SRS, PUSCH, and PUCCH.

In SRS, a trigger type 0SRS and a trigger type 1SRS are defined as SRSs having different trigger types. The trigger type 0SRS is transmitted by higher-layer signaling in a case where a parameter regarding the trigger type 0SRS is set. The trigger type 1SRS is transmitted by higher-layer signaling in a case where a parameter regarding the trigger type 1SRS is set and is requested to be transmitted by an SRS request included in a DCI format 0, 1A, 2B, 2C, 2D, or 4. It should be noted that the SRS request is included in both FDD and TDD in the DCI format 0, 1A, or 4, and only in TDD in the DCI format 2B, 2C, or 2D. In a case where the trigger type 0SRS and the trigger type 1SRS are transmitted in the same subframe of the same serving cell, the transmission of the trigger type 1SRS is prioritized. The trigger type 0SRS is also referred to as periodic SRS. The trigger type 1SRS is also referred to as aperiodic SRS.

<Configuration Example of Base Station Apparatus 1 in the Present Embodiment>

Figure 8:
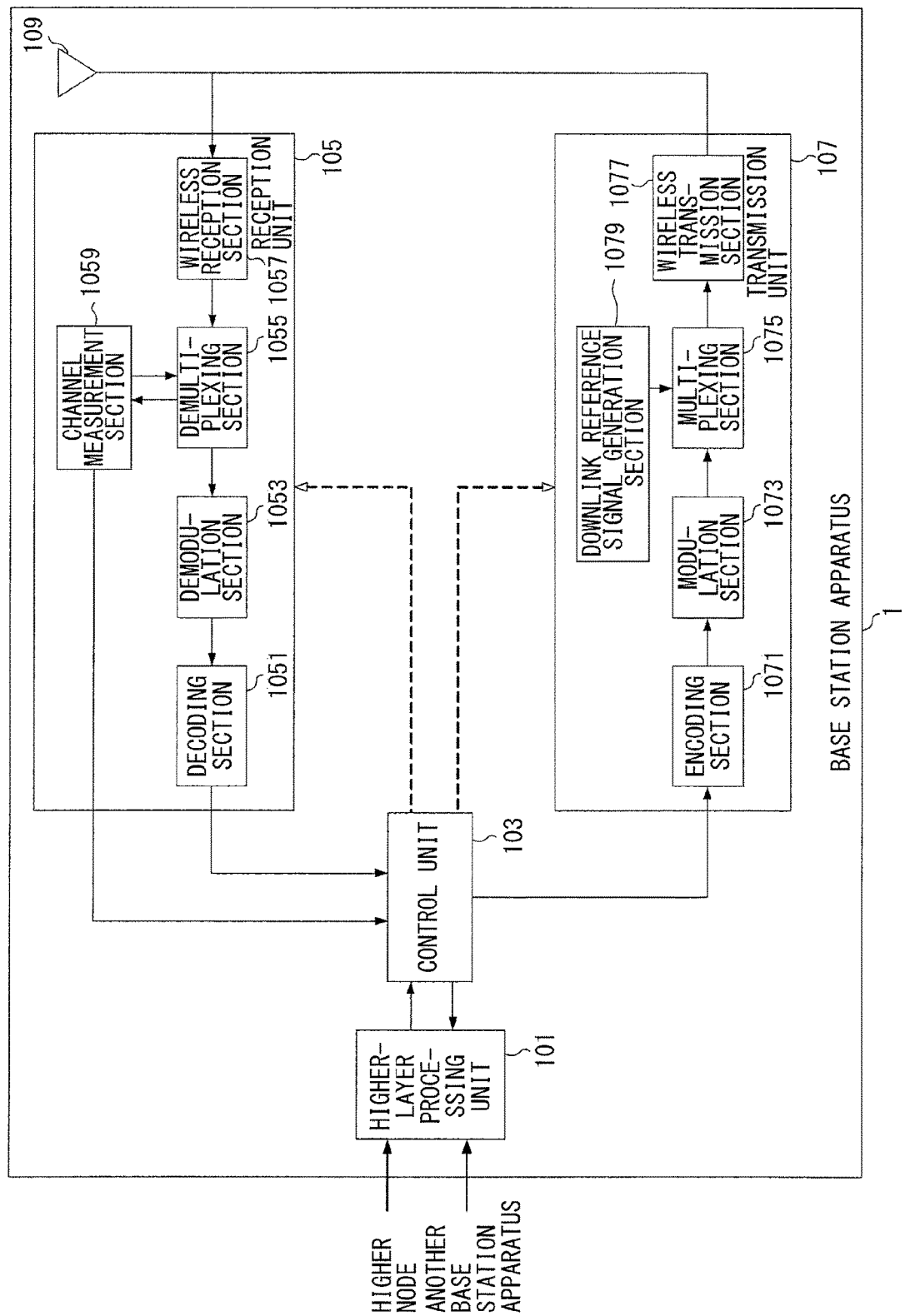
FIG. 8 is a schematic diagram illustrating a configuration of a base station apparatus according to the present embodiment.

FIG. 8 is a schematic diagram illustrating a configuration of the base station apparatus 1 according to the present embodiment. As illustrated in the diagram, the base station apparatus 1 includes a higher-layer processing unit 101, a control unit 103, a reception unit 105, a transmission unit 107, and a transmission/reception antenna 109. In addition, the reception unit 105 includes a decoding section 1051, a demodulation section 1053, a demultiplexing section 1055, a wireless reception section 1057, and a channel measurement section 1059. In addition, the transmission unit 107 includes an encoding section 1071, a modulation section 1073, a multiplexing section 1075, a wireless transmission section 1077, and a downlink reference signal generation section 1079.

As described above, the base station apparatus 1 is able to support one or more RATs. A portion or all of the components included in the base station apparatus 1 illustrated in FIG. 8 may be individually configured in accordance with RAT. For example, the reception unit 105 and the transmission unit 107 are configured individually in LTE and NR. In addition, in the NR cell, a portion or all of the components included in the base station apparatus 1 illustrated in FIG. 8 may be individually configured in accordance with a parameter set regarding a transmission signal. For example, in a certain NR cell, the wireless reception section 1057 and the wireless transmission section 1077 may be individually configured in accordance with a parameter set regarding a transmission signal.

The higher-layer processing unit 101 performs processing of a medium access control (MAC: Medium Access Control) layer, a packet data integration protocol (Packet Data Convergence Protocol: PDCP) layer, a radio link control (Radio Link Control: RLC) layer, and a radio resource control (Radio Resource Control: RRC) layer. In addition, the higher-layer processing unit 101 generates control information for controlling the reception unit 105 and the transmission unit 107, and outputs the control information to the control unit 103.

The control unit 103 controls the reception unit 105 and the transmission unit 107 on the basis of the control information from the higher-layer processing unit 101. The control unit 103 generates control information for the higher-layer processing unit 101, and outputs the control information to the higher-layer processing unit 101. The control unit 103 inputs a signal decoded from the decoding section 1051 and a channel estimation result from the channel measurement section 1059. The control unit 103 outputs a signal to be encoded to the encoding section 1071. In addition, the control unit 103 is used to control the whole or a portion of the base station apparatus 1.

The higher-layer processing unit 101 performs processing and management regarding RAT control, radio resource control, subframe setting, scheduling control, and/or CSI report control. The processing and management in the higher-layer processing unit 101 are performed for each terminal apparatus or equally on terminal apparatuses coupled to the base station apparatus. The processing and management in the higher-layer processing unit 101 may be performed by the higher-layer processing unit 101 alone, or may be acquired from a higher node or another base station apparatus. In addition, the processing and management in the higher-layer processing unit 101 may be performed individually in accordance with RAT. For example, the higher-layer processing unit 101 individually performs processing and management in LTE and processing and management in NR.

In the RAT control in the higher-layer processing unit 101, management regarding RAT is performed. For example, in the RAT control, management regarding LTE and/or management regarding NR is performed. The management regarding NR includes the setting and processing of a parameter set regarding a transmission signal in an NR cell.

In the radio resource control in the higher-layer processing unit 101, downlink data (transport block), system information, an RRC message (RRC parameter), and/or a MAC control element (CE: Control Element) is generated and/or managed.

In the subframe setting in the higher-layer processing unit 101, the subframe setting, the subframe pattern setting, the uplink-downlink setting, the uplink reference UL-DL setting, and/or the downlink reference UL-DL setting is managed. It should be noted that the subframe setting in the higher-layer processing unit 101 is also referred to as base station subframe setting. In addition, it is possible to determine the subframe setting in the higher-layer processing unit 101 on the basis of the amount of uplink traffic and the amount of downlink traffic. In addition, it is possible to determine the subframe setting in the higher-layer processing unit 101 on the basis of a scheduling result of the scheduling control in the higher-layer processing unit 101.

In the scheduling control in the higher-layer processing unit 101, the frequency and subframe to which a physical channel is allocated, the encoding rate and modulation scheme of a physical channel, the transmission power, and the like are determined on the basis of the received channel state information and the estimation value of a propagation path, the quality of a channel, and the like inputted from the channel measurement section 1059. For example, the control unit 103 generates control information (DCI format) on the basis of a scheduling result of the scheduling control in the higher-layer processing unit 101.

In the CSI report control in the higher-layer processing unit 101, the CSI report of the terminal apparatus 2 is controlled. For example, the setting regarding a CSI reference resource estimated for calculating CSI in the terminal apparatus 2 is controlled.

The reception unit 105 receives a signal transmitted from the terminal apparatus 2 via the transmission/reception antenna 109 under the control of the control unit 103, further performs reception processing such as demultiplexing, demodulating, and decoding, and outputs the information subjected to the reception processing to the control unit 103. It should be noted that the reception processing in the reception unit 105 is performed on the basis of the predefined setting or the setting of which the base station apparatus 1 notifies the terminal apparatus 2.

The wireless reception section 1057 performs conversion to an intermediate frequency (down-conversion), removes an unnecessary frequency component, controls the amplifying level to appropriately maintain the signal level, performs quadrature demodulation based on the in-phase component and quadrature component of the reception signal, converts an analogue signal to a digital signal, removes a guard interval (Guard Interval: GI), and/or extracts a frequency-domain signal by using fast Fourier transform (Fast Fourier Transform: FFT) for an uplink signal received via the transmission/reception antenna 109.

The demultiplexing section 1055 separates an uplink channel such as PUCCH or PUSCH and/or an uplink reference signal from a signal inputted from the wireless reception section 1057. The demultiplexing section 1055 outputs an uplink reference signal to the channel measurement section 1059. The demultiplexing section 1055 compensates a propagation path for the uplink channel from the estimation value of the propagation path inputted from the channel measurement section 1059.

The demodulation section 1053 demodulates a reception signal by using modulation schemes such as BPSK (Binary Phase Shift Keying), QPSK (Quadrature Phase shift Keying), 16 QAM (Quadrature Amplitude Modulation), 64 QAM, and 256 QAM for a modulation symbol of an uplink channel. The demodulation section 1053 separates and demodulates an uplink channel subjected to MIMO multiplexing.

The decoding section 1051 performs decoding processing on the encoding bits of the demodulated uplink channel. The decoded uplink data and/or uplink control information is outputted to the control unit 103. The decoding section 1051 performs decoding processing on PUSCH for each transport block.

The channel measurement section 1059 measures, for example, the estimation value of a propagation channel and/or the quality of a channel from the uplink reference signal inputted from the demultiplexing section 1055, and outputs the estimation value and/or the quality to the demultiplexing section 1055 and/or the control unit 103. For example, the channel measurement section 1059 measures the estimation value of a propagation path for compensating a propagation path for PUCCH or PUSCH by using UL-DMRS, and measures the quality of a channel in the uplink by using SRS.

The transmission unit 107 performs transmission processing such as encoding, modulation, and multiplexing on the downlink control information and downlink data inputted from the higher-layer processing unit 101 under the control of the control unit 103. For example, the transmission unit 107 generates and multiplexes PHICH, PDCCH, EPDCCH, PDSCH, and a downlink reference signal, and generates transmission signals. It should be noted that the transmission processing in the transmission unit 107 is performed on the basis of the predefined setting, the setting of which the base station apparatus 1 notifies the terminal apparatus 2, or the setting whose notification is issued through PDCCH or EPDCCH transmitted in the same subframe.

The encoding section 1071 encodes the HARQ indicator (HARQ-ACK), downlink control information, and downlink data inputted from the control unit 103 by using a predetermined coding scheme such as block coding, convolutional coding, and turbo coding. The modulation section 1073 modulates the encoding bits inputted from the encoding section 1071 in a predetermined modulation scheme such as BPSK, QPSK, 16 QAM, 64 QAM, 256 QAM, or the like. The downlink reference signal generation section 1079 generates a downlink reference signal on the basis of a physical cell identifier (PCI: Physical cell identification), an RRC parameter set in the terminal apparatus 2, and the like. The multiplexing section 1075 multiplexes modulation symbols of the respective channels and downlink reference signals, and disposes the modulation symbols and downlink reference signals in predetermined resource elements.

The wireless transmission section 1077 performs processing on a signal from the multiplexing section 1075 such as conversion into a signal in the time domain by using inverse fast Fourier transform (Inverse Fast Fourier Transform: IFFT), addition of a guard interval, generation of a baseband digital signal, conversion into an analogue signal, quadrature modulation, conversion from an intermediate frequency signal into a high frequency signal (up-conversion: up convert), removal of an extra frequency component, and amplification of power, and generates a transmission signal. The transmission signal outputted by the wireless transmission section 1077 is transmitted from the transmission/reception antenna 109.

<Configuration Example of Terminal Apparatus 2 in the Present Embodiment>

Figure 9:
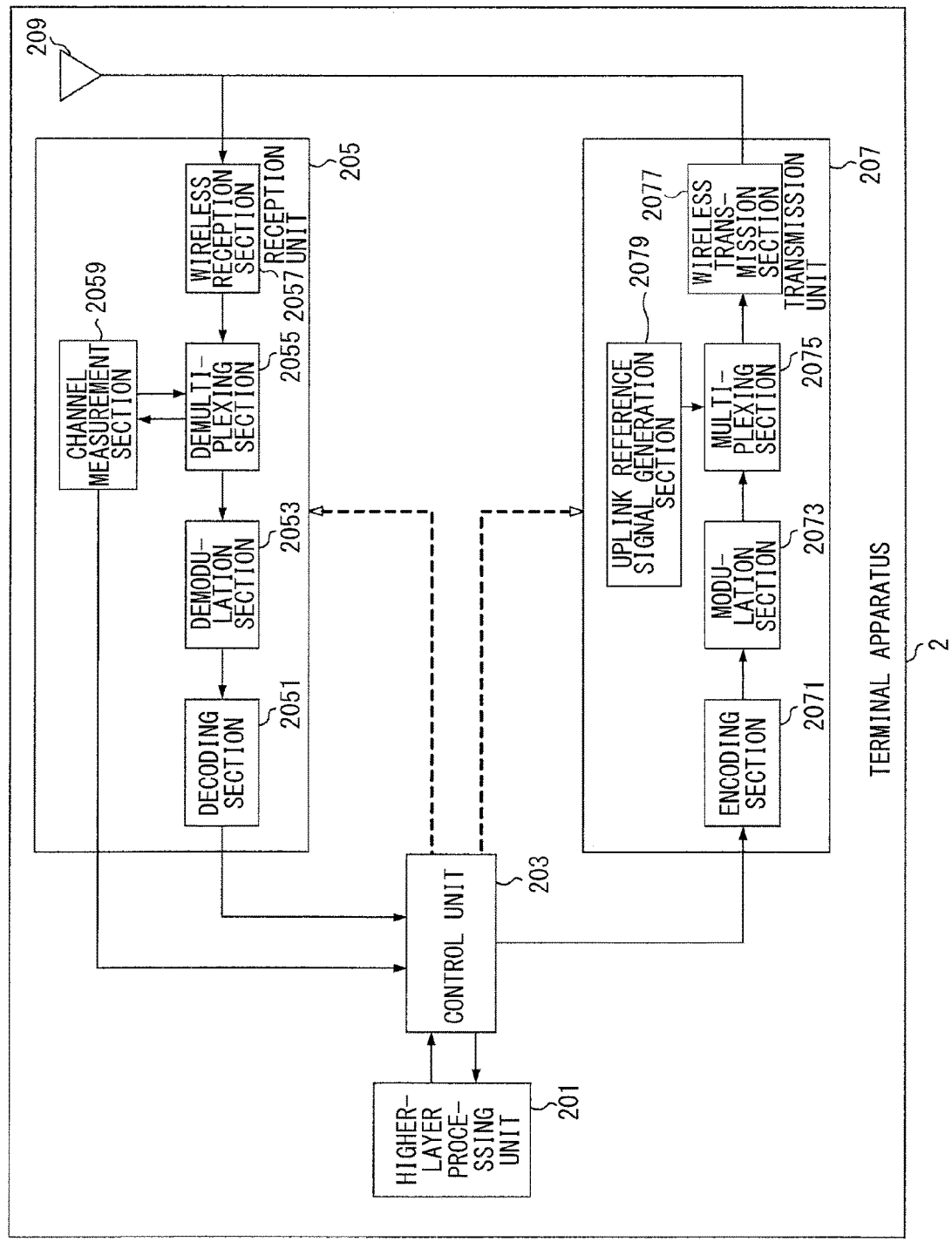
FIG. 9 is a schematic diagram illustrating a configuration of a terminal apparatus according to the present embodiment.

FIG. 9 is a schematic diagram illustrating a configuration of the terminal apparatus 2 according to the present embodiment. As illustrated in the diagram, the terminal apparatus 2 includes a higher-layer processing unit 201, a control unit 203, a reception unit 205, a transmission unit 207, and a transmission/reception antenna 209. In addition, the reception unit 205 includes a decoding section 2051, a demodulation section 2053, a demultiplexing section 2055, a wireless reception section 2057, and a channel measurement section 2059. In addition, the transmission unit 207 includes an encoding section 2071, a modulation section 2073, a multiplexing section 2075, a wireless transmission section 2077, and an uplink reference signal generation section 2079.

As described above, the terminal apparatus 2 is able to support one or more RATs. A portion or all of the components included in the terminal apparatus 2 illustrated in FIG. 9 may be individually configured in accordance with RAT. For example, the reception unit 205 and the transmission unit 207 are configured individually in LTE and NR. In addition, in the NR cell, a portion or all of the components included in the terminal apparatus 2 illustrated in FIG. 9 may be individually configured in accordance with a parameter set regarding a transmission signal. For example, in a certain NR cell, the wireless reception section 2057 and the wireless transmission section 2077 may be individually configured in accordance with a parameter set regarding a transmission signal.

The higher-layer processing unit 201 outputs uplink data (transport block) to the control unit 203. The higher-layer processing unit 201 performs processing of a medium access control (MAC: Medium Access Control) layer, a packet data integration protocol (Packet Data Convergence Protocol: PDCP) layer, a radio link control (Radio Link Control: RLC) layer, and a radio resource control (Radio Resource Control: RRC) layer. In addition, the higher-layer processing unit 201 generates control information for controlling the reception unit 205 and the transmission unit 207, and outputs the control information to the control unit 203.

The control unit 203 controls the reception unit 205 and the transmission unit 207 on the basis of the control information from the higher-layer processing unit 201. The control unit 203 generates control information for the higher-layer processing unit 201, and outputs the control information to the higher-layer processing unit 201. The control unit 203 inputs a signal decoded from the decoding section 2051 and a channel estimation result from the channel measurement section 2059. The control unit 203 outputs a signal to be encoded to the encoding section 2071. In addition, the control unit 203 may be used to control the whole or a portion of the terminal apparatus 2.

The higher-layer processing unit 201 performs processing and management regarding RAT control, radio resource control, subframe setting, scheduling control, and/or CSI report control. The processing and management in the higher-layer processing unit 201 are performed on the basis of the predefined setting and/or the setting based on control information that is set from the base station apparatus 1 or control information whose notification is issued from the base station apparatus 1. For example, the control information from the base station apparatus 1 includes an RRC parameter, a MAC control element, or DCI. In addition, the processing and management in the higher-layer processing unit 201 may be performed individually in accordance with RAT. For example, the higher-layer processing unit 201 individually performs processing and management in LTE and processing and management in NR.

In the RAT control in the higher-layer processing unit 201, management regarding RAT is performed. For example, in the RAT control, management regarding LTE and/or management regarding NR is performed. The management regarding NR includes the setting and processing of a parameter set regarding a transmission signal in an NR cell.

In the radio resource control in the higher-layer processing unit 201, the management of setting information in the own apparatus is performed. In the radio resource control in the higher-layer processing unit 201, uplink data (transport block), system information, an RRC message (RRC parameter), and/or a MAC control element (CE: Control Element) is generated and/or managed.

In the sub-frame setting in the higher-layer processing unit 201, the sub-frame setting in the base station apparatus 1 and/or a base station apparatus different from the base station apparatus 1 is managed. The subframe setting includes the setting of an uplink or downlink for a subframe, the subframe pattern setting, the uplink-downlink setting, the uplink reference UL-DL setting, and/or the downlink reference UL-DL setting. It should be noted that the subframe setting in the higher-layer processing unit 201 is also referred to as terminal subframe setting.

In the scheduling control in the higher-layer processing unit 201, control information for performing control regarding scheduling for the reception unit 205 and the transmission unit 207 is generated on the basis of the DCI (scheduling information) from the base station apparatus 1.

In the CSI report control in the higher-layer processing unit 201, control regarding a CSI report to the base station apparatus 1 is performed. For example, in the CSI report control, the setting regarding a CSI reference resource estimated for calculating CSI in the channel measurement section 2059 is controlled. In the CSI report control, a resource (timing) used to report CSI is controlled on the basis of DCI and/or an RRC parameter.

The reception unit 205 receives a signal transmitted from the base station apparatus 1 via the transmission/reception antenna 209 under the control of the control unit 203, further performs reception processing such as demultiplexing, demodulating, and decoding, and outputs the information subjected to the reception processing to the control unit 203. It should be noted that the reception processing in the reception unit 205 is performed on the basis of the pre-defined setting or the notification or setting from the base station apparatus 1.

The wireless reception section 2057 performs conversion to an intermediate frequency (down-conversion), removes an unnecessary frequency component, controls the amplifying level to appropriately maintain the signal level, performs quadrature demodulation based on the in-phase component and quadrature component of the reception signal, converts an analogue signal to a digital signal, removes a guard interval (Guard Interval: GI), and/or extracts a signal in the frequency domain by using fast Fourier transform (Fast Fourier Transform: FFT) for an uplink signal received via the transmission/reception antenna 209.

The demultiplexing section 2055 separates a downlink channel such as PHICH, PDCCH, EPDCCH, or PDSCH, a downlink synchronization signal, and/or a downlink reference signal from a signal inputted from the wireless reception section 2057. The demultiplexing section 2055 outputs a downlink reference signal to the channel measurement section 2059. The demultiplexing section 2055 compensates a propagation path for the downlink channel from the estimation value of the propagation path inputted from the channel measurement section 2059.

The demodulation section 2053 demodulates a reception signal by using a modulation scheme such as BPSK, QPSK, 16 QAM, 64 QAM, or 256 QAM for a modulation symbol of a downlink channel. The demodulation section 2053 separates and demodulates a downlink channel subjected to MIMO multiplexing.

The decoding section 2051 performs decoding processing on the encoding bits of the demodulated downlink channel. The decoded downlink data and/or downlink control information is outputted to the control unit 203. The decoding section 2051 performs decoding processing on PDSCH for each transport block.

The channel measurement section 2059 measures, for example, the estimation value of a propagation channel and/or the quality of a channel from the downlink reference signal inputted from the demultiplexing section 2055, and outputs the estimation value and/or the quality to the demultiplexing section 2055 and/or the control unit 203. The downlink reference signal used by the channel measurement section 2059 for measurement may be determined at least on the basis of a transmission mode set by using an RRC parameter and/or another RRC parameter. For example, the DL-DMRS measures the estimation value of a propagation path for compensating a propagation path for PDSCH or EPDCCH. The CRS measures the estimation value of a propagation path for compensating a propagation path for PDCCH or PDSCH and/or a downlink channel for reporting CSI. The CSI-RS measures a downlink channel for reporting CSI. The channel measurement section 2059 calculates RSRP (Reference Signal Received Power) and/or RSRQ (Reference Signal Received Quality) on the basis of CRS, CSI-RS, or a detection signal, and outputs the calculated RSRP and/or RSRQ to the higher-layer processing unit 201.

The transmission unit 207 performs transmission processing such as encoding, modulation, and multiplexing on the uplink control information and uplink data inputted from the higher-layer processing unit 201 under the control of the control unit 203. For example, the transmission unit 207 generates and multiplexes an uplink channel such as PUSCH or PUCCH and/or an uplink reference signal to generate a transmission signal. It should be noted that the transmission processing in the transmission unit 207 is performed on the basis of the predefined setting or the setting or notification from the base station apparatus 1.

The encoding section 2071 encodes the HARQ indicator (HARQ-ACK), uplink control information, and uplink data inputted from the control unit 203 by using a predetermined coding scheme such as block coding, convolutional coding, and turbo coding. The modulation section 2073 modulates the encoding bits inputted from the encoding section 2071 in a predetermined modulation scheme such as BPSK, QPSK, 16 QAM, 64 QAM, 256 QAM, or the like. The uplink reference signal generation section 2079 generates an uplink reference signal on the basis of an RRC parameter set in the terminal apparatus 2, and the like. The multiplexing section 2075 multiplexes modulation symbols of the respective channels and uplink reference signals, and disposes the modulation symbols and uplink reference signals in predetermined resource elements.

The wireless transmission section 2077 performs processing on a signal from the multiplexing section 2075 such as conversion into a signal in the time domain by using inverse fast Fourier transform (Inverse Fast Fourier Transform: IFFT), addition of a guard interval, generation of a baseband digital signal, conversion into an analogue signal, quadrature modulation, conversion from an intermediate frequency signal into a high frequency signal (up-conversion: up convert), removal of an extra frequency component, and amplification of power, and generates a transmission signal. The transmission signal outputted by the wireless transmission section 2077 is transmitted from the transmission/reception antenna 209.

<Signaling of Control Information in the Present Embodiment>

The base station apparatus 1 and the terminal apparatus 2 are each able to use various methods for signaling (notification, broadcasting, and setting) of control information. It is possible to signal control information in various layers (layers). Signaling control information includes physical-layer signaling that is signaling performed through the physical layer (layer), RRC signaling that is signaling performed through the RRC layer, MAC signaling that is signaling performed through the MAC layer, and the like. The RRC signaling is dedicated RRC signaling (Dedicated RRC signaling) that issues a notification of control information specific to the terminal apparatus 2, or common RRC signaling (Common RRC signaling) that issues a notification of control information specific to the base station apparatus 1. Signaling used by higher layer than the physical layer such as the RRC signaling and the MAC signaling is also referred to as higher-layer signaling.

The RRC signaling is achieved by signaling an RRC parameter. The MAC signaling is achieved by signaling a MAC control element. Physical layer signaling is achieved by signaling downlink control information (DCI: Downlink Control Information) or uplink control information (UCI: Uplink Control Information). The RRC parameter and the MAC control element are transmitted by using PDSCH or PUSCH. DCI is transmitted by using PDCCH or EPDCCH. UCI is transmitted by using PUCCH or PUSCH. The RRC signaling and the MAC signaling are used to signal semi-static (semi-static) control information, and are also referred to as quasi-static signaling. The physical-layer signaling is used to signal dynamic (dynamic) control information, and is also referred to as dynamic signaling. DCI is used to schedule PDSCH, PUSCH, or the like. UCI is used, for example, for a CSI report, an HARQ-ACK report, and/or a scheduling request (SR: Scheduling Request).

<Details of Downlink Control Information in the Present Embodiment>

A notification of DCI is issued by using a DCI format with a predefined field. A predetermined information bit of the field defined in the DCI format is mapped. The DCI issues a notification of downlink scheduling information, uplink scheduling information, sidelink scheduling information, a request for an aperiodic CSI report, or an uplink transmission power command.

The DCI format monitored by the terminal apparatus 2 depends on the transmission mode set for each serving cell. That is, a portion of the DCI format monitored by the terminal apparatus 2 is variable depending on the transmission mode. For example, the terminal apparatus 2 in which a downlink transmission mode 1 is set monitors the DCI format 1A and the DCI format 1. For example, the terminal apparatus 2 in which a downlink transmission mode 4 is set monitors the DCI format 1A and the DCI format 2. For example, the terminal apparatus 2 in which an uplink transmission mode 1 is set monitors the DCI format 0. For example, the terminal apparatus 2 in which the uplink transmission mode 2 is set monitors the DCI format 0 and the DCI format 4.

A notification of the control region in which the PDCCH for issuing a notification of the DCI for the terminal apparatus 2 is disposed is not issued, and the terminal apparatus 2 detects the DCI for the terminal apparatus 2 by blind decoding (blind detection). Specifically, the terminal apparatus 2 monitors a set of PDCCH candidates in the serving cell. Monitoring means that decoding is attempted for each PDCCH in the set by using all DCI formats to be monitored. For example, the terminal apparatus 2 attempts to decode all aggregation levels, PDCCH candidates, and DCI formats that may be transmitted to the terminal apparatus 2. The terminal apparatus 2 recognizes DCI (PDCCH) that is successfully decoded (detected) as DCI (PDCCH) for the terminal apparatus 2.

Cyclic redundancy check (CRC: Cyclic Redundancy Check) is added to the DCI. The CRC is used for DCI error detection and DCI blind detection. The CRC (CRC parity bit) is scrambled by using RNTI (Radio Network Temporary Identifier). On the basis of the RNTI, the terminal apparatus 2 detects whether or not the DCI is DCI for the terminal apparatus 2. Specifically, the terminal apparatus 2 descrambles the bits corresponding to the CRC by using predetermined RNTI, extracts CRC, and detects whether or not the corresponding DCI is correct.

The RNTI is defined or set in accordance with the purpose and application of DCI. The RNTI includes C-RNTI (Cell-RNTI), SPS C-RNTI (Semi Persistent Scheduling C-RNTI), SI-RNTI (System Information-RNTI), P-RNTI (Paging-RNTI), RA-RNTI (Random Access-RNTI), TPC-PUCCH-RNTI (Transmit Power Control-PUCCH-RNTI), TPC-PUSCH-RNTI (Transmit Power Control-PUSCH-RNTI), temporary C-RNTI, M-RNTI (MBMS (Multimedia Broadcast Multicast Services)-RNTI), eIMTA-RNTI, and CC-RNTI.

The C-RNTI and the SPS C-RNTI are RNTI specific to the terminal apparatus 2 in the base station apparatus 1 (cell), and are identifiers for identifying the terminal apparatus 2. The C-RNTI is used to schedule PDSCH or PUSCH in a certain subframe. The SPS C-RNTI is used to activate or release periodic scheduling of a resource for PDSCH or PUSCH. The control channel having CRC scrambled by using SI-RNTI is used to schedule SIB (System Information Block). The control channel having CRC scrambled by using P-RNTI is used to control paging. The control channel having CRC scrambled by using RA-RNTI is used to schedule a response to RACH. The control channel having CRC scrambled by using TPC-PUCCH-RNTI is used to control the power of PUCCH. The control channel having CRC scrambled by using TPC-PUSCH-RNTI is used to control the power of PUSCH. The control channel having CRC scrambled by using Temporary C-RNTI is used by a mobile station apparatus in which C-RNTI is not set or recognized. The control channel having CRC scrambled by using M-RNTI is used to schedule MBMS. The control channel having CRC scrambled by using eIMTA-RNTI is used to issue a notification of information regarding the TDD UL/DL setting of a TDD serving cell in the dynamic TDD (eIMTA). The control channel (DCI) having CRC scrambled by using CC-RNTI is used to issue a notification of the setting of a dedicated OFDM symbol in an LAA secondary cell. It should be noted that the DCI format may be scrambled by using the RNTIs described above, but also new RNTI.

The scheduling information (downlink scheduling information, uplink scheduling information, and sidelink scheduling information) includes information for performing scheduling in units of resource blocks or resource block groups as scheduling in the frequency domain. A resource block group is a set of consecutive resource blocks, and indicates the allocated resources for the terminal apparatus to be scheduled. The size of the resource block group depends on the system bandwidth.

<Details of Downlink Control Channel in the Present Embodiment>

DCI is transmitted by using a control channel such as PDCCH or EPDCCH. The terminal apparatus 2 monitors a set of PDCCH candidates and/or a set of EPDCCH candidates of one or more activated serving cells set by the RRC signaling. Here, the monitoring is an attempt to decode PDCCHs and/or EPDCCHs in sets corresponding to all the DCI formats to be monitored.

The set of PDCCH candidates or the set of EPDCCH candidates is also referred to as search space. As the search space, a shared search space (CSS) and a terminal-specific search space (USS) are defined. The CSS may be defined only for a search space regarding PDCCH.

The CSS (Common Search Space) is a search space that is set on the basis of a parameter specific to the base station apparatus 1 and/or a predefined parameter. For example, the CSS is a search space shared between a plurality of terminal apparatuses. Therefore, the base station apparatus 1 maps the control channel common to a plurality of terminal apparatuses to the CSS, thereby reducing resources for transmitting the control channel.

The USS (UE-specific Search Space) is a search space that is set by using a parameter that is at least specific to the terminal apparatus 2. Therefore, the USS is a search space specific to the terminal apparatus 2, and the USS allows the base station apparatus 1 to individually transmit a control channel specific to the terminal apparatus 2. This allows the base station apparatus 1 to efficiently map control channels specific to a plurality of terminal apparatuses.

The USS may be set to be shared between a plurality of terminal apparatuses. The common USS is set for a plurality of terminal apparatuses, and the parameters specific to the terminal apparatus 2 are thus set to have the same value between the plurality of terminal apparatuses. For example, the units set for the same parameters between the plurality of terminal apparatuses are cells, transmission points, groups of predetermined terminal apparatuses, or the like.

A search space for each aggregation level is defined by using a set of PDCCH candidates. Each PDCCH is transmitted by using a set of one or more CCEs (Control Channel Elements). The number of CCEs used for one PDCCH is also referred to as aggregation level. For example, the number of CCEs used for one PDCCH is 1, 2, 4, or 8.

A search space for each aggregation level is defined by using a set of EPDCCH candidates. Each EPDCCH is transmitted by using a set of one or more ECCEs (Enhanced Control Channel Elements). The number of ECCEs used for one EPDCCH is also referred to as aggregation level. For example, the number of CCEs used for one EPDCCH is 1, 2, 4, 8, 16, or 32.

The number of PDCCH candidates or the number of EPDCCH candidates is determined at least on the basis of the search space and the aggregation level. For example, in CSS, the number of PDCCH candidates at an aggregation level 4 is 4 and the number of PDCCH candidates at an aggregation level 8 is 2. For example, in USS, the number of PDCCH candidates at aggregation 1 is 6, the number of PDCCH candidates at aggregation 2 is 6, the number of PDCCH candidates at aggregation 4 is 2, and the number of PDCCH candidates at aggregation 8 is 2.

Each ECCE includes a plurality of EREGs (Enhanced Resource Element Groups). EREG is used to define mapping for an EPDCCH resource element. In each RB pair, 16 EREGs are defined that are numbered from 0 to 15. That is, EREG 0 to EREG 15 are defined in each RB pair. In each RB pair, the EREG 0 to EREG 15 are periodically defined, preferentially in the frequency direction, for resource elements other than resource elements to which predetermined signals and/or channels are mapped. For example, resource elements to which demodulating reference signals associated with EPDCCHs transmitted from the antenna ports 107 to 110 are mapped are not defined as EREGs.

The number of ECCEs used for one EPDCCH depends on the EPDCCH format, and is determined on the basis of another parameter. The number of ECCEs used for one EPDCCH is also referred to as aggregation level. For example, the number of ECCEs used for one EPDCCH is determined on the basis of the number of resource elements that are available to EPDCCH transmission in one RB pair, the EPDCCH transmission method, and the like. For example, the number of CCEs used for one EPDCCH is 1, 2, 4, 8, 16, or 32. In addition, the number of EREGs used for one ECCE is determined on the basis of the type of subframe and the type of cyclic prefix, and is 4 or 8. Distributed transmission (Distributed transmission) and localized transmission (Localized transmission) are supported as the EPDCCH transmission method.

The EPDCCH is able to use the distributed transmission or the localized transmission. The distributed transmission and the localized transmission differ in the mapping of ECCEs to EREG and an RB pair. For example, in the distributed transmission, one ECCE is configured by using EREGs of a plurality of RB pairs. In the local transmission, one ECCE is configured by using EREG of one RB pair.

The base station apparatus 1 performs the setting regarding EPDCCH for the terminal apparatus 2. The terminal apparatus 2 monitors a plurality of EPDCCHs on the basis of the setting from the base station apparatus 1. A set of RB pairs for the terminal apparatus 2 to monitor EPDCCHs may be set. The set of RB pairs is also referred to as EPDCCH set or EPDCCH-PRB set. It is possible to set one or more EPDCCH sets for the one terminal apparatus 2. Each EPDCCH set includes one or more RB pairs. In addition, it is possible to perform the setting regarding EPDCCH individually for each EPDCCH set.

The base station apparatus 1 is able to set a predetermined number of EPDCCH sets for the terminal apparatus 2. For example, it is possible to set up to two EPDCCH sets as an EPDCCH set 0 and/or an EPDCCH set 1. Each of the EPDCCH sets is able to include a predetermined number of RB pairs. Each EPDCCH set is included in one set of a plurality of ECCEs. The number of ECCEs including one EPDCCH set is determined on the basis of the number of RB pairs set as the EPDCCH set and the number of EREGs used for one ECCE. In a case where the number of ECCEs including one EPDCCH set is N, each EPDCCH set is included in ECCEs numbered from 0 to N−1. For example, in a case where the number of EREGs used for one ECCE is 4, an EPDCCH set including four RB pairs is included in 16 ECCEs.

<Details of CA and DC in the Present Embodiment>

A plurality of cells is set in the terminal apparatus 2, making it possible to perform multicarrier transmission. Communication in which the terminal apparatus 2 uses a plurality of cells is referred to as CA (Carrier Aggregation) or DC (Dual Connectivity). The contents described in the present embodiment are applicable to each or a portion of a plurality of cells set for the terminal apparatus 2. A cell set for the terminal apparatus 2 is also referred to as serving cell.

In CA, a plurality of serving cells to be set includes one primary cell (PCell: Primary Cell) and one or more secondary cells (SCell: Secondary Cell). For the terminal apparatus 2 supporting CA, one primary cell and one or more secondary cells may be set.

The primary cell is a serving cell in which an initial connection establishment (initial connection establishment) procedure has been performed, a serving cell in which a connection re-establishment (connection re-establishment) procedure has been started, or a cell designated as a primary cell in a handover procedure. The primary cell operates at a primary frequency. The secondary cell may be set in or after the establishment or re-establishment of connection. The secondary cell operates at a secondary frequency. It should be noted that the connection is also referred to as RRC connection.

DC is an operation in which the predetermined terminal apparatus 2 consumes radio resources provided from at least two different network points. The network points are a master base station apparatus (MeNB: Master eNB) and a secondary base station apparatus (SeNB: Secondary eNB). The dual connectivity means that the terminal apparatus 2 makes RRC connection by using at least two network points. In dual connectivity, the two network points may be coupled by a non-ideal backhaul (non-ideal backhaul).

In DC, the base station apparatus 1 coupled to at least S1-MME (Mobility Management Entity) and serving as a mobility anchor of a core network is referred to as master base station apparatus. In addition, the base station apparatus 1 that provides an additional radio resource to the terminal apparatus 2, but is not the master base station apparatus is referred to as secondary base station apparatus. The group of serving cells associated with the master base station apparatus is also referred to as master cell group (MCG: Master Cell Group). The group of serving cells associated with the secondary base station apparatus is also referred to as secondary cell group (SCG: Secondary Cell Group). It should be noted that the group of serving cells is referred to as cell group (CG).

In DC, the primary cell belongs to the MCG. In addition, in the SCG, a secondary cell corresponding to a primary cell is referred to as primary secondary cell (PSCell: Primary Secondary Cell). The PSCell (base station apparatus included in the pSCell) may support a function (capability or performance) equivalent to that of a PCell (base station apparatus included in the PCell). In addition, the PSCell may support only a portion of the functions of the PCell. For example, the PSCell may support a function of performing PDCCH transmission by using a search space different from that of CSS or USS. In addition, the PSCell may remain activated at all times. In addition, the PSCell is a cell that is able to receive PUCCH.

In DC, radio bearers (data radio bearers (DRBs: Date Radio Bearers) and/or signaling radio bearers (SRBs: Signaling Radio Bearers)) may be individually allocated in MeNB and SeNB. Respective duplex modes may be individually set for MCG (PCell) and SCG (PSCell). The MCG (PCell) and the SCG (PSCell) do not have to be synchronized with each other. That is, the frame boundary of the MCG and the frame boundary of the SCG do not have to match each other. For the MCG (PCell) and the SCG (PSCell), parameters (TAGs: Timing Advance Groups) for adjusting a plurality of timings may be independently set. In dual connectivity, the terminal apparatus 2 transmits the UCI corresponding to a cell in the MCG only in MeNB (PCell), and transmits the UCI corresponding to a cell in the SCG only in SeNB (pSCell). In the transmission of the respective UCIs, the transmission methods using PUCCH and/or PUSCH are applied in the respective cell groups.

PUCCH and PBCH (MIB) are transmitted only in PCell or PSCell. In addition, PRACH is transmitted only in PCell or PSCell unless a plurality of TAGs (Timing Advance Groups) is set between cells in the CG.

In PCell or PSCell, SPS (Semi-Persistent Scheduling) or DRX (Discontinuous Transmission) may be performed. In the secondary cell, the same DRX as that of the PCell or PSCell of the same cell group may be performed.

In the secondary cell, information/parameters regarding the setting of MAC are basically shared with the PCell or PSCell of the same cell group. A portion of the parameters may be set for each secondary cell. A portion of timers and counters may be applied only to the PCell or the PSCell.

In CA, a cell to which the TDD scheme is applied and a cell to which the FDD scheme is applied may be aggregated. In a case where a cell to which TDD is applied and a cell to which FDD is applied are aggregated, the present disclosure is applicable to any one of the cell to which TDD is applied or the cell to which FDD is applied.

The terminal apparatus 2 transmits, to the base station apparatus 1, information (supportedBandCombination) indicating a combination of bands in which CA and/or DC is supported by the terminal apparatus 2. For each of the combinations of bands, the terminal apparatus 2 transmits, to the base station apparatus 1, information indicating whether or not concurrent transmission and reception in the above-described plurality of serving cells in a plurality of different bands is supported.

<Details of Resource Allocation in the Present Embodiment>

The base station apparatus 1 is able to use a plurality of methods as a method of PDSCH and/or PUSCH resource allocation for the terminal apparatus 2. The method of resource allocation includes dynamic scheduling, semi-persistent scheduling, multi-subframe scheduling, and cross-subframe scheduling.

In the dynamic scheduling, one DCI performs resource allocation in one subframe. Specifically, PDCCH or EPDCCH in a certain subframe schedules PDSCH in the subframe. PDCCH or EPDCCH in a certain subframe schedules PUSCH in a predetermined subframe after that subframe.

In the multi-subframe scheduling, one DCI performs resource allocation in one or more subframes. Specifically, PDCCH or EPDCCH in a certain subframe schedules PDSCH in one or more subframes a predetermined number of subframes after that subframe. PDCCH or EPDCCH in a certain subframe schedules PUSCH in one or more subframes a predetermined number of subframes after that subframe. As the predetermined number, an integer greater than or equal to zero may be set. The predetermined number may be predefined or determined on the basis of physical layer signaling and/or RRC signaling. In multi-subframe scheduling, consecutive subframes may be scheduled, or subframes having a predetermined period may be scheduled. The number of subframes to be scheduled may be predefined or determined on the basis of physical layer signaling and/or RRC signaling.

In the cross-subframe scheduling, one DCI performs resource allocation in one subframe. Specifically, PDCCH or EPDCCH in a certain subframe schedules PDSCH in one subframe a predetermined number of subframes after that subframe. PDCCH or EPDCCH in a certain subframe schedules PUSCH in one subframe a predetermined number of subframes after that subframe. As the predetermined number, an integer greater than or equal to zero may be set. The predetermined number may be predefined or determined on the basis of physical layer signaling and/or RRC signaling. In cross-subframe scheduling, consecutive subframes may be scheduled, or subframes having a predetermined period may be scheduled.

In the semi-persistent scheduling (SPS), one DCI performs resource allocation in one or more subframes. The terminal apparatus 2 enables processing regarding the SPS and receives predetermined PDSCH and/or PUSCH on the basis of the setting regarding the SPS in a case where information regarding the SPS is set by the RRC signaling and the PDCCH or EPDCCH for enabling the SPS is detected. In a case where the terminal apparatus 2 detects PDCCH or EPDCCH for releasing the SPS when the SPS is enabled, the terminal apparatus 2 releases (disables) the SPS and stops receiving the predetermined PDSCH and/or PUSCH. The SPS may be released on the basis of a case where a predetermined condition is satisfied. For example, the SPS is released in a case where a predetermined number of pieces of empty transmission data are received. The empty transmission of data for releasing the SPS corresponds to MAC PDU (Protocol Data Unit) including zero MAC SDU (Service Data Unit).

Information regarding the SPS by the RRC signaling includes SPS C-RNTI that is RNTI of SPS, information regarding a period (interval) in which PDSCH is scheduled, information regarding a period (interval) in which PUSCH is scheduled, information regarding the setting for releasing the SPS, and/or the number of an HARQ process in the SPS. The SPS is supported only by the primary cell and/or the primary secondary cell.

<Frame Configuration of NR in the Present Embodiment>

Figure 10:
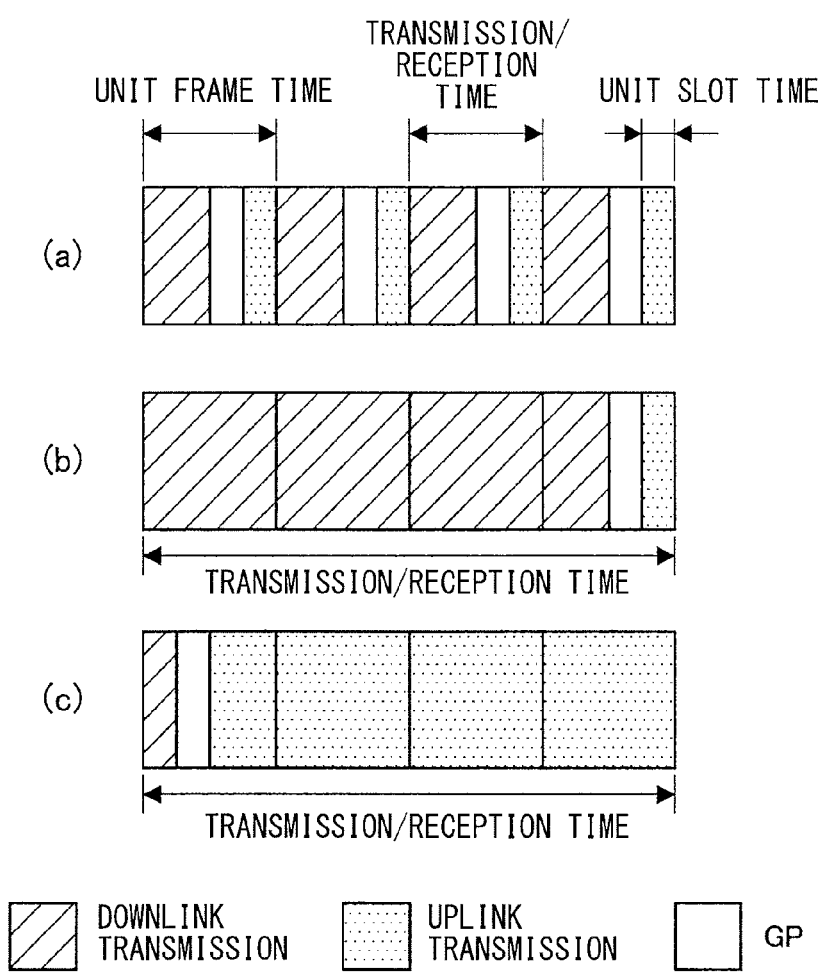
FIG. 10 is a diagram illustrating an example of a frame configuration of self-contained transmission in the present embodiment.

In NR, it is possible to transmit a physical channel and/or a physical signal by self-contained transmission (self-contained transmission). FIG. 10 illustrates an example of a frame configuration of self-contained transmission in the present embodiment. In the self-contained transmission, transmission and reception performed once includes consecutive downlink transmission, GP, and consecutive downlink transmission from the head in this order. The consecutive downlink transmission includes at least one piece of downlink control information and DMRS. The downlink control information issues an instruction to receive a downlink physical channel included in the consecutive downlink transmission or transmit an uplink physical channel included in the consecutive uplink transmission. In a case where the downlink control information issues an instruction to receive the downlink physical channel, the terminal apparatus 2 attempts to receive the downlink physical channel on the basis of the downlink control information. Then, the terminal apparatus 2 transmits success or failure in reception of the downlink physical channel (decoding success or failure) through an uplink control channel included in the uplink transmission allocated after the GP. Meanwhile, in a case where the downlink control information issues an instruction to transmit the uplink physical channel, the uplink physical channel to be transmitted on the basis of the downlink control information is included in the uplink transmission to be transmitted. In this manner, flexibly switching between the transmission of uplink data and the transmission of downlink data by the downlink control information makes it possible to take countermeasures instantaneously to increase or decrease a traffic ratio between an uplink and a downlink. Further, issuing a notification of the success or failure in the reception of the downlink in the immediately subsequent uplink transmission makes it possible to achieve low-delay communication of the downlink.

A unit slot time is a minimum time unit in which downlink transmission, GP, or uplink transmission is defined. The unit slot time is reserved for any of the downlink transmission, the GP, and the uplink transmission. In the unit slot time, both the downlink transmission and the uplink transmission are not included. The unit slot time may be a minimum transmission time of a channel associated with the DMRS included in the unit slot time. One unit slot time is defined as, for example, an integer multiple of a sampling interval ($T_s$) or symbol length of NR.

The unit frame time may be a minimum time designated by scheduling. The unit frame time may be a minimum time in which a transport block is transmitted. The unit slot time may be a maximum transmission time of a channel associated with the DMRS included in the unit slot time. The unit frame time may be a unit time in which the uplink transmission power in the terminal apparatus 2 is determined. The unit frame time may be referred to as subframe. The unit frame time has three types: only the downlink transmission; only the uplink transmission; and a combination of the uplink transmission and the downlink transmission. One unit frame time is defined as, for example, an integer multiple of the sampling interval ($T_s$), symbol length, or unit slot time of NR.

A transmission/reception time is a time of transmission and reception performed once. A time (gap) in which no physical channel or physical signal is transmitted is located between transmission and reception and another transmission and reception. The terminal apparatus 2 does not have to average CSI measurement between different transmissions and receptions. The transmission/reception time may be referred to as TTI. One transmission/reception time is defined as, for example, an integer multiple of the sampling interval ($T_s$), symbol length, unit slot time, or unit frame time of NR.

<Uplink RS of NR in the Present Embodiment>

The uplink RS in NR includes NR-SR-DMRS and the like.

An example of the NR-SRS is described below. It should be noted that it is possible to regard features that are not explicitly described as being similar to those of SRS in LTE.

The NR-SRS does not have to be transmitted in the last symbol in a subframe or a slot. For example, the NR-SRS may be transmitted in the first symbol or a middle symbol in a subframe or a slot.

The NR-SRSs may be transmitted consecutively in a plurality of symbols. For example, the NR-SRS may be transmitted in the several last symbols in a subframe or a slot.

As antennas for NR, a digital antenna configuration, an analogue antenna configuration, and a hybrid antenna configuration in which the digital antenna configuration and the analogue antenna configuration are combined are assumed.

Digital Antenna Configuration

The digital antenna configuration is a configuration in which an antenna weight is controlled by a digital circuit (baseband region) for each antenna element.

Figure 11:
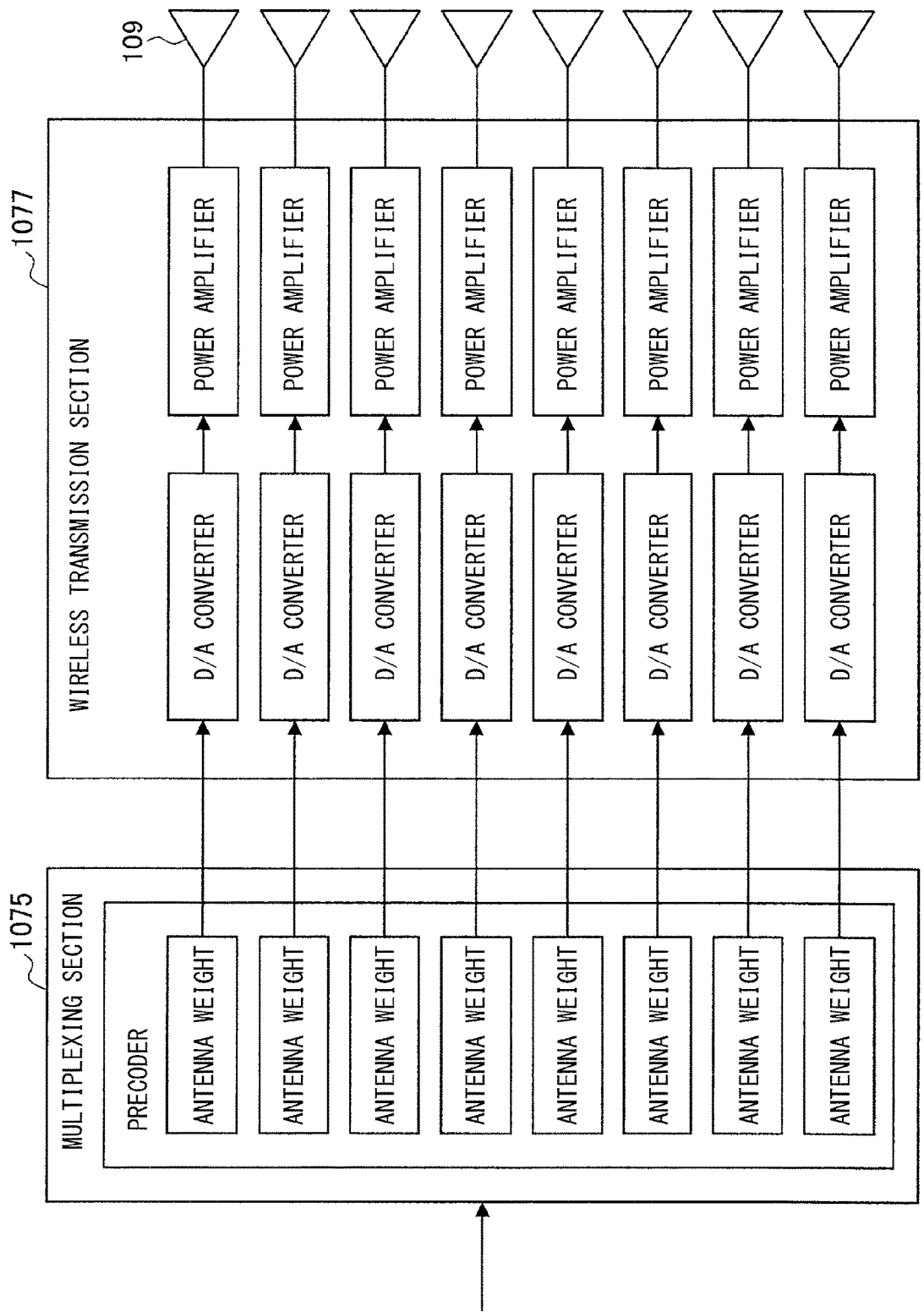
FIG. 11 is a schematic block diagram illustrating an example of a digital antenna configuration in the present embodiment.

FIG. 11 is a schematic block diagram illustrating an example of a digital antenna configuration in the present embodiment. FIG. 11 illustrates examples of the internal configurations of the multiplexing section 1075, the wireless transmission section 1077, and the transmission/reception antenna 109 in the configuration of the base station apparatus 1 illustrated in FIG. 8. It should be noted that processing unnecessary for the description of the antenna configuration is omitted, but each component has the function of performing the processing described in FIG. 8.

In the digital antenna configuration, the multiplexing section 1075 includes a precoder. In this precoder, each antenna element is multiplied by an antenna weight to form a beam.

In the digital antenna configuration, it is possible to perform flexible phase control on each antenna element, and generate different beams in the frequency domain. Meanwhile, the configuration is complicated.

Analogue Antenna Configuration

Figure 12:
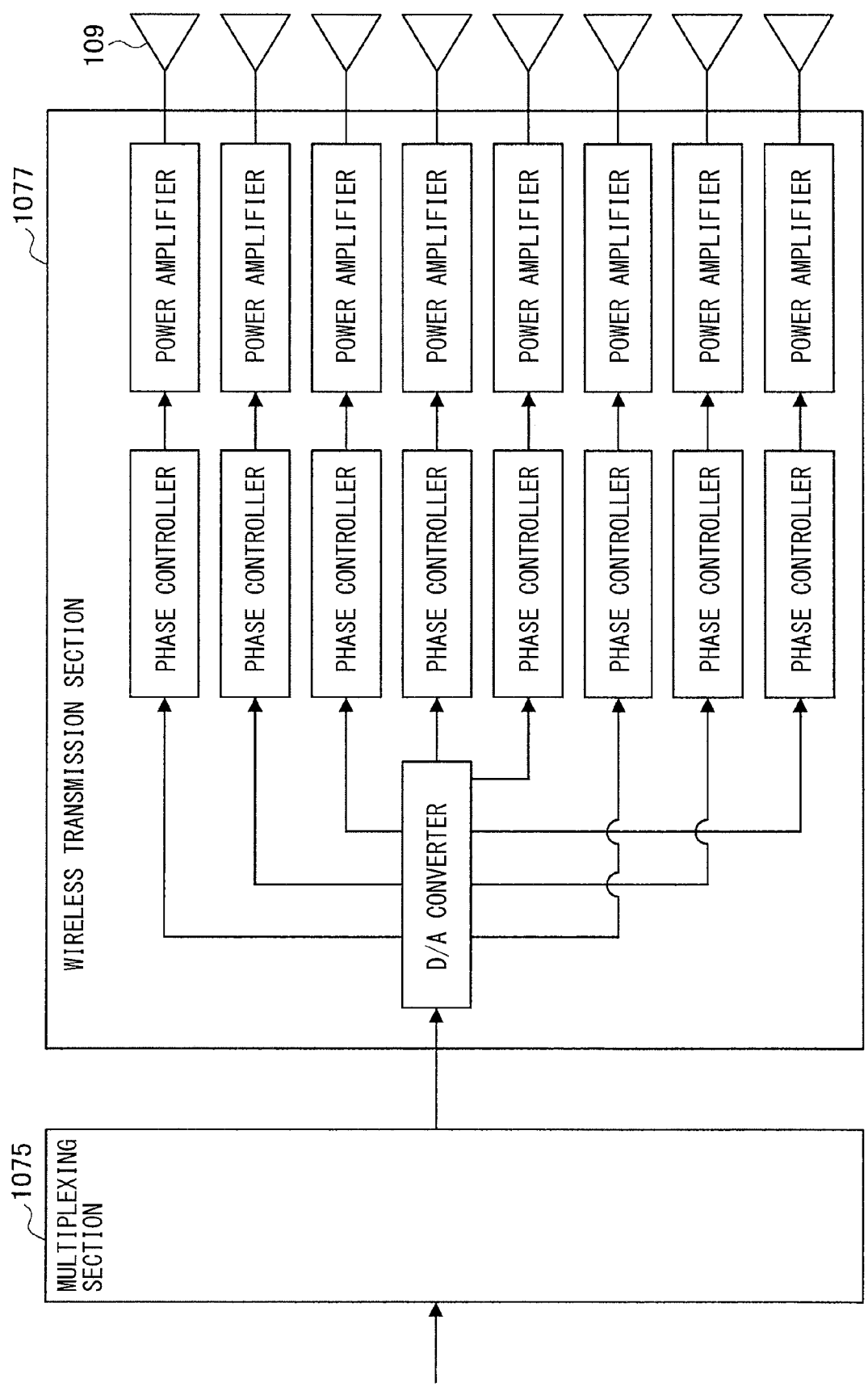
FIG. 12 is a schematic block diagram illustrating an example of an analogue antenna configuration in the present embodiment.

FIG. 12 is a schematic block diagram illustrating an example of an analogue antenna configuration in the present embodiment. Similarly to FIG. 11, FIG. 12 illustrates examples of the internal configurations of the multiplexing section 1075, the wireless transmission section 1077, and the transmission/reception antenna 109 in the configuration of the base station apparatus 1 illustrated in FIG. 8. It should be noted that processing unnecessary for the description of the antenna configuration is omitted, but each component has the function of performing the processing described in FIG. 8.

In the analogue antenna configuration, the wireless transmission section 1077 includes a phase controller. This phase controller rotates the phase in the analogue domain (RF domain) to form a beam.

Flexible beam control is difficult because the phase is controlled in the analogue domain, but the configuration is simple. As an example, the antenna switching configuration is a portion of the analogue antenna configuration.

Hybrid Antenna Configuration

The hybrid antenna configuration is a configuration in which the digital antenna configuration and the analogue antenna configuration are combined, and includes both a phase control element in the analogue domain and a phase control element in the digital domain. The hybrid antenna configuration has intermediate features between the digital configuration and the analogue antenna configuration in terms of beam forming performance and configuration complexity.

<Beam Operation Scheme for NR in the Present Embodiment>

In NR, two types of schemes are assumed: a single-beam operation and a multi-beam operation.

Single-Beam Operation

Figure 13:
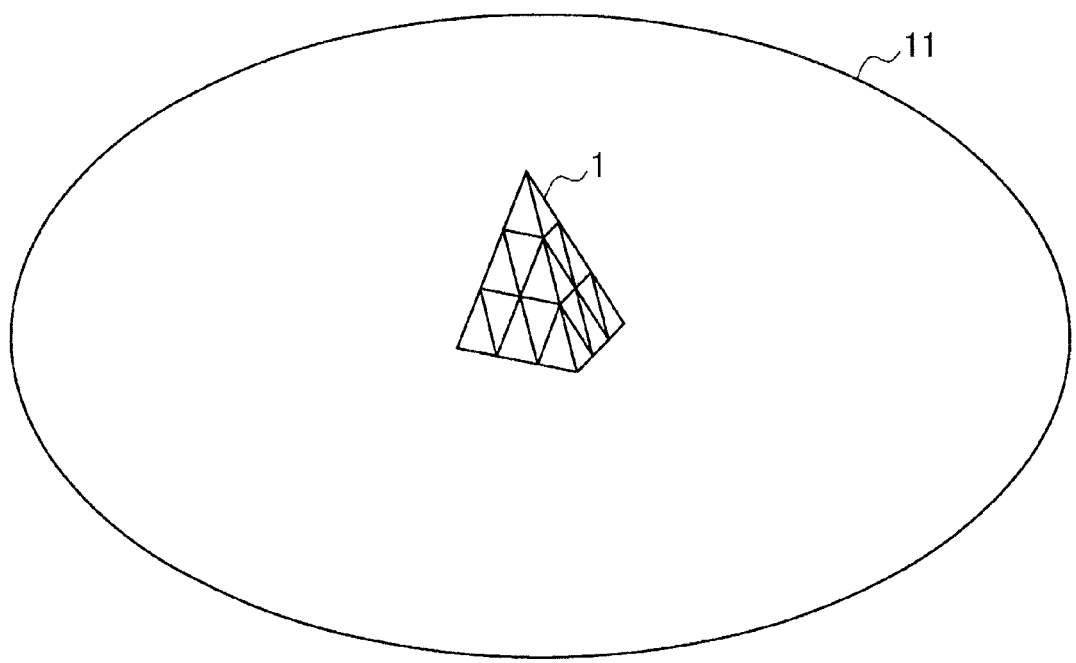
FIG. 13 is a diagram for describing an example of a single-beam operation in the present embodiment.

FIG. 13 is a diagram for describing an example of a single-beam operation in the present embodiment. In the example illustrated in FIG. 13, the base station apparatus 1 operates the cell 11 to communicate with the terminal apparatus 2 positioned within the cell coverage.

The single-beam operation is a scheme in which an operation is performed by using one beam for a predetermined cell coverage. Specifically, a cell-specific physical channel or physical signal is transmitted on one beam within a predetermined cell coverage. It is possible to regard LTE as a single-beam operation.

Multi-Beam Operation

Figure 14:
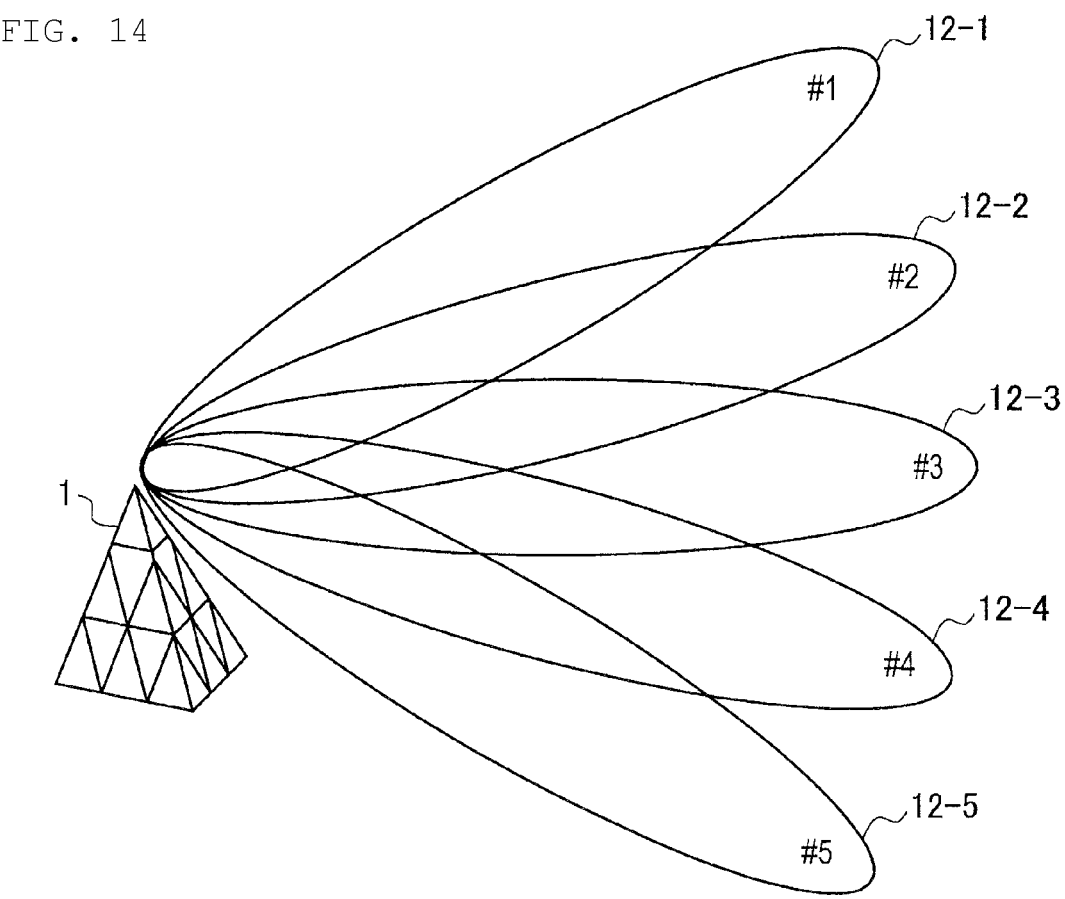
FIG. 14 is a diagram for describing an example of a multi-beam operation in the present embodiment.

FIG. 14 is a diagram for describing an example of a multi-beam operation in the present embodiment. In the example illustrated in FIG. 14, the base station apparatus 1 forms a plurality of beams 12-1 to 12-5 (beam IDs #1 to #5), and communicates with the terminal apparatus 2 positioned within the radiation range of each beam.

The multi-beam operation is a scheme in which an operation is performed by using one or more beams for a predetermined cell coverage. Specifically, a cell-specific physical channel or physical signal is transmitted on a plurality of beams.

For example, in analogue beam forming or hybrid beam forming, a beam in a predetermined direction is transmitted in a predetermined time instance, and it is difficult to transmit anything but the beam in the predetermined direction. This allows the base station apparatus 1 to switch the beams in a plurality of directions by switching time instances, and cover a wide area. That is, a predetermined beam on which a cell-specific physical channel or physical signal is transmitted is transmitted in one time instance (time resource). In different time instances, different beams are transmitted. In the multi-beam operation, an operation is performed by switching a plurality of beams in a plurality of time instances in this manner. Switching beams in the plurality of time instances is also referred to as beam sweep (beam sweep).

It should be noted that the multi-beam operation may be performed even in the digital antenna configuration.

In addition, a beam is replaceable with terms such as a channel, a path, an antenna, and an antenna port. That is, transmission using different beams may be referred to as transmission using different channels, paths, antennas, or antenna ports. Further, it is possible to consider a beam a virtual cell. It is possible for a terminal apparatus to recognize different beams transmitted from the same cell as different virtual cells or virtual carriers.

<Appropriate Beam Selection for NR in the Present Embodiment>

In NR, the system preferably selects the respective appropriate beams for the downlink and the uplink. Specifically, it is preferable to select respective appropriate beams as the downlink transmission beam of the base station apparatus and the downlink reception beam of the terminal apparatus. In addition, it is preferable to select respective appropriate beams as the uplink transmission beam of the terminal apparatus and the uplink reception beam of the base station apparatus.

The appropriate downlink transmission beam of the base station apparatus is acquirable on the basis of a report or feedback from the receiving terminal apparatus. The following describes an example of a process of acquiring the appropriate downlink transmission beam. The base station apparatus transmits predetermined known signals a plurality of times by using different downlink transmission beams. The terminal apparatus determines an appropriate downlink transmission beam from the known signals transmitted a plurality of times on the basis of reception strength, reception quality, or the like, and reports or feeds back information corresponding to the appropriate downlink transmission beam to the base station apparatus. This allows the base station apparatus to recognize the appropriate downlink transmission beam. Here, the known signals include NR-SS, MRS, BRS, NR-CSI-RS, NR-DM-RS, and the like.

Alternatively, the appropriate downlink transmission beam of the base station apparatus is acquirable on the basis of the appropriate uplink reception beam of the base station apparatus.

The appropriate uplink transmission beam of the terminal apparatus is acquirable on the basis of a report or feedback from the receiving base station apparatus. The following describes an example of a process of acquiring the appropriate uplink transmission beam. The terminal apparatus transmits predetermined known signals a plurality of times by using different uplink transmission beams. The base station apparatus determines an appropriate uplink transmission beam from the known signals transmitted a plurality of times on the basis of reception strength, reception quality, or the like, and reports information corresponding to the appropriate uplink transmission beam to the terminal apparatus or notifies the terminal apparatus of information corresponding to the appropriate uplink transmission beam. This allows the terminal apparatus to recognize the appropriate uplink transmission beam. Here, the known signals include NR-PRACH, NR-SRS, NR-DM-RS, and the like.

Alternatively, the appropriate uplink transmission beam of the terminal apparatus is acquirable on the basis of the appropriate downlink reception beam of the terminal apparatus.

<Access Procedure of Unlicensed Channel>

A channel access (Channel access or Listen before Talk) procedure is performed to access an unlicensed channel for transmission in the base station apparatus or the terminal apparatus.

In the channel access procedure, a channel is sensed once or more. On the basis of a result of the sensing, a determination (vacancy determination) is made as to whether the channel is idle (idle, unoccupied, available, or enable) or busy (busy, occupied, unavailable, or disable). In sensing a channel, the power of the channel for a predetermined waiting time is sensed (sense).

Examples of the waiting time of the channel access procedure include a first waiting time (slot), a second waiting time, and a third waiting time (defer period), and a fourth waiting time.

The slot is a unit of a waiting time of the base station apparatus and the terminal apparatus in the channel access procedure. The slot is defined, for example, as 9 microseconds.

In the second waiting time, one slot is inserted at the head. The second waiting time is defined, for example, as 16 microseconds.

The defer period (defer period) includes the second waiting time and a plurality of consecutive slots following the second waiting time. The number of the plurality of consecutive slots following the second waiting time is determined on the basis of a priority class (priority class) used to satisfy QoS.

The fourth waiting time includes the second waiting time and one slot subsequent thereto.

The base station apparatus or the terminal apparatus sense (sense) a predetermined channel in the period of a predetermined slot. In a case where the power sensed by the base station apparatus or the terminal apparatus for at least 4 microseconds within the predetermined slot period is less than a predetermined power detection threshold, the predetermined slot is considered idle (idle). In contrast, in a case where the power is greater than the predetermined power detection threshold, the predetermined slot is considered busy (busy).

The channel access procedure includes a first channel access procedure and a second channel access procedure. The first channel access procedure, the first channel access procedure is performed by using a plurality of slots and a defer period. The second channel access procedure is performed by using one fourth waiting time.

<Details of First Channel Access Procedure>

In the first channel access procedure, the steps described below are performed.

(0) A channel is sensed in the defer period. In a case where the channel is idle in a slot within the defer period, the step proceeds to step (1). If not, the step proceeds to step (6).

(1) The initial value of a counter is acquired. The initial value of the counter may be an integer between 0 and a contention window CW. The initial value of the counter is determined randomly in accordance with a uniform distribution. The initial value of the counter is set in a counter N, and the step proceeds to step (2).

(2) In a case where the counter N is greater than 0 and it is selected to subtract the counter N, one is subtracted from the counter N. Thereafter, the step proceeds to step (3).

(3) A period of a slot is added and waiting is performed. In addition, in the additional slot, a channel is sensed. In a case where the additional slot is idle, the step proceeds to step (4). If not, the step proceeds to step (5).

(4) In a case where the counter N is 0, this procedure is stopped. If not, the step proceeds to step (2).

(5) A defer period is added and waiting is performed. In addition, a channel is sensed until busy is detected in any one of the slots included in the additional defer period, or until it is possible to detect all slots included in the additional defer period as idle. Thereafter, the step proceeds to step (6).

(6) In a case where the channels are sensed to be idle in all of the slots included in the additional defer period, the step proceeds to step (4). If not, the step proceeds to step (5).

After step (4) in the procedure described above is stopped, the transmission including the data such as PDSCH and PUSCH is performed in the channel.

It should be noted that, after step (4) in the procedure described above is stopped, the transmission does not have to be performed in the channel. In this case, thereafter, in a case where the channels are idle in all of the slots and defer periods immediately before the transmission, the transmission may be performed without performing the procedure described above. In contrast, in a case where the channel is not idle in any of the slot and defer period, the channels are sensed to be idle in all of the slots within the additional defer period, and then the step proceeds to step (1) of the procedure described above.

<Details of Second Channel Access Procedure>

In the second channel access procedure, transmission may be performed immediately after the channel is considered idle as a result of sensing at least the fourth waiting time. In contrast, in a case where the channel is not considered idle as a result of sensing at least the fourth waiting time, no transmission is performed.

<Contention Window Adaptation Procedure>

The contention window CW (contention window) used in the first channel access procedure is determined on the basis of a contention window adaptation procedure.

The value of the contention window CW is retained for each priority class. In addition, the contention window CW takes a value between the minimum contention window and the maximum contention window. The minimum contention window and the maximum contention window are determined on the basis of the priority class.

The adjustment of the value of the contention window CW is made before step (1) of the first channel access procedure. In a case where the percentage of NACK in an HARQ response corresponding to a shared channel of a reference subframe or a reference HARQ process in at least the contention window adaptation procedure is higher than a threshold, the value of the contention window CW is increased. If not, the value of the contention window CW is set at the minimum contention window.

The value of the contention window CW is increased, for example, on the basis of an expression of $CW=2\cdot(CW+1)-1$.

<Details of Channel Access Procedure in Downlink>

In a case where downlink transmission including PDSCH, PDCCH, and/or EPDCCH is performed in an unlicensed channel, the base station apparatus accesses the channel and performs the downlink transmission on the basis of the first channel access procedure.

In contrast, in a case where downlink transmission including DRS, but not PDSCH is performed in the unlicensed channel, the base station apparatus accesses the channel and performs the downlink transmission on the basis of the second channel access procedure. It should be noted that the period of the downlink transmission is preferably smaller than 1 millisecond.

<Details of Channel Access Procedure in Uplink>

In a case where an instruction is issued in the unlicensed channel to perform the first channel access procedure in an uplink grant for scheduling PUSCH, the terminal apparatus performs the first channel access procedure before uplink transmission including the PUSCH.

In addition, in a case where an instruction is issued to perform the second channel access procedure in an uplink grant for scheduling PUSCH, the terminal apparatus performs the second channel access procedure before uplink transmission including the PUSCH.

In addition, for uplink transmission that does not include PUSCH, but includes SRS, the terminal apparatus performs the second channel access procedure before the uplink transmission.

In addition, in a case where the end of the uplink transmission indicated in the uplink grant is within the uplink period (UL duration), the terminal apparatus performs the second channel access procedure before the uplink transmission regardless of the procedure type indicated in the uplink grant.

In a case where the uplink transmission is continued with the fourth waiting time interposed therebetween after the downlink transmission from the base station is completed, the terminal apparatus performs the second channel access procedure before the uplink transmission.

<Channel Access Procedure of NR in the Present Embodiment>

In a channel access procedure in an unlicensed channel using NR, channel sensing that is not beam formed and channel sensing that is beam formed are performed.

The channel sensing that is not beam formed is channel sensing by reception with uncontrolled directivity or channel sensing having no direction information. The channel sensing having no direction information is, for example, channel sensing in which results of measurement are averaged in all directions. The transmitting station does not have to recognize the directivity (angle and direction) used in channel sensing.

The channel sensing that is beam formed is channel sensing by reception with controlled directivity or channel sensing having direction information. That is, it is channel sensing in which a reception beam is pointed in a predetermined direction. A transmitting station having a function of performing channel sensing that is beam formed is able to perform channel sensing once or more by using different directivities.

Performing channel sensing that is beam formed narrows the area to be detected by the sensing. This allows the transmitting station to reduce the frequency of detection of non-interfering communication links and alleviate the exposed terminal problem.

The following lists the differences between channel sensing that is not beam formed and channel sensing that is beam formed.

The channel sensing that is not beam formed and the channel sensing that is beam formed are different in bandwidths in which they are applied. The channel sensing that is not beam formed is applied in all frequency sharing bands. The channel sensing that is beam formed is applied primarily in the frequency sharing band such as the 60-GHz band higher than or equal to the 6-GHz band.

The channel sensing that is not beam formed and the channel sensing that is beam formed are different in transmission after the acquisition of channel access right. With respect to the channel sensing that is not beam formed, the transmitting station performs the channel sensing that is not beam formed before performing broadcast transmission or unicast transmission that is not beam formed. With respect to the channel sensing that is beam formed, the transmitting station performs channel sensing that is beam formed before performing unicast transmission that is beam formed.

The channel sensing that is not beam formed and the channel sensing that is beam formed have different power detection thresholds for sensing. The channel sensing that is not beam formed has a lower power detection threshold. The channel sensing that is beam formed has a higher power detection threshold.

<RRM Measurement in the Present Embodiment>

Information of RRM (Radio Resource Management) measurement is used to determine handover, radio resource control, and the like.

The RRM measurement is performed in the base station apparatus and the terminal apparatus. A measurement result of the RRM measurement measured by the terminal apparatus is reported to the base station apparatus.

In the RRM measurement, the signal power intensity and the quality of communication between the base station apparatus and the terminal apparatus are measured. Specifically, RSRP (Reference Signal Received Power), RSRQ (Reference Signal Received Quality), RSSI (Received Signal Strength Indicator), SINR (Signal to Interference plus Noise Ratio), and the like are measured. The RSRP is mainly used for determining the quality of communication from the base station apparatus, measuring path loss, and the like. The RSRQ and the SINR are mainly used for determining the quality of communication with the base station apparatus, and the like. The RSSI is mainly used for measuring interference in the radio resource, and the like.

The RSRP is the received power of a predetermined reference signal. The predetermined reference signal may be, for example, SSS, DMRS associated with PBCH, CSI-RS transmitted from a predetermined antenna port, or the like. The RSRP is defined, for example, as the received power of one resource element.

The RSSI is the average power of the total received power measured in a predetermined period. The RSSI includes all received power such as a serving cell and a non-serving cell, adjacent-channel interference, or thermal noise. The RSSI is defined as the received power of one OFDM symbol.

The RSRQ is defined as the ratio between the RSRP and the RSSI. Specifically, the RSRQ is the value obtained by dividing the RSRP by the RSSI. It should be noted that the RSRQ may be defined as a value obtained by multiplying the value described above by the number of resource blocks, the number of resource elements, or the like whose RSSI has been measured.

The SINR is defined as the ratio between the received power from a predetermined base station apparatus and the received power from what is other than the predetermined base station apparatus.

<CSI Measurement in the Present Embodiment>

Information of CSI (Channel State Information) measurement is used to schedule a resource and determine MCS (Modulation and Coding Scheme) or the like of a physical channel.

The CSI measurement is performed in the terminal apparatus. A measurement result of the CSI measurement measured by the terminal apparatus is fed back to the base station apparatus.

CSI is measured from CSI-RS. The terminal apparatus estimates the channel between the base station apparatus and the terminal apparatus from the reception quality of the CSI-RS, and calculates the CSI.

In the CSI measurement, channel quality, precoding and/or beam, a MIMO layer, or the like is measured. Specifically, feedback information such as CQI (Channel Quality Indicator), PMI (Precoding Matrix Indicator), RI (Rank Indicator), or CRI (CSI-RS resource indicator) is generated by the CSI measurement.

The CQI is information regarding the channel quality for a predetermined layer. The CQI is defined by a combination of a modulation scheme and a coding rate. The terminal apparatus calculates CQI corresponding to MCS that satisfies a predetermined target error rate (e.g., 10%), and feeds back the CQI to the base station apparatus. The base station apparatus determines the MCS of the physical channel on the basis of the CQI fed back.

The PMI is information regarding the precoding matrix. The terminal apparatus calculates the PMI that designates the appropriate precoding matrix, and feeds back the PMI to the base station apparatus. The base station apparatus determines a precoding matrix to be used for transmitting the physical channel on the basis of the fed back PMI.

The RI is information regarding the rank of the channel. The terminal apparatus calculates the RI that designates the communicable rank and feeds back the RI to the base station apparatus. The base station apparatus determines the number of layers of the physical channel on the basis of the RI fed back.

The CRI is information regarding the CSI-RS resource. It is possible to regard the CRI as information regarding a predetermined beam.

In the CSI measurement, management and control are performed in units referred to as CSI processes. It is possible to provide each CSI process with a resource of a signal to be measured and a resource of interference to be measured. This makes it possible to measure CSI in various environments. For example, setting the resources of the reference signals transmitted from different base station apparatuses for the respective CSI processes makes it possible to measure the CSIs with different base station apparatuses without switching the cell coupling. For example, setting the resources of the different interference states for the respective CSI processes makes it possible to measure the CSI in CoMP (Coordinated Multiple Point transmission).

2. TECHNICAL FEATURES

Next, the technical features according to the embodiment of the present disclosure are described.

LBT (Listen Before Talk) measured by the transmitting station alone does not makes it possible to accurately determine whether or not the receiving station has interference. In particular, the following two problems are mentioned. One of them is the hidden terminal problem (hidden node problem). This hidden terminal problem is a problem in which the transmitting station is not able to detect another interfering communication link, but starts transmission. The transmitting station is unable to detect another interfering communication link, but starts transmission, and as a result, the communication links have contention, causing the other communication links to have significant interference. The other is the exposed terminal problem (expose node problem). The exposed terminal problem is a problem in which the transmitting station detects another non-interfering communication link and stops transmission. The transmitting station detects another non-interfering communication link and stops transmission, and as a result, the spatial reuse is lowered, causing the system efficiency to be lowered.

In the existing communication systems, RRM (Radio Resource Management) measurement and CSI (Channel State Information) measurement are performed as the measurement of the quality of communication between a transmitting station and a receiving station. However, in the existing communication systems, basically only the operation of measuring the received power from all directions is used in the measurement in the terminal.

Therefore, in view of the points described above, the discloser of the present application has intensively studied technology that allows a transmitting station to accurately determine whether or not a receiving station has interference. As a result, the discloser of the present application has devised the technology that allows a transmitting station to accurately determine whether or not a receiving station has interference, by further measuring information regarding a direction in addition to the received power in the receiving station, as described below.

Specifically, the receiving station (terminal apparatus 2) according to the present embodiment measures not only the received power, but also information regarding a direction. That is, the receiving station measures from which direction radio waves come, and how intense the radio waves are. The receiving station then feeds back a result of the measurement to the transmitting station (base station apparatus 1 or terminal apparatus 2) according to the present embodiment. The feedback from the receiving station allows the transmitting station according to the present embodiment to grasp interference from which direction the receiving station is more resistant or less resistant.

The transmitting station according to the present embodiment is able to perform at least the two following processes on the basis of a result of the measurement. The first one is to switch between beam link pairs (BLPs or combinations of a transmission beam and a reception beam). As a specific example, in a case where an adjacent node reports that the interference from another communication link is large when transmission is performed in a predetermined beam link pair, the transmitting station according to the present embodiment changes the direction of the transmission beam by switching the beam link pair to a beam link pair having a small amount of interference. This allows the transmitting station according to the present embodiment to reduce interference and reduce the effects of the hidden terminal problem. The second one is to ignore transmissions from a predetermined transmitting station even if the transmission is detected in LBT. As a specific example, in a case where the transmitting station is able to detect transmission, for example, by detecting RS from an adjacent node, and receives a report indicating that interference from a predetermined beam of the adjacent node is small, the transmitting station according to the present embodiment performs LBT on the assumption that the power of the adjacent node is not detected. This allows the transmitting station according to the present embodiment to perform transmission without determining that it is busy. That is, the transmitting station according to the present embodiment eliminates the unnecessary reduction in transmission opportunities, making it possible to solve the exposed terminal problem.

Figure 15:
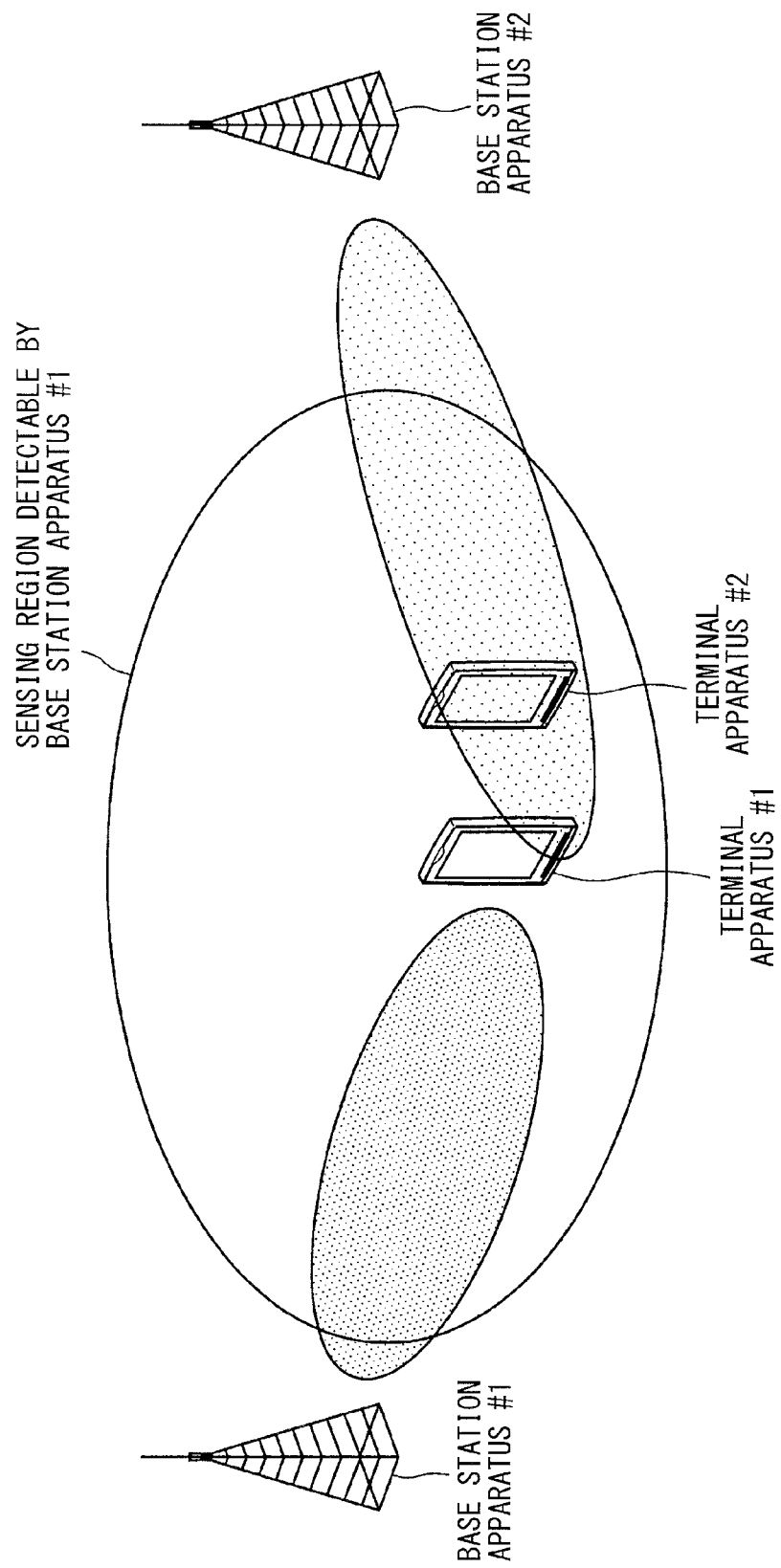
FIG. 15 is an explanatory diagram illustrating a sensing region that allows a base station apparatus to detect a terminal apparatus, and a beam received by a terminal apparatus present in the sensing region.
Figure 16:
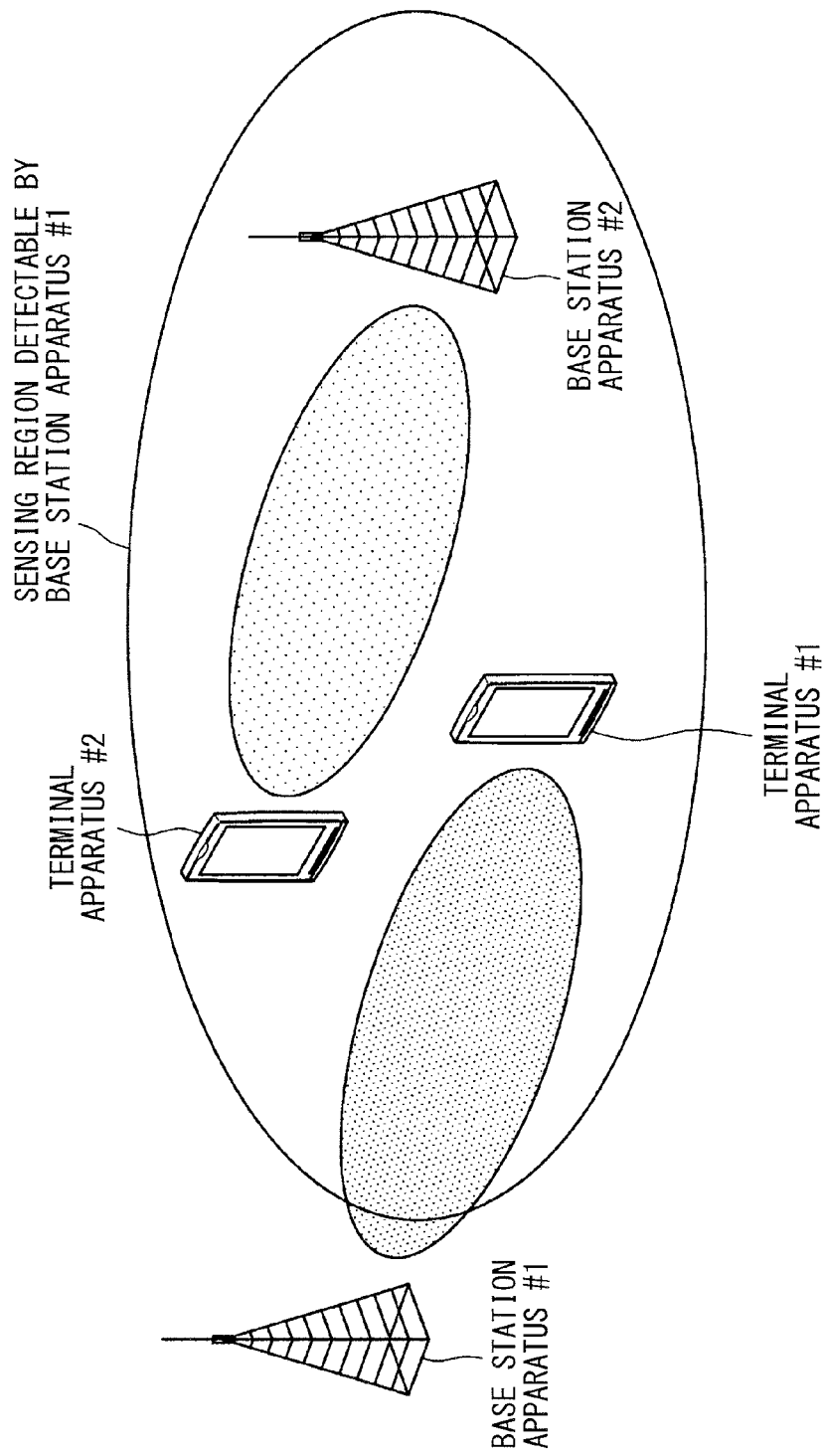
FIG. 16 is an explanatory diagram illustrating the sensing region that allows the base station apparatus to detect the terminal apparatus, and the beam received by the terminal apparatus present in the sensing region.

Each of FIGS. 15 and 16 is an explanatory diagram illustrating the sensing region that allows the base station apparatus to detect the terminal apparatus, and the beam received by the terminal apparatus present in the sensing region. In these diagrams, it is assumed that a base station apparatus #1 and a terminal apparatus #1 are linked to each other, and a base station apparatus #2 and a terminal apparatus #2 are linked to each other.

FIG. 15 illustrates that the terminal apparatus #1 and the terminal apparatus #2 are adjacent to each other, and the terminal apparatus #1 receives not only a beam from the base station apparatus #1, but also a beam from the base station apparatus #2. In such a state, the terminal apparatus #1 detects from which direction the beam is received, and transmits a result thereof to the base station apparatus #1. The base station apparatus #1 receives the feedback from the terminal apparatus #1, and is able to switch the beam to a beam in a direction in which interference is small.

FIG. 15 illustrates that the terminal apparatus #1 and the terminal apparatus #2 are not adjacent to each other, the terminal apparatus #1 receives only a beam from the base station apparatus #1, and the base station apparatus #2 receives only a beam from the base station apparatus #2. When the exposed terminal problem described above occurs in such a case, the base station apparatus #1 stops transmission due to the detection of the beam from the base station apparatus #2 even though the beam from the base station apparatus #2 does not interfere with the terminal apparatus #1. However, when the base station apparatus #1 receives the feedback from the terminal apparatus #1 and grasps that the terminal apparatus #1 does not receive any other beams, the base station apparatus #1 is able to continue the transmission without determining that the transmission is busy.

Examples of types of information regarding a direction include an angle and a reception beam. For example, the terminal apparatus 2 is able to obtain angle information by estimating the AoA (Angle of Arrival) of a predetermined reference signal. In a case where it is possible to associate the direction and angle of the reception beam with each other, the terminal apparatus 2 assumes that the power received on that reception beam is the received power at the corresponding angle. It should be noted that, in a case where the reception beam swings in not only the plane, but also the height direction, the terminal apparatus 2 may associate the directions of the reception beam by using two types of angles.

In addition, the terminal apparatus 2 issues a notification indicating that the power received on a certain reception beam is received on the reception beam, for example. The direction of the beam received by the terminal apparatus 2 is fixed, and it is thus equivalent to having information of an angle.

The format used for the terminal apparatus 2 to feed back to the transmitting station may include information of an angle and a reception beam. The information of an angle may be an absolute cardinal direction or a relative cardinal direction. In the case of the absolute cardinal direction, for example, a predetermined cardinal direction (any of the east, west, south, and north) may be set as 0 degrees. As information of a cardinal direction, the value of the sensors that is built in the terminal apparatus 2 and measures the cardinal direction may be used. In the case of the relative cardinal direction, a predetermined orientation of the terminal apparatus 2 may be set as 0 degrees, and the direction of a serving cell may be set as 0 degrees. In addition, the direction of the main lobe of the reception beam that produces the beam link pair designated by the network may be set as 0 degrees. In a case where the direction of a serving cell is set as 0 degrees, the terminal apparatus 2 may calculate the direction of the serving cell from the relationship between the position information of the transmitting station of which the terminal apparatus 2 is notified and the measured position information of the terminal apparatus 2. In addition, the terminal apparatus 2 may also set the direction of the main lobe of the reception beam to produce the optimal beam link pair for that serving cell as 0 degrees.

When the terminal apparatus 2 reports the information of a reception beam to the transmitting station, a power value received on a predetermined reception beam and an index regarding the reception beam are reported as a set. The terminal apparatus 2 may then include information of the beam link pair, the reception beam index, the antenna (antenna port), and the precoder index. In a case where a notification of the information of the beam link pair is issued, the terminal apparatus 2 may issue a notification of the received power of the corresponding reception beam in association with the transmission beam, or may issue a notification of the reception beam in association with the beam link pair. In a case where a notification of the information of the beam link pair is issued, the terminal apparatus 2 may issue a notification of a beam link pair index. In addition, reference signals are transmitted on different beams from the respective antenna ports. If the transmitting station is the base station apparatus 1, reference signals are transmitted from the CSI-RS antenna port, and if the transmitting station is the terminal apparatus 2, reference signals are transmitted from the SRS antenna port. The terminal apparatus 2 reports the power received on the optimal reception beam corresponding to the antenna port to the transmitting station. In a case where a notification of the information of the reception beam index is issued, the terminal apparatus 2 notifies the transmitting station of what are obtained by defining the reception beams pointed in different directions as discrete values. In a case where a notification of the information of the antenna (antenna port) is issued, the terminal apparatus 2 uses an index indicating the antenna. In a case where a notification of the information of the precoder index is issued, the terminal apparatus 2 uses the index of the precoder matrix used to configure the reception beam if the transmission beam and the reception beam have the same configuration in a case of digital beam forming.

Figure 17:
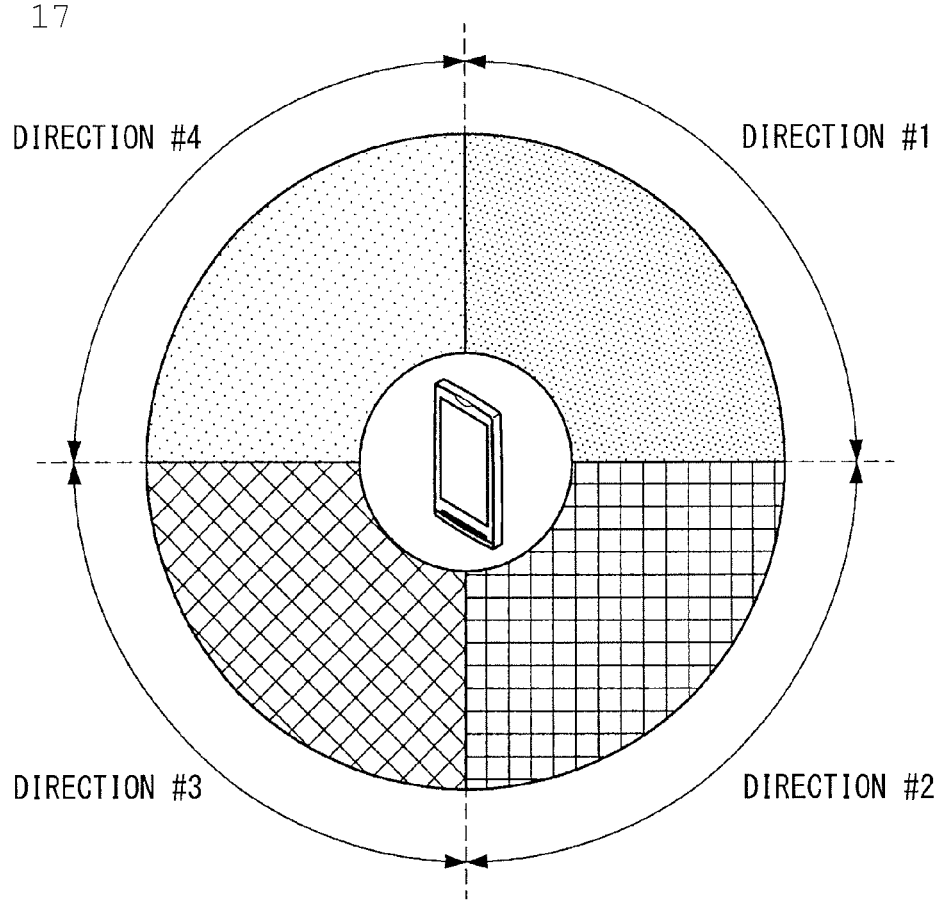
FIG. 17 is an explanatory diagram illustrating information regarding a direction in which a terminal apparatus 2 makes a report.
Figure 18:
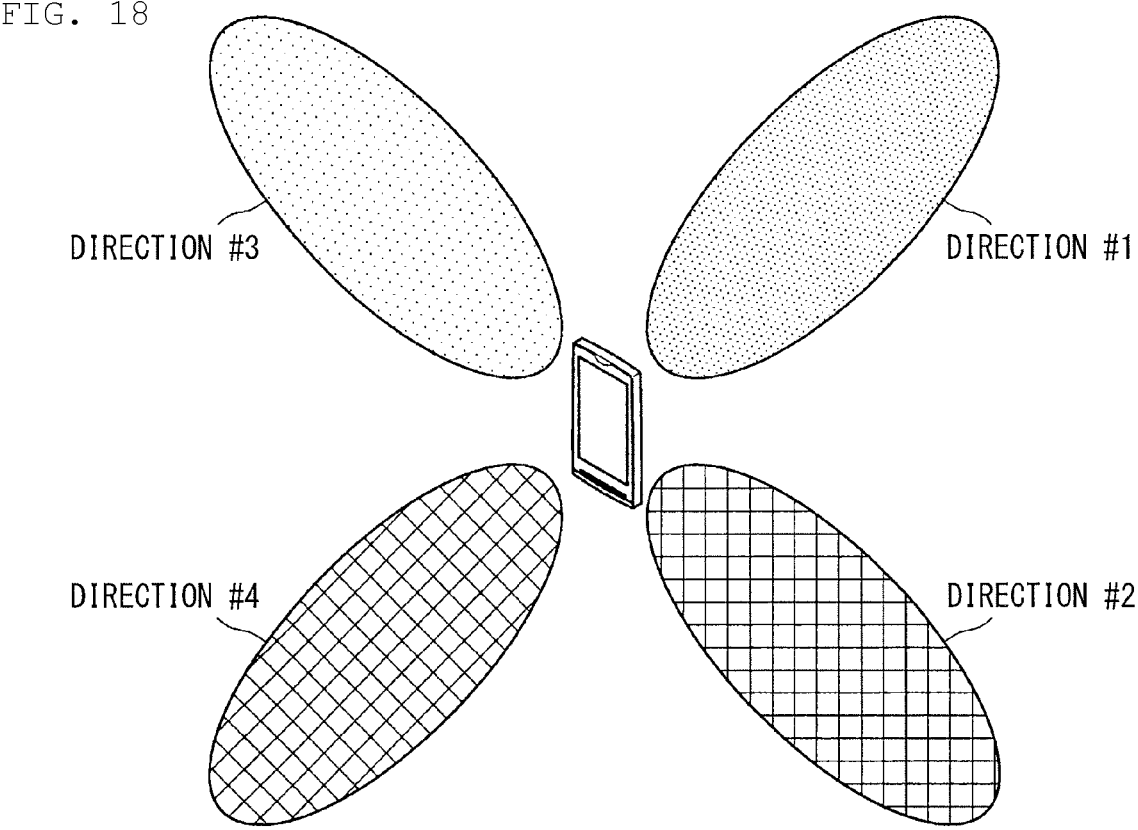
FIG. 18 is an explanatory diagram illustrating the information regarding the direction in which the terminal apparatus 2 makes a report.

Each of FIGS. 17 and 18 is an explanatory diagram illustrating information regarding a direction in which the terminal apparatus 2 makes a report. For example, as illustrated in FIG. 17, four directions may be defined in units of 90 degrees. As illustrated in FIG. 18, four directions may be defined in conformity with the arrival directions of beams. It is needless to say that the number of directions is not limited to those illustrated in FIGS. 17 and 18.

Next, the setting of measurement of a direction by the terminal apparatus 2 is described. The setting of measurement of a direction includes measurement timing setting, the number of directions and the granularity of angles, an averaging filter coefficient (L3 filter coefficient), a list of RSs to be measured (in a case where RSRP is measured), and the like.

The measurement timing setting may include, for example, the setting of a measurement period, section, and start subframe. The measurement timing setting may be individually settable for each direction, or measurement timing may be set that is common to directions. In addition, setting the number of directions and the granularity of angles causes the number of directions measured by the terminal apparatus 2 to be set. In addition, the averaging filter coefficient may also be individually settable for each direction. For example, the averaging filter coefficients may be different between the reception beam used for BLP and another reception beam.

In a case where RSRP is measured, a list of reference signals to be measured is also set. In this case, information for identifying the reference signals is listed and set. The information for identifying the reference signals may include, for example, resource information (such as resource element mapping setting or subframes), information regarding scrambling of the reference signal sequence (such as the initial value of the sequence), antenna ports, cell identifiers (ID or identifier), and the like.

In a case where the setting of measurement of a direction is performed from the transmitting station, the terminal apparatus 2 may refrain from performing measurement regarding a direction. In addition, in a case where the setting of measurement of a direction is not performed, the terminal apparatus 2 may perform measurement regarding a direction on the basis of a preset default setting value. As the default setting value, for example, measurement may be performed by using a reception beam provided in advance to the terminal apparatus 2. In addition, the default setting value may also vary depending on the frequency band of the band. For example, if a target is a band whose center frequency is higher than or equal to a predetermined frequency, for example, a band higher than or equal to 6 GHz, the terminal apparatus 2 may perform measurement by using two reception beams. If a target is a band whose center frequency is lower than the predetermined frequency, for example, a band lower than or equal to 6 GHz, the terminal apparatus 2 may refrain from measuring a direction.

As timing of measuring the received power, the terminal apparatus 2 may measure the received power in a section indicated by the measurement timing setting. The terminal apparatus 2 may measure the received power in a section that is indicated by the measurement timing setting and in which the subframe is indicated as the downlink. Alternatively, the terminal apparatus 2 may measure the received power at timing and in a section indicated by DCI (PDCCH).

Figure 19:
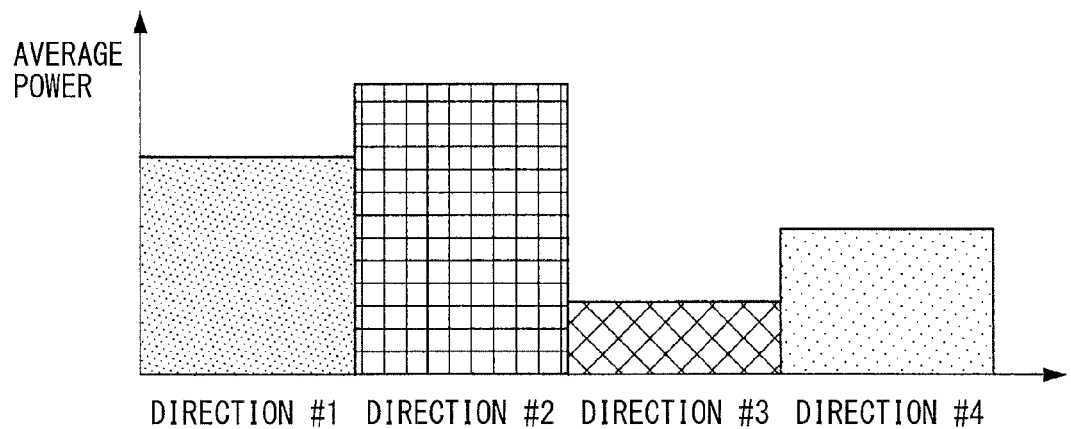
FIG. 19 is an explanatory diagram illustrating an example of information of average power measured by the terminal apparatus 2 in each direction.

A specific example of the information reported to the transmitting station by the terminal apparatus 2 is demonstrated. The terminal apparatus 2 reports an average power value (RSSI), RSRQ, or SINR (Signal to Interference plus Noise Ratio) for each direction, for example, as the information to be reported to the transmitting station. The terminal apparatus 2 does not have to report information of all directions to the transmitting station. For example, in a case of a measurement result lower than a predetermined threshold as a result of measurement, the terminal apparatus 2 does not have to return the information to the transmitting station. In other words, the terminal apparatus 2 reports information of only a direction whose measurement result is higher than the predetermined threshold. Upon receiving the information, the base station apparatus 1 recognizes that a result of the measurement of the direction whose information is not received is less than or equal to the predetermined threshold. This makes it possible to reduce the communication overhead necessary for a report. FIG. 19 is an explanatory diagram illustrating an example of information of average power measured by the terminal apparatus 2 in each direction. The terminal apparatus 2 reports such information of the average power for each direction to the transmitting station.

Figure 20:
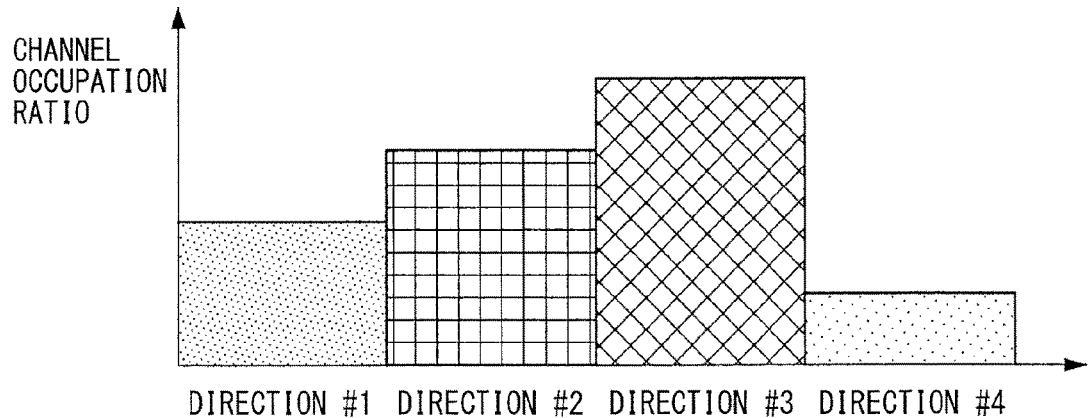
FIG. 20 is an explanatory diagram illustrating an example in which a number of times received power (RSSI) in a predetermined section of a measurement section exceeds a threshold is calculated for each direction.

The terminal apparatus 2 reports a histogram for each direction, for example, as the information to be reported to the transmitting station. In reporting the histogram for each direction, the terminal apparatus 2 reports the number of times the received power (RSSI) in a predetermined section of a measurement section exceeds a threshold. The predetermined section is divided by a smaller section (e.g., subframe or slot) than the measurement section. FIG. 20 is an explanatory diagram illustrating an example in which the number of times received power (RSSI) in a predetermined section of a measurement section exceeds a threshold is calculated for each direction. FIG. 20 illustrates the number of times the received power (RSSI) in the predetermined section of the measurement section exceeds the threshold as an index "channel occupation ratio." The terminal apparatus 2 reports such information of the channel occupation ratio for each direction to the transmitting station. It should be noted that FIG. 20 is merely an example in which one threshold is set, and a plurality of thresholds may be set.

A specific example of a method for the terminal apparatus 2 to report the information to the transmitting station is demonstrated. The terminal apparatus 2 includes a measurement result in PUSCH, and reports the measurement result to the base station apparatus. The terminal apparatus 2 may periodically make a report to the transmitting station, may make a report to the transmitting station at timing at which a predetermined trigger occurs, or may make a report to the transmitting station in accordance with an instruction from the transmitting station. In a case where a report is periodically made to the transmitting station, the period may be indicated from the transmitting station or a default setting value may be used. In a case where a report is made to the transmitting station at timing at which a predetermined trigger occurs, the predetermined trigger may be, for example, a measurement result exceeding a threshold or falling below a threshold. In addition, in a case where a report is made to the transmitting station in accordance with an instruction from the transmitting station, the instruction may be issued, for example, by DCI (PUCCH). It is possible to set a predetermined interval between reports. In other words, the terminal apparatus 2 does not make a subsequent report to the base station apparatus 1 before a predetermined time elapses after making a report even in a case where the condition is satisfied. In addition, the terminal apparatus 2 may make a report to the base station apparatus 1 in a predetermined period and in a case where a predetermined condition is satisfied. The format of the information to be reported to the transmitting station by the terminal apparatus 2 may be a format in which RSRP, RSRQ, RSSI are each in a separate format, RSRP and RSSI are combined with each other, or RSRP and RSRQ are combined with each other. In this case, RSRP may be for one value, and RSSI or RSRQ may be a plurality of values including information of a direction. For example, the terminal apparatus 2 reports one RSRP corresponding to a beam link pair and a plurality of RSSIs or RSRQs measured in a set direction.

The terminal apparatus 2 averages measured values by using an averaging filter coefficient when making a report to the transmitting station. The terminal apparatus 2 continues averaging in a case where the position and orientation of the terminal apparatus 2 are not changed considerably in performing measurement, for example, if the change in position is within a predetermined range and the change in orientation is within a predetermined angular range. Even if the orientation of the terminal apparatus 2 is changed considerably in performing measurement, the terminal apparatus 2 continues averaging in a case where the reference of a cardinal direction is recognizable. In contrast, in a case where the orientation of the terminal apparatus 2 is changed considerably, and the terminal apparatus 2 is not able to recognize the reference of a cardinal direction in a case where the position of the terminal apparatus 2 is changed considerably, the terminal apparatus 2 does not perform averaging, but resets the values measured so far. It should be noted that the case where the position is changed considerably is a case where the terminal apparatus 2 detects the movement of a predetermined distance. It should be noted that the case where the orientation is changed considerably is a case where the terminal apparatus 2 detects the change of a predetermined angle.

In reporting information to the transmitting station, the terminal apparatus 2 may feed back information of the capability of the terminal apparatus 2, for example, the number of mounted antennas, the configuration of beams, or the like. The transmitting station receives the feedback from the terminal apparatus 2, and is able to set the direction, the number, and the granularity of angles at the time of measurement for the terminal apparatus 2, and the reference of the direction at the time of measurement. As the information regarding capability to be fed back, the terminal apparatus 2 may feed back, to the transmitting station, at least any of pieces of information of the number of antennas, the shape of an antenna, the lobe width of a main beam, the direction in which a beam swings, the maximum number of configurable beams, the possibility of swing of a beam in the three-dimensional direction, and the like. In feeding back the shape of an antenna, the terminal apparatus 2 may feed back information indicating whether or not at least one antenna has directivity (e.g., whether the antenna is a dipole antenna or a panel antenna). In addition, in feeding back the direction in which a beam swings, the terminal apparatus 2 may feed back the information of the sensation between different beams, for example, an angular difference between different beams.

Figure 21:
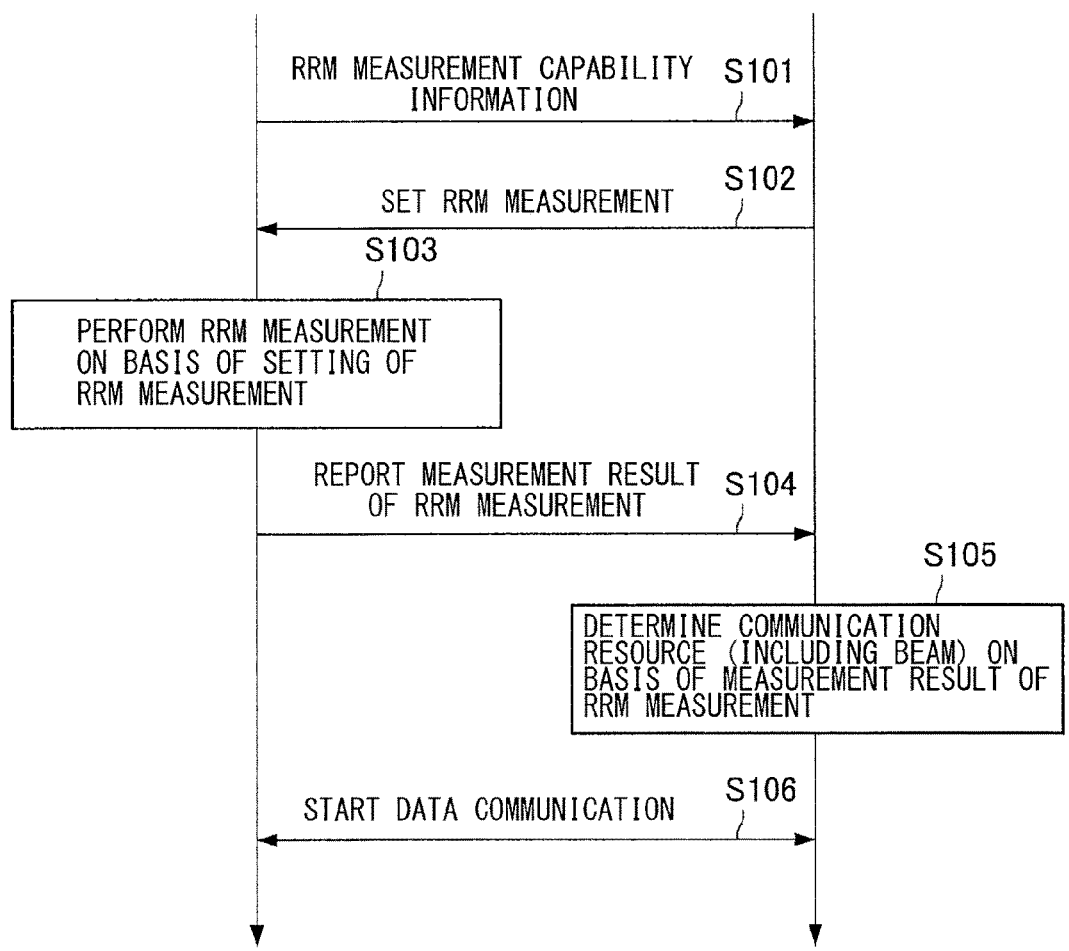
FIG. 21 is an explanatory diagram illustrating operation examples of a base station apparatus 1 and the terminal apparatus 2 according to an embodiment of the present disclosure as a sequence diagram.

FIG. 21 is an explanatory diagram illustrating operation examples of the base station apparatus 1 and the terminal apparatus 2 according to the embodiment of the present disclosure as a sequence diagram. FIG. 21 illustrates operation examples of the base station apparatus 1 and the terminal apparatus 2 for the terminal apparatus 2 to perform RRM measurement.

The terminal apparatus 2 transmits capability information regarding RRM measurement to the base station apparatus 1 (step S101). The base station apparatus 1 sets the RRM measurement for the terminal apparatus from the capability information regarding the RRM measurement (step S102).

The terminal apparatus 2 performs the RRM measurement on the basis of the setting of the RRM measurement received from the base station apparatus 1 (step S103). The RRM measurement here is measurement for each reception beam as described above. The terminal apparatus 2 then reports a result of the RRM measurement in step S103 to the base station apparatus 1 (step S104). The base station apparatus 1 determines a communication resource including a beam on the basis of a measurement result of the RRM measurement received from the terminal apparatus 2 (step S105), and starts data communication with the terminal apparatus 2 (step S106). The determination of the communication resource here includes the determination of the direction of the beam.

Figure 22:
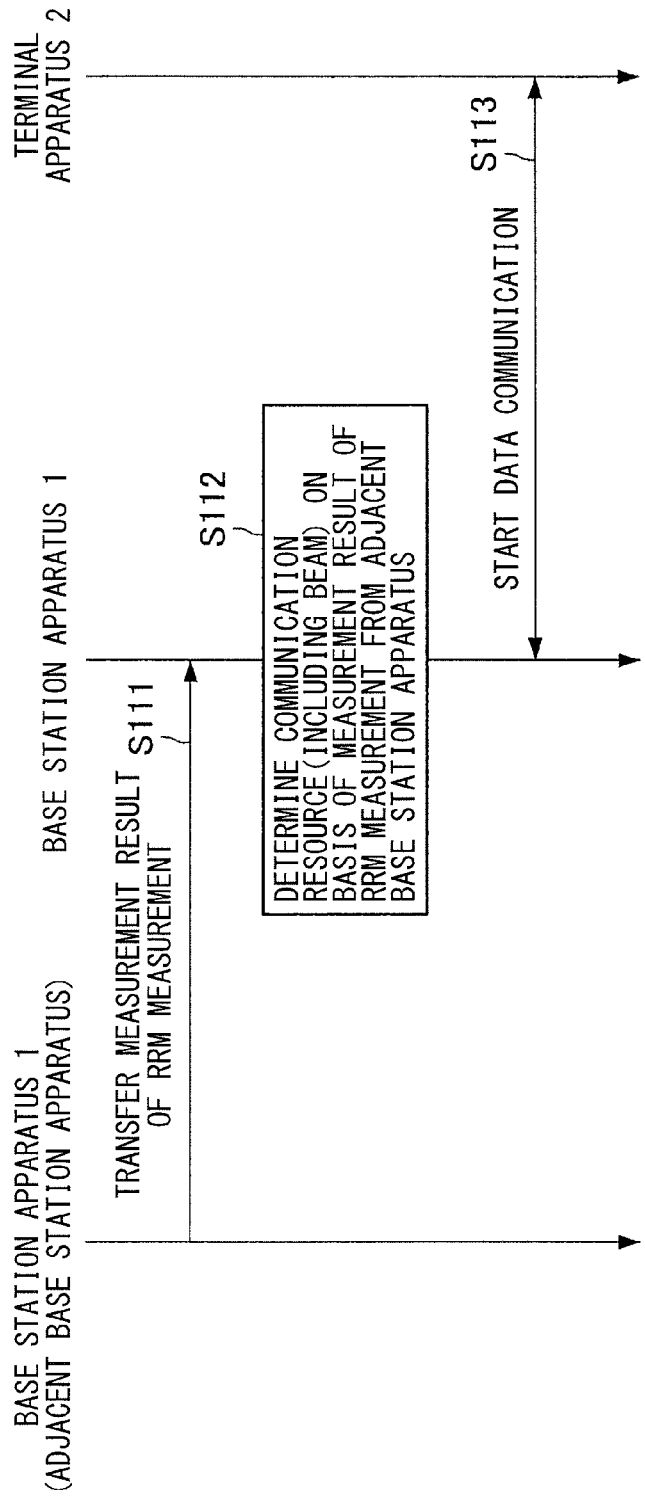
FIG. 22 is an explanatory diagram illustrating operation examples of the base station apparatus 1 and the terminal apparatus 2 according to the embodiment of the present disclosure as a sequence diagram.

The base station apparatus 1 that receives the report of the measurement result of the RRM measurement from the terminal apparatus 2 is able to transfer the report to another adjacent base station apparatus 1 coupled by the X2 interface, the Xn interface, or the like. This makes it possible to perform coordinated resource control between the base station apparatuses. FIG. 22 is an explanatory diagram illustrating operation examples of the base station apparatus 1 and the terminal apparatus 2 according to the embodiment of the present disclosure as a sequence diagram. FIG. 22 illustrates operation examples of the base station apparatus 1 and the terminal apparatus 2 for the terminal apparatus 2 to perform RRM measurement. FIG. 22 also illustrates the operation of another base station apparatus 1 that is an adjacent base station of the base station apparatus 1.

Another base station apparatus 1 that is an adjacent base station of the base station apparatus 1 transfers the measurement result of the RRM measurement received from the terminal apparatus 2 (step S111). As the contents of the information between the base station apparatuses, the result of the measurement may be transferred as it is, or the result of the measurement may be processed and transferred. In a case where the result of the measurement is transferred as it is, the base station apparatus 1 is able to perform accurate resource control because the amount of information is large. In a case where the result of the measurement is processed, that is, only a portion of the result of the measurement is transferred, it is possible to reduce the amount of information between the base station apparatuses. In a case where the result of the measurement is processed, the direction alone in which an adjacent base station apparatus to which the information is to be transferred strongly interferes may be transferred, or the information of the direction in which the base station apparatus wishes to perform communication may be transferred. In addition, the adjacent base station may also transfer the position information of the terminal apparatus 2 that performs the RRM measurement to the base station apparatus 1.

Upon receiving the measurement result of the RRM measurement from the adjacent base station, the base station apparatus 1 determines a communication resource including a beam on the basis of the result of the RRM measurement from the adjacent base station (step S112), and starts data communication with the terminal apparatus 2 (step S113).

Figure 23:
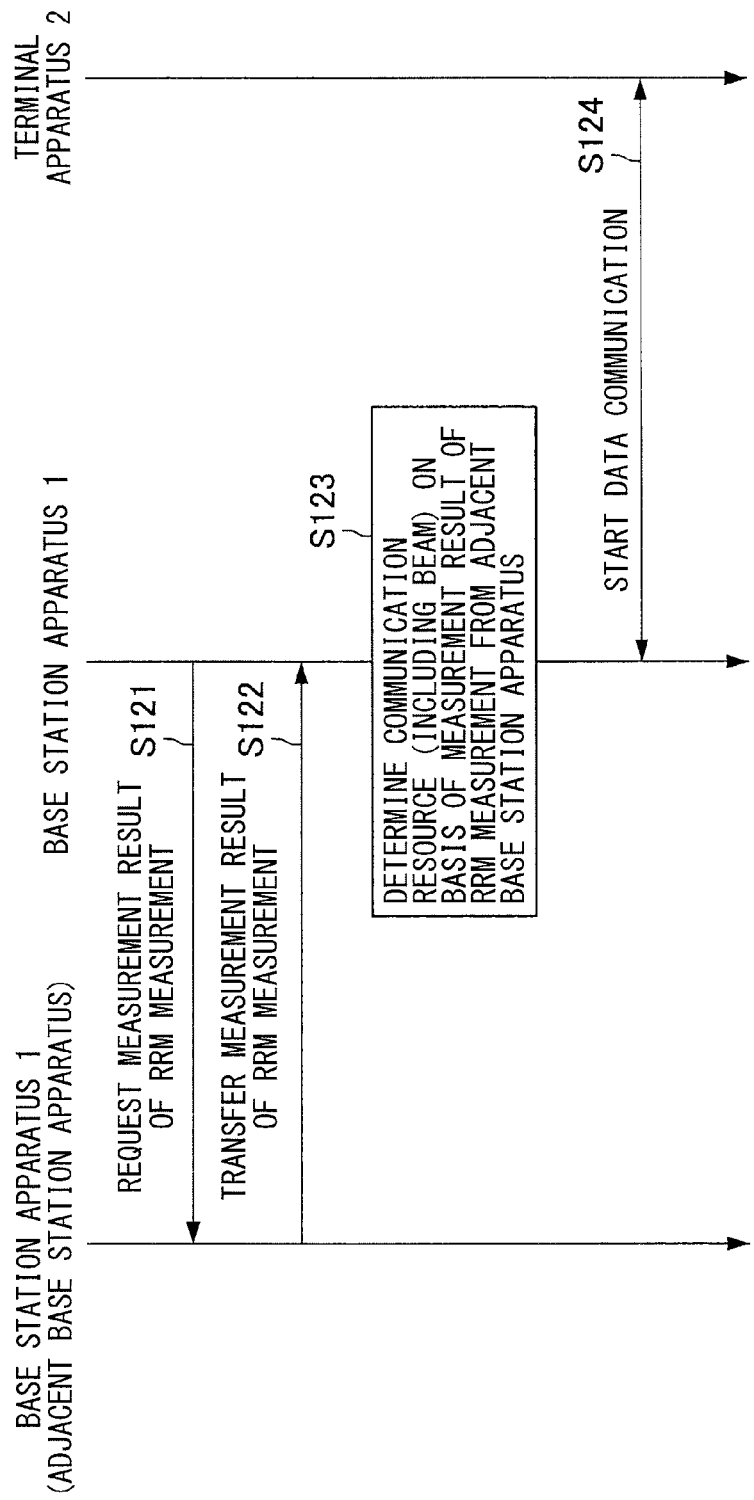
FIG. 23 is an explanatory diagram illustrating operation examples of the base station apparatus 1 and the terminal apparatus 2 according to the embodiment of the present disclosure as a sequence diagram.

The base station apparatus 1 may request the measurement result of the RRM measurement from the adjacent base station. The adjacent base station receives a request from another base station apparatus 1 and transfers the measurement result of the RRM measurement. FIG. 23 is an explanatory diagram illustrating operation examples of the base station apparatus 1 and the terminal apparatus 2 according to the embodiment of the present disclosure as a sequence diagram. FIG. 23 illustrates operation examples of the base station apparatus 1 and the terminal apparatus 2 for the terminal apparatus 2 to perform RRM measurement. FIG. 23 also illustrates the operation of another base station apparatus 1 that is an adjacent base station of the base station apparatus 1.

The base station apparatus 1 requests the adjacent base station to transfer the measurement result of the RRM measurement (step S121). The other base station apparatus 1 that is an adjacent base station of the base station apparatus 1 transfers, in response to the request in step S121, the measurement result of the RRM measurement received from the terminal apparatus 2 (step S122). As described above, as the contents of the information between the base station apparatuses, the result of the measurement may be transferred as it is, or the result of the measurement may be processed and transferred. In addition, as described above, the adjacent base station may also transfer the position information of the terminal apparatus 2 that performs the RRM measurement to the base station apparatus 1.

Upon receiving the measurement result of the RRM measurement from the adjacent base station, the base station apparatus 1 determines a communication resource including a beam on the basis of the result of the RRM measurement from the adjacent base station (step S123), and starts data communication with the terminal apparatus 2 (step S124).

In addition, measurement including direction information is also applicable to CSI. It is also possible to associate a CSI process with the setting regarding a beam in addition to the reference signal measurement resource and the interference measurement resource. As an example, a CSI process 0 is associated with a 0-th beam link pair and a CSI process 1 is associated with a first beam link pair. In addition, as another example, the CSI process 0 is associated with a reception beam 0 and the CSI process 1 is associated with a reception beam 1. It should be noted that, to reduce overhead, information common to a plurality of CSI processes does not have to be fed back. The information common to a plurality of CSI processes is, for example, RI (Rank Indicator) or the like.

It should be noted that it is also possible to use this information regarding a direction for positioning. In addition, in the processing described above, the operation performed by the base station apparatus 1 may be executed by the control unit 103, for example, and the operation performed by the terminal apparatus 2 may be executed by the control unit 203, for example.

3. APPLICATION EXAMPLES

The technology according to the present disclosure is applicable to various products. For example, the base station apparatus 1 may be achieved as any type of eNB (evolved Node B) such as a macro eNB or a small eNB. The small eNB may be an eNB such as a pico eNB, a micro eNB, or a home (femto) eNB that covers a cell smaller than a macro cell. Instead, the base station apparatus 1 may be achieved as another type of base station such as a NodeB or a BTS (Base Transceiver Station). The base station apparatus 1 may include a main entity (also referred to as base station apparatus) that controls wireless communication, and one or more RRHs (Remote Radio Heads) disposed in places different from the place of the main entity. In addition, various types of terminals to be described below may operate as the base station apparatus 1 by executing a base station function temporarily or permanently.

In addition, for example, the terminal apparatus 2 may be achieved as a mobile terminal such as a smartphone, tablet PC (Personal Computer), notebook PC, a portable game terminal, a portable/dongle mobile router, or a digital camera, or an onboard terminal such as a car navigation apparatus. In addition, the terminal apparatus 2 may be achieved as a terminal (also referred to as MTC (Machine Type Communication) terminal) that performs M2M (Machine To Machine) communication. Further, the terminal apparatus 2 may include wireless communication modules (e.g., integrated circuit module including one die) mounted on these terminals.

3.1. Application Examples for Base Station Apparatus

First Application Example

Figure 24:
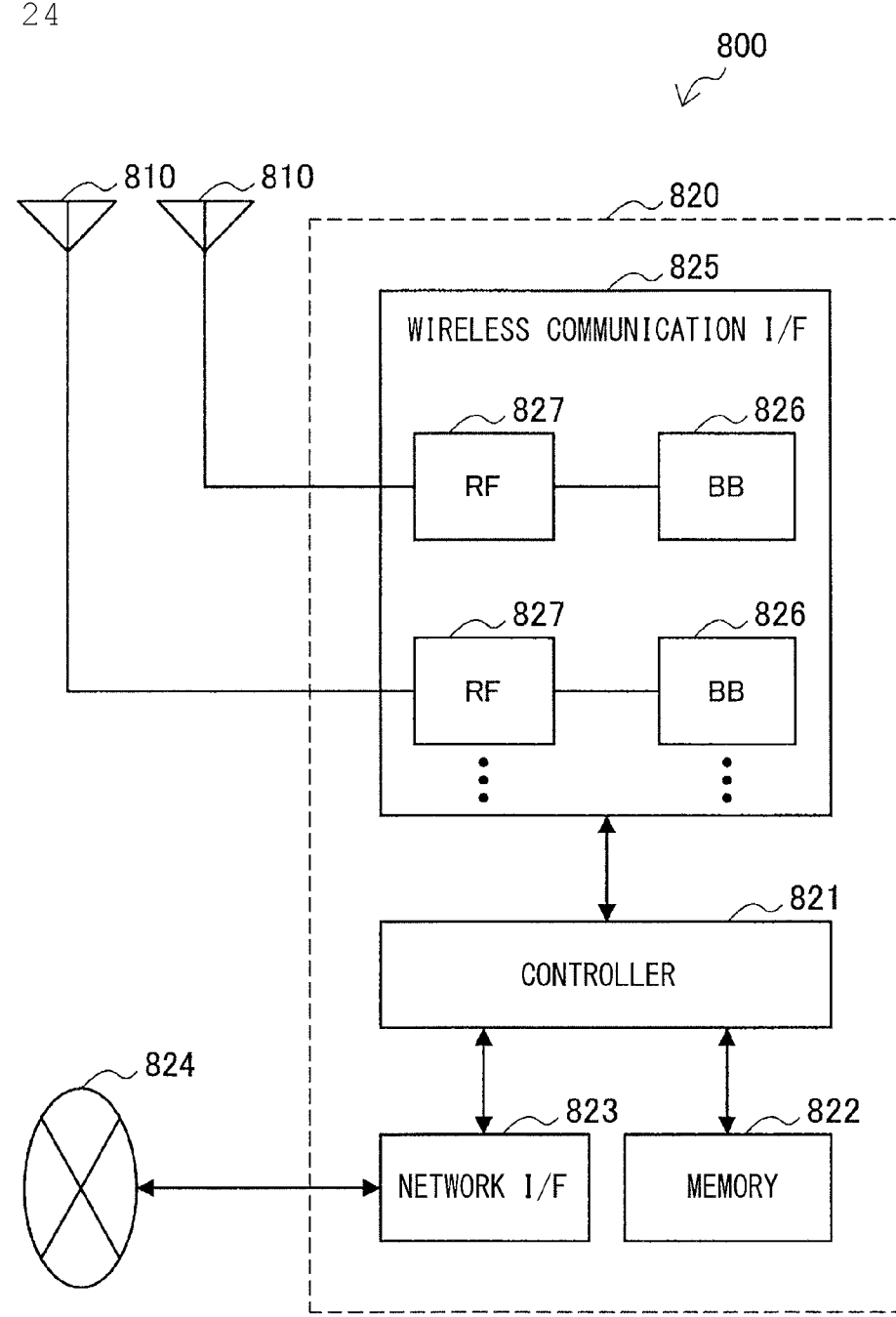
FIG. 24 is a block diagram illustrating a first example of a schematic configuration of an eNB.

FIG. 24 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be coupled to each other via an RF cable.

Each of the antennas 810 includes a single or a plurality of antenna elements (e.g., a plurality of antenna elements included in a MIMO antenna), and is used for the base station apparatus 820 to transmit and receive wireless signals. The eNB 800 may include the plurality of antennas 810 as illustrated in FIG. 24, and the plurality of respective antennas 810 may correspond, for example, to a plurality of frequency bands used by the eNB 800. It should be noted that FIG. 24 illustrates an example in which the eNB 800 includes the plurality of antennas 810, but the eNB 800 may include the single antenna 810.

The base station apparatus 820 includes a controller 821, a memory 822, a network interface 823, and a wireless communication interface 825.

The controller 821 may be, for example, CPU or DSP, and operates various functions of a higher layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors, and transfer the generated bundled packet. In addition, the controller 821 may also have a logical function of executing control such as radio resource control (Radio Resource Control), radio bearer control (Radio Bearer Control), mobility management (Mobility Management), admission control (Admission Control), or scheduling (Scheduling). In addition, the control may be executed in cooperation with nearby eNB or a core network node. The memory 822 includes RAM and ROM, and stores a program executed by the controller 821 and various kinds of control data (e.g., terminal list, transmission power data, scheduling data, and the like).

The network interface 823 is a communication interface for coupling the base station apparatus 820 to the core network 824. The controller 821 may communicate with a core network node or another eNB via the network interface 823. In this case, the eNB 800 and the core network node or the other eNB may be coupled to each other through a logical interface (e.g., S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless coupling to a terminal positioned within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like, and executes various signal processing of each of layers (e.g., L1, MAC (Medium Access Control), RLC (Radio Link Control), and PDCP (Packet Data Convergence Protocol)). The BB processor 826 may have a portion or all of the logical functions described above instead of the controller 821. The BB processor 826 may be a module including a memory having a communication control program stored therein, a processor to execute the program, and a related circuit, and the function of the BB processor 826 may be modifiable by updating the program described above. In addition, the module described above may be a card or blade to be inserted into a slot of the base station apparatus 820, or a chip mounted on the card or blade described above. Meanwhile, the RF circuit 827 may include a mixer, a filter, an amplifier, and the like, and transmits and receives wireless signals via the antenna 810.

The wireless communication interface 825 may include the plurality of BB processors 826 as illustrated in FIG. 24, and the plurality of respective BB processors 826 may correspond, for example, to a plurality of frequency bands used by the eNB 800. In addition, the wireless communication interface 825 may also include the plurality of RF circuits 827 as illustrated in FIG. 24, and the plurality of respective RF circuits 827 may correspond, for example, to a plurality of antenna elements. It should be noted that FIG. 24 illustrates an example in which the wireless communication interface 825 includes the plurality of BB processors 826 and the plurality of RF circuits 827, but the wireless communication interface 825 may also include the single BB processor 826 or the single RF circuit 827.

In the eNB 800 illustrated in FIG. 24, the higher-layer processing unit 101, the control unit 103, the reception unit 105, and/or the transmission unit 107 described with reference to FIG. 8 may be implemented in the wireless communication interface 825 (e.g., BB processor 826 and/or RF circuit 827), the controller 821, and/or the network interface 823. For example, the wireless communication interface 825, the controller 821, and/or the network interface 823 may transmit first control information and second control information, and receive a control information request and transmit corresponding third control information. For example, functions for performing these operations may be implemented in a processor included in the wireless communication interface 825. The eNB 800, the base station apparatus 820, or the module described above may be provided as an apparatus that performs such an operation, or a program for causing a processor to perform the operations described above may be provided. In addition, a readable recording medium having the above-described program recorded thereon may be provided. In addition, the transmission/reception antenna 109 may be implemented in the antenna 810.

Second Application Example

Figure 25:
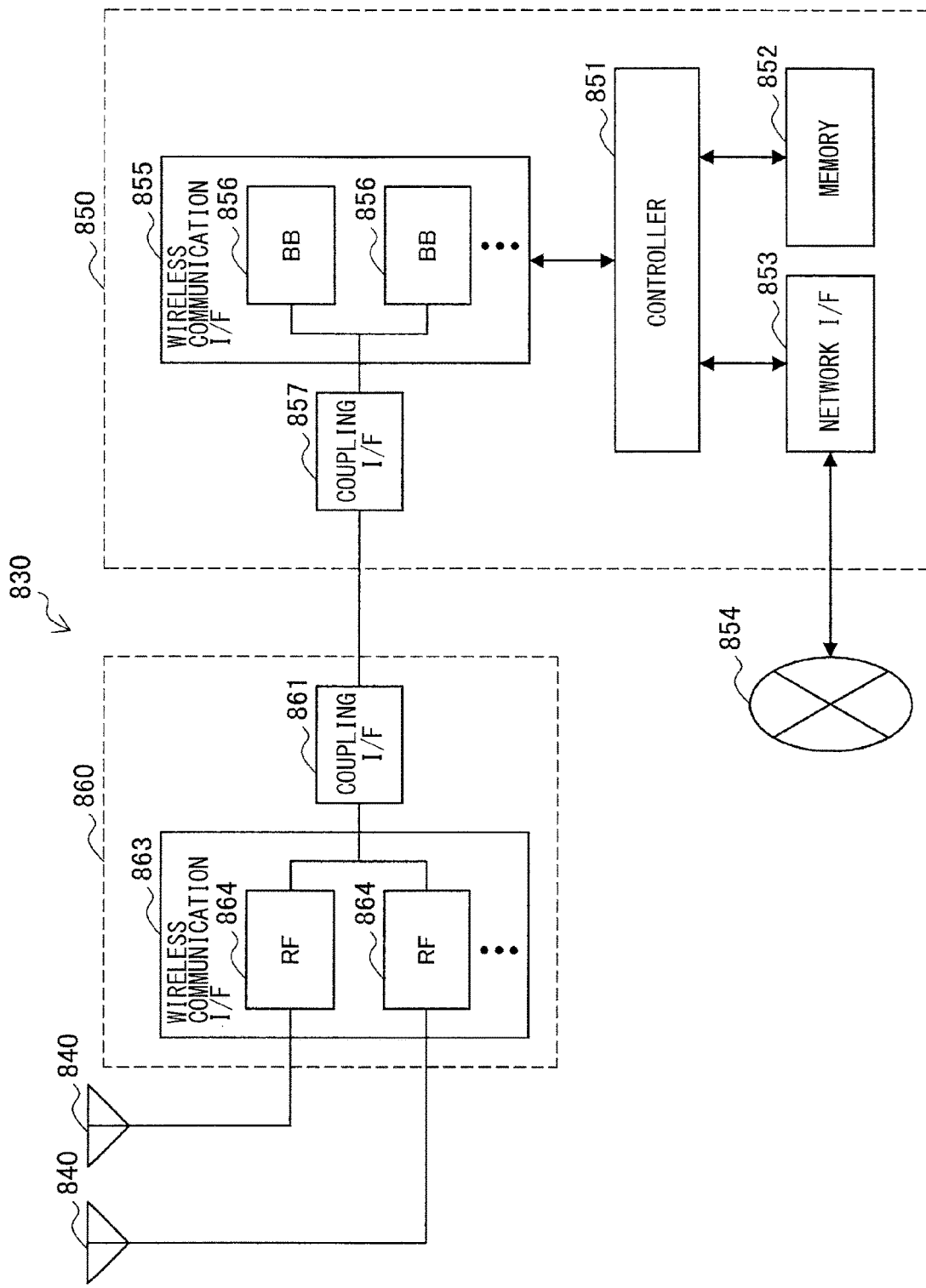
FIG. 25 is a block diagram illustrating a second example of the schematic configuration of the eNB.

FIG. 25 is a block diagram illustrating a second example of a schematic configuration of an eNB to which the technology according to the present disclosure may be applied. An eNB 830 includes one or more antennas 840, a base station apparatus 850, and RRH 860. Each antenna 840 and the RRH 860 may be coupled to each other via an RF cable. In addition, the base station apparatus 850 and the RRH 860 may be coupled to each other through a high-speed line such as an optical fiber cable.

Each of the antennas 840 includes a single or a plurality of antenna elements (e.g., a plurality of antenna elements included in a MIMO antenna), and is used for the RRH 860 to transmit and receive wireless signals. The eNB 830 may include the plurality of antennas 840 as illustrated in FIG. 25, and the plurality of respective antennas 840 may correspond, for example, to a plurality of frequency bands used by the eNB 830. It should be noted that FIG. 25 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 24.

The wireless communication interface 855 supports any cellular communication scheme such as LTE or LTE-Advanced, and provides wireless coupling to a terminal positioned in a sector corresponding to the RRH 860 via the RRH 860 and the antenna 840. The wireless communication interface 855 may typically include a BB processor 856 and the like. The BB processor 856 is similar to the BB processor 826 described with reference to FIG. 24 except that the BB processor 856 is coupled to an RF circuit 864 of the RRH 860 via the coupling interface 857. The wireless communication interface 855 may include the plurality of BB processors 856 as illustrated in FIG. 25, and the plurality of respective BB processors 856 may correspond, for example, to a plurality of frequency bands used by the eNB 830. It should be noted that FIG. 25 illustrates an example in which the wireless communication interface 855 includes the plurality of BB processors 856, but the wireless communication interface 855 may also include the single BB processor 856.

The coupling interface 857 is an interface for coupling the base station apparatus 850 (wireless communication interface 855) to the RRH 860. The coupling interface 857 may be a communication module for communication on the above-described high-speed line in which couples the base station apparatus 850 (wireless communication interface 855) and the RRH 860 to each other.

In addition, the RRH 860 includes a coupling interface 861 and a wireless communication interface 863.

The coupling interface 861 is an interface for coupling the RRH 860 (wireless communication interface 863) to the base station apparatus 850. The coupling interface 861 may be a communication module for communication on the high-speed line described above.

The wireless communication interface 863 transmits and receives wireless signals via the antenna 840. The wireless communication interface 863 may typically include the RF circuit 864 and the like. The RF circuit 864 may include a mixer, a filter, an amplifier, and the like, and transmits and receives wireless signals via the antenna 840. In addition, the wireless communication interface 863 may also include the plurality of RF circuits 864 as illustrated in FIG. 25, and the plurality of respective RF circuits 864 may correspond, for example, to a plurality of antenna elements. It should be noted that FIG. 25 illustrates an example in which the wireless communication interface 863 includes the plurality of RF circuits 864, but the wireless communication interface 863 may also include the single RF circuit 864.

In the eNB 830 illustrated in FIG. 25, the higher-layer processing unit 101, the control unit 103, the reception unit 105, and/or the transmission unit 107 described with reference to FIG. 8 may be implemented in the wireless communication interface 855, the wireless communication interface 863 (e.g., BB processor 856 and/or RF circuit 864), the controller 851, and/or the network interface 853. For example, the wireless communication interface 855, the wireless communication interface 863, the controller 851, and/or the network interface 853 may transmit first control information and second control information, and receive a control information request and transmit corresponding third control information. For example, functions for performing these operations may be implemented in a processor included in the wireless communication interface 855 and/or the wireless communication interface 863. The eNB 830, the base station apparatus 850, or the module described above may be provided as an apparatus that performs such an operation, or a program for causing a processor to perform the operations described above may be provided. In addition, a readable recording medium having the above-described program recorded thereon may be provided. In addition, the transmission/reception antenna 109 may be implemented in the antenna 840.

3.2. Application Examples for Terminal Apparatus

First Application Example

Figure 26:
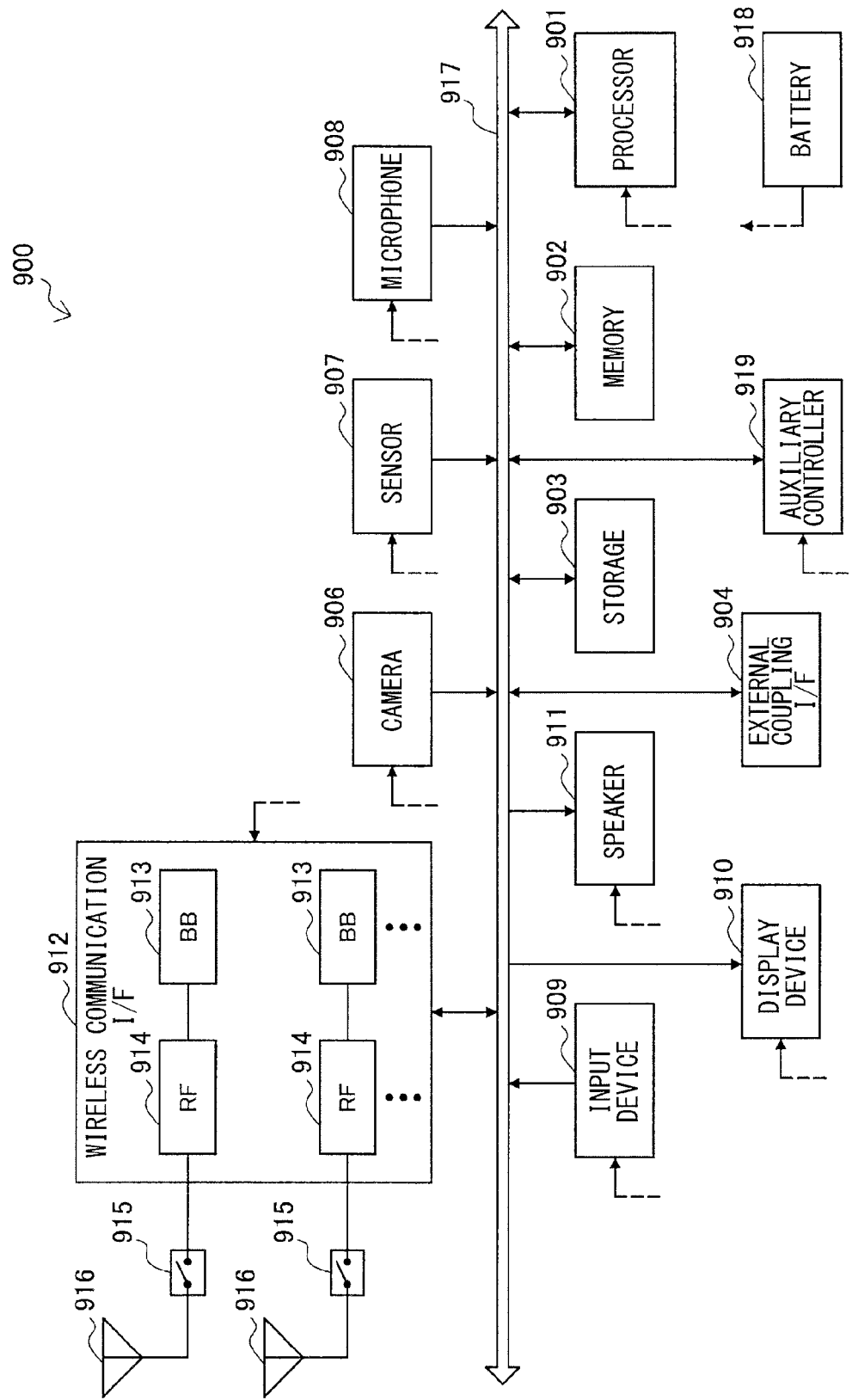
FIG. 26 is a block diagram illustrating an example of a schematic configuration of a smartphone.

FIG. 26 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, CPU or SoC (System on Chip), and controls functions of an application layer and another layer of the smartphone 900. The memory 902 includes RAM and ROM, and stores a program that is executed by the processor 901, and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imaging element such as CCD (Charge Coupled Device) or CMOS (Complementary Metal Oxide Semiconductor), and generates a captured image. The sensor 907 may include a sensor group including, for example, a positioning sensor, a gyro sensor, a geomagnetic sensor, an acceleration sensor, and the like. The microphone 908 converts a sound that is inputted into the smartphone 900 to a sound signal. The input device 909 includes, for example, a touch sensor that detects a touch onto a screen of the display device 910, a keypad, a keyboard, a button, a switch, or the like, and receives an operation or an information input from a user. The display device 910 includes a screen such as a liquid crystal display (LCD) or an organic light-emitting diode (OLED) display, and displays an output image of the smartphone 900. The speaker 911 converts the sound signal that is outputted from the smartphone 900 to a sound.

The wireless communication interface 912 supports any cellular communication scheme such as LTE or LTE-Advanced, and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like, and executes various kinds of signal processing for wireless communication. Meanwhile, the RF circuit 914 may include, for example, a mixer, a filter, an amplifier, and the like, and transmits and receives wireless signals via the antenna 916. The wireless communication interface 912 may also be a one-chip module that has the BB processor 913 and the RF circuit 914 integrated thereon. The wireless communication interface 912 may include the plurality of BB processors 913 and the plurality of RF circuits 914 as illustrated in FIG. 26. It should be noted that FIG. 26 illustrates an example in which the wireless communication interface 912 includes the plurality of BB processors 913 and the plurality of RF circuits 914, but the wireless communication interface 912 may include the single BB processor 913 or the single RF circuit 914.

Further, in addition to a cellular communication scheme, the wireless communication interface 912 may support another type of wireless communication scheme such as a short-distance wireless communication scheme, a near field communication scheme, or a wireless LAN (Local Area Network) scheme. In that case, the wireless communication interface 912 may include the BB processor 913 and the RF circuit 914 for each wireless communication scheme.

Each of the antenna switches 915 switches coupling destinations of the antennas 916 between the plurality of circuits (e.g., circuit for different wireless communication schemes) included in the wireless communication interface 912.

Each of the antennas 916 includes a single or a plurality of antenna elements (e.g., a plurality of antenna elements included in a MIMO antenna), and is used for the wireless communication interface 912 to transmit and receive wireless signals. The smartphone 900 may include the plurality of antennas 916 as illustrated in FIG. 26. It should be noted that FIG. 26 illustrates an example in which the smartphone 900 includes the plurality of antennas 916, but the smartphone 900 may include the single antenna 916.

Further, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 26 via a power supply line that is partially illustrated in the diagram as a dashed line. The auxiliary controller 919, for example, operates a minimally necessary function of the smartphone 900 in a sleep mode.

In the smartphone 900 illustrated in FIG. 26, the higher-layer processing unit 201, the control unit 203, the reception unit 205, and/or the transmission unit 207 described with reference to FIG. 9 may be implemented in the wireless communication interface 912 (e.g., RF circuit 914 and/or BB processor 913), the processor 901, and/or the auxiliary controller 919. For example, the wireless communication interface 912, the processor 901, and/or the auxiliary controller 919 may receive the first control information and the second control information, or may transmit the control information request and receive the corresponding third control information. For example, functions for performing these operations may be implemented in a processor included in the wireless communication interface 912. The smartphone 900 or the module described above may be provided as an apparatus that performs such an operation, or a program for causing a processor to perform the operations described above may be provided. In addition, a readable recording medium having the above-described program recorded thereon may be provided. In addition, the transmission/reception antenna 209 may be implemented in the antenna 916.

Second Application Example

Figure 27:
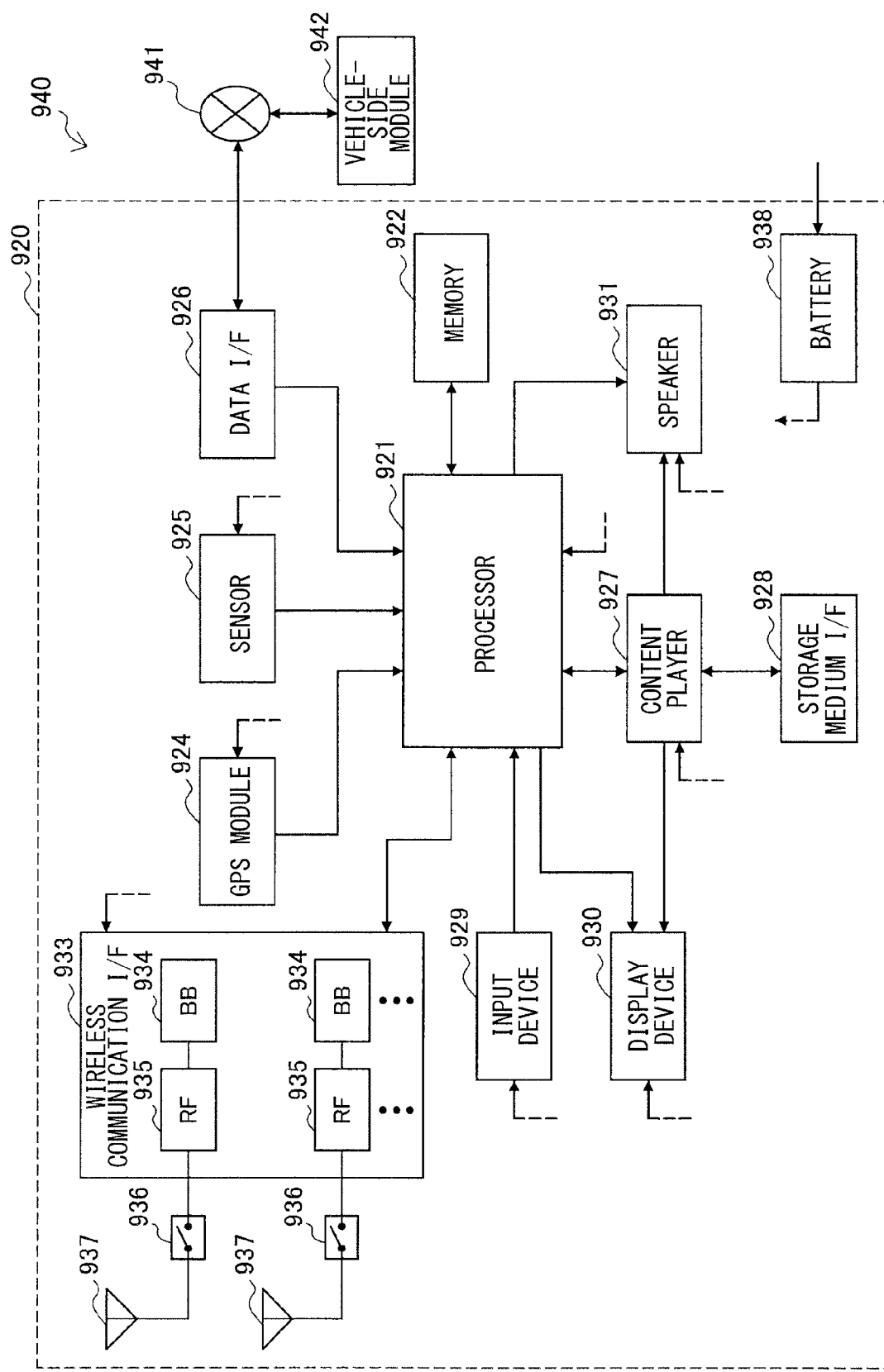
FIG. 27 is a block diagram illustrating an example of a schematic configuration of a car navigation apparatus.

FIG. 27 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, CPU or SoC, and controls the navigation function and the other functions of the car navigation apparatus 920. The memory 922 includes RAM and ROM, and stores a program that is executed by the processor 921, and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor, and the like. The data interface 926 is, for example, coupled to an in-vehicle network 941 via a terminal that is not illustrated, and acquires data such as vehicle speed data generated on the vehicle side.

The content player 927 reproduces content stored in a storage medium (e.g., CD or DVD) to be inserted into the storage medium interface 928. The input device 929 includes, for example, a touch sensor that detects a touch onto a screen of the display device 930, a button, a switch, or the like, and receives an operation or an information input from a user. The display device 930 includes a screen such as LCD or an OLED display, and displays an image of the navigation function or content to be reproduced. The speaker 931 outputs a sound of the navigation function or content to be reproduced.

The wireless communication interface 933 supports any cellular communication scheme such as LTE or LTE-Advanced, and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like, and executes various kinds of signal processing for wireless communication. Meanwhile, the RF circuit 935 may include, for example, a mixer, a filter, an amplifier, and the like, and transmits and receives wireless signals via the antenna 937. The wireless communication interface 933 may also be a one-chip module that has the BB processor 934 and the RF circuit 935 integrated thereon. The wireless communication interface 933 may include the plurality of BB processors 934 and the plurality of RF circuits 935 as illustrated in FIG. 27. It should be noted that FIG. 27 illustrates an example in which the wireless communication interface 933 includes the plurality of BB processors 934 and the plurality of RF circuits 935, but the wireless communication interface 933 may include the single BB processor 934 or the single RF circuit 935.

Further, in addition to a cellular communication scheme, the wireless communication interface 933 may support another type of wireless communication scheme such as a short-distance wireless communication scheme, a near field communication scheme, or a wireless LAN scheme. In that case, the wireless communication interface 933 may include the BB processor 934 and the RF circuit 935 for each wireless communication scheme.

Each of the antenna switches 936 switches coupling destinations of the antennas 937 between the plurality of circuits (e.g., circuit for different wireless communication schemes) included in the wireless communication interface 933.

Each of the antennas 937 includes a single or a plurality of antenna elements (e.g., a plurality of antenna elements included in a MIMO antenna), and is used for the wireless communication interface 933 to transmit and receive wireless signals. The car navigation apparatus 920 may include the plurality of antennas 937 as illustrated in FIG. 27. It should be noted that FIG. 27 illustrates an example in which the car navigation apparatus 920 includes the plurality of antennas 937, but the car navigation apparatus 920 may include the single antenna 937.

Further, the car navigation apparatus 920 may include the antenna 937 for each wireless communication scheme. In that case, the antenna switches 936 may be omitted from the configuration of the car navigation apparatus 920.

The battery 938 supplies electric power to each block of the car navigation apparatus 920 illustrated in FIG. 27 via a power supply line that is partially illustrated in the diagram as a dashed line. In addition, the battery 938 accumulates the electric power supplied from the vehicle side.

In the car navigation apparatus 920 illustrated in FIG. 27, the higher-layer processing unit 201, the control unit 203, the reception unit 205, and/or the transmission unit 207 described with reference to FIG. 9 may be implemented in the wireless communication interface 933 (e.g., RF circuit 935 and/or BB processor 934) and/or the processor 921. For example, the wireless communication interface 933 and/or the processor 921 may receive the first control information and the second control information, or may transmit the control information request and receive the corresponding third control information. For example, functions for performing these operations may be implemented in a processor included in the wireless communication interface 933. The car navigation apparatus 920 or the module described above may be provided as an apparatus that performs such an operation, or a program for causing a processor to perform the operations described above may be provided. In addition, a readable recording medium having the above-described program recorded thereon may be provided. In addition, the transmission/reception antenna 209 may be implemented in the antenna 937.

In addition, the technology according to the present disclosure may also be achieved as an in-vehicle system (or vehicle) 940 including one or more blocks of the car navigation apparatus 920 described above, the in-vehicle network 941, and a vehicle-side module 942. The vehicle-side module 942 generates vehicle data such as vehicle speed, engine speed, and trouble information, and outputs the generated data to the in-vehicle network 941.

4. CONCLUSION

As described above, according to the embodiment of the present disclosure, it is possible to provide the base station apparatus 1 and the terminal apparatus 2 that allow the transmitting station to accurately determine whether or not the receiving station has interference, by further measuring information regarding a direction.

The respective steps in the processing executed by each apparatus described herein do not necessarily have to be performed chronologically in the order described as a sequence diagram or a flowchart. For example, the respective steps in the processing executed by each apparatus may be processed in order different from the order described as a flowchart, or may be processed in parallel.

In addition, it is possible to fabricate a computer program for causing hardware such as the CPU, ROM, and RAM built in each apparatus to implement the same functions as those of the components of each apparatus described above. In addition, it is possible to provide a storage medium having the computer program stored therein. In addition, configuring each of the functional blocks illustrated in the functional block diagrams by hardware makes it possible to allow the hardware to achieve a series of processes.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

It should be noted that the following configurations also fall within the technical scope of the present disclosure.

(1)

A communication apparatus including a communication control unit that controls a communication process in a cellular system, the communication control unit setting a plurality of reception beams on the basis of information of a direction, measuring received power for each of the reception beams, and reporting a result of the measurement to a base station, the information of the direction being set from the base station.

(2)

The communication apparatus according to (1), in which the communication control unit measures the received power in a section set from the base station.

(3)

The communication apparatus according to (1) or (2), in which the communication control unit reports a histogram for each of the reception beams as the result of the measurement of the received power.

(4)

The communication apparatus according to (3), in which the communication control unit reports, as the histogram for each of the reception beams, a histogram of a number of times the received power exceeds a predetermined threshold.

(5)

The communication apparatus according to any of (1) to (4), in which the communication control unit periodically reports the result of the measurement of the received power to the base station.

(6)

The communication apparatus according to any of (1) to (4), in which the communication control unit reports the result of the measurement of the received power to the base station in a case where a predetermined condition is satisfied.

(7)

The communication apparatus according to any of (1) to (4), in which the communication control unit reports the result of the measurement of the received power to the base station in a case where an instruction is issued from the base station.

(8)

The communication apparatus according to any of (1) to (7), in which the communication control unit reports capability of an own apparatus to the base station before the measurement of the received power.

(9)

The communication apparatus according to (8), in which the communication control unit reports at least one of a number of antennas, a shape of an antenna, lobe width of a main beam, a direction in which a beam swings, a maximum number of configurable beams, or movability of a beam in a three-dimensional direction as the capability of the own apparatus.

(10)

A communication apparatus including
a communication control unit that controls a communication process in a cellular system,
the communication control unit setting a plurality of reception beams for a terminal apparatus on the basis of capability information acquired from the terminal apparatus, and acquiring information of received power measured in the terminal apparatus for each of the reception beams.

(11)

The communication apparatus according to (10), in which the communication control unit controls a direction of a beam to the terminal apparatus on the basis of the acquired information of the received power.

(12)

The communication apparatus according to (10), in which the communication control unit transmits information of a direction of a beam to the terminal apparatus to another communication apparatus on the basis of the acquired information of the received power.

(13)

The communication apparatus according to (10), in which the communication control unit acquires at least one of a number of antennas, a shape of an antenna, lobe width of a main beam, a direction in which a beam swings, a maximum number of configurable beams, or movability of a beam in a three-dimensional direction as the capability of the terminal apparatus.

(14)

A communication control method including
controlling, by a processor, a communication process in a cellular system,
the processor setting a plurality of reception beams on the basis of information of a direction, measuring received power for each of the reception beams, and reporting a result of the measurement to a base station, the information of the direction being set from the base station.

(15)

A communication control method including
controlling, by a processor, a communication process in a cellular system,
the processor setting a plurality of reception beams for a terminal apparatus on the basis of capability information acquired from the terminal apparatus, and acquiring information of received power measured in the terminal apparatus for each of the reception beams.

(16)

A computer program that causes a computer
to execute controlling a communication process in a cellular system, and
to set a plurality of reception beams on the basis of information of a direction, measure received power for each of the reception beams, and report a result of the measurement to a base station, the information of the direction being set from the base station.

(17)

A computer program that causes a computer
to execute controlling a communication process in a cellular system, and
to set a plurality of reception beams for a terminal apparatus on the basis of capability information acquired from the terminal apparatus, and acquire information of received power measured in the terminal apparatus for each of the reception beams.

REFERENCE SIGNS LIST

1 Base station apparatus
2 Terminal apparatus

The invention claimed is:

1. A communication apparatus comprising
a communication control circuit that controls a communication process in a cellular system,
the communication control circuit configured to:
set a plurality of reception beams on a basis of information of a direction set by a base station,
measure a received power for each of the reception beams, and
report, to the base station, a measurement result of only those of the reception beams that have a measurement result corresponding to a histogram of a number of times that the measured power exceeds a predetermined threshold in a predetermined time period.

2. The communication apparatus according to claim 1, wherein the direction set by a base station comprises one or more measurement sections set from the base station, and the reported measurement result is measurement section specific.

3. The communication apparatus according to claim 1, wherein the communication control circuit periodically reports the measurement result to the base station.

4. The communication apparatus according to claim 1, wherein the communication control circuit reports the measurement result to the base station in a case where a predetermined condition is satisfied.

5. The communication apparatus according to claim 1, wherein the communication control circuit reports the measurement result to the base station in a case where an instruction is issued from the base station.

6. The communication apparatus according to claim 1, wherein the communication control circuit reports capability of an own apparatus to the base station before the measurement of the received power.

7. The communication apparatus according to claim 6, wherein the communication control circuit reports al least one of a number of antennas, a shape of an antenna, a lobe width of a main beam of an antenna, a direction in which a beam swings, a maximum number of configurable beams, or movability of a beam in a three-dimensional direction as the capability of the own apparatus.

8. A communication apparatus comprising
a communication control circuit that controls a communication process in a cellular system,
the communication control circuit configured to:
set a plurality of reception beams for a terminal apparatus on a basis of capability information acquired from the terminal apparatus, and
acquire information related to a received power measured in the terminal apparatus for each of the reception beams, the information comprising a report, from the terminal apparatus, of a measurement result of only those of the reception beams that have a measurement result corresponding to a histogram of a number of times that a power measured by the terminal apparatus exceeds a predetermined threshold in a predetermined time period.

9. The communication apparatus according to claim 8, wherein the communication control circuit controls a direction of a beam to the terminal apparatus on a basis of the acquired information of the received power.

10. The communication apparatus according to claim 8, wherein the communication control circuit transmits information of a direction of a beam to the terminal apparatus and another communication apparatus on a basis of the acquired information of the received power.

11. The communication apparatus according to claim 8, wherein the capability information acquired from the terminal apparatus includes at least one of a number of antennas, a shape of an antenna, a lobe width of a main beam of an antenna, a direction in which a beam swings, a maximum number of configurable beams, or movability of a beam in a three-dimensional direction as the capability of the terminal apparatus.

12. A communication control method performed by a communication apparatus, the method comprising
controlling, by a processor of the communication apparatus, a communication process in a cellular system,
setting a plurality of reception beams on a basis of information of a direction set by a base station,
measuring a received power for each of the reception beams, and
reporting, to the base station, a measurement result of only those of the reception beams that have a measurement result corresponding to a histogram of a number of times that the measured power exceeds a predetermined threshold in a predetermined time period.

13. A communication control method performed by a communication apparatus, the method comprising
controlling, by a processor of the communication apparatus, a communication process in a cellular system,
setting a plurality of reception beams for a terminal apparatus on a basis of capability information acquired from the terminal apparatus, and
acquiring information related to a received power measured in the terminal apparatus for each of the reception beams, from the terminal apparatus, the information comprising a report, from the terminal apparatus, of a measurement result of only those of the reception beams that have a measurement result corresponding to a histogram of a number of times that a power measured by the terminal apparatus exceeds a predetermined threshold in a predetermined time period.

14. A non-transitory computer readable program product containing a computer program that causes a computer to perform a method that comprises:
controlling a communication process in a cellular system,
setting a plurality of reception beams on a basis of information of a direction set by a base station,
measuring a received power for each of the reception beams, and
reporting, to the base station, a measurement result of only those of the reception beams that have a measurement result corresponding to a histogram of a number of times that the measured power exceeds a predetermined threshold in a predetermined time period.

15. A non-transitory computer readable program product containing a computer program that causes a computer to perform a method that includes:
controlling a communication process in a cellular system,
setting a plurality of reception beams for a terminal apparatus on a basis of capability information acquired from the terminal apparatus, and
acquiring information related to a received power measured in the terminal apparatus for each of the reception beams, from the terminal apparatus, the information comprising a report, from the terminal apparatus, of a measurement result of only those of the reception beams that have a measurement result corresponding to a histogram of a number of times that a power measured by the terminal apparatus exceeds a predetermined threshold in a predetermined time period.

* * * * *